United States Patent
Yamazaki et al.

(10) Patent No.: US 8,954,118 B2
(45) Date of Patent: *Feb. 10, 2015

(54) PORTABLE INFORMATION SYSTEM

(75) Inventors: Masatoshi Yamazaki, Kyoto (JP); Tooru Ooe, Kyoto (JP); Masahiro Shoji, Kyoto (JP); Hiroaki Adachi, Kyoto (JP); Takashi Kubota, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,205

(22) Filed: Oct. 1, 2011

(65) Prior Publication Data

US 2012/0021703 A1    Jan. 26, 2012

Related U.S. Application Data

(63) Continuation of application No. 12/948,050, filed on Nov. 17, 2010.

(30) Foreign Application Priority Data

Jun. 11, 2010    (JP) .................................. 2010-134563

(51) Int. Cl.
    *H04B 1/38*    (2006.01)
(52) U.S. Cl.
    USPC ......... 455/574; 455/572; 455/41.1; 455/41.2; 455/517; 370/338; 370/254; 709/237; 709/228
(58) Field of Classification Search
    USPC ........ 455/574, 572, 41.1, 41.2, 517; 370/338, 370/254; 709/237, 228
    See application file for complete search history.

(56) References Cited

U.S. PATENT DOCUMENTS

| | | | |
|---|---|---|---|
| 5,396,225 | A | 3/1995 | Okada et al. |
| 5,618,045 | A | 4/1997 | Kagan et al. |
| 5,666,293 | A | 9/1997 | Metz et al. |
| 5,732,275 | A | 3/1998 | Kullick et al. |
| 6,018,720 | A | 1/2000 | Fujimoto |
| 6,438,573 | B1 | 8/2002 | Nilsen |
| 6,733,382 | B2 | 5/2004 | Oe et al. |
| 6,736,727 | B1 | 5/2004 | Doi et al. |
| 7,054,831 | B2 | 5/2006 | Koenig |
| 7,114,090 | B2 * | 9/2006 | Kardach et al. ............... 713/323 |
| 7,290,072 | B2 | 10/2007 | Quraishi et al. |

(Continued)

FOREIGN PATENT DOCUMENTS

| | | |
|---|---|---|
| CN | 101345565 | 1/2009 |
| EP | 0710017 | 5/1996 |

(Continued)

OTHER PUBLICATIONS

English-language machine translation of JP 11-207031.

(Continued)

*Primary Examiner* — Sanh Phu
(74) *Attorney, Agent, or Firm* — Nixon & Vanderhye, P.C.

(57) ABSTRACT

An example portable information terminal has a used and an unused state and includes a wireless communication module configured to search for a predetermined access point at least when the portable information terminal operates in the unused state and a processor configured to, when the predetermined access point is detected, connect to the predetermined access point and perform a data communication process.

108 Claims, 41 Drawing Sheets

(56) References Cited

U.S. PATENT DOCUMENTS

| | | | |
|---|---|---|---|
| 7,346,708 B2* | 3/2008 | Minamisawa | 709/250 |
| 7,457,410 B2 | 11/2008 | Yamauchi et al. | |
| 7,493,613 B2 | 2/2009 | D'Souza et al. | |
| 7,565,653 B2 | 7/2009 | Inoue et al. | |
| 7,620,027 B2 | 11/2009 | Igarashi et al. | |
| 7,704,147 B2 | 4/2010 | Quraishi et al. | |
| 7,725,078 B2 | 5/2010 | Kuwahara et al. | |
| 7,729,661 B2 | 6/2010 | Tanaka et al. | |
| 7,794,328 B2 | 9/2010 | Horigome | |
| 7,801,818 B2 | 9/2010 | Tsukazaki et al. | |
| 7,811,171 B2 | 10/2010 | Mitsuyoshi et al. | |
| 7,813,300 B2 | 10/2010 | Takayama et al. | |
| 7,819,750 B2 | 10/2010 | Lam et al. | |
| 7,854,657 B2 | 12/2010 | Shiraiwa | |
| 7,862,433 B2 | 1/2011 | Sato et al. | |
| 7,901,293 B2 | 3/2011 | Oe | |
| 7,929,911 B2 | 4/2011 | Tanaka et al. | |
| 7,934,995 B2* | 5/2011 | Suzuki | 463/37 |
| 8,052,528 B2 | 11/2011 | Shiraiwa et al. | |
| 8,075,405 B2 | 12/2011 | Sasaki et al. | |
| 8,078,160 B2 | 12/2011 | Quinn | |
| 8,185,165 B2 | 5/2012 | Beninghaus et al. | |
| 8,229,962 B1 | 7/2012 | Cavalancia, II | |
| 8,261,258 B1 | 9/2012 | Jianu et al. | |
| 8,433,375 B2 | 4/2013 | Yamazaki et al. | |
| 8,505,008 B2 | 8/2013 | Yamazaki et al. | |
| 8,700,478 B2 | 4/2014 | Kubo et al. | |
| 2001/0003714 A1 | 6/2001 | Takata et al. | |
| 2001/0048744 A1 | 12/2001 | Kimura et al. | |
| 2002/0016166 A1 | 2/2002 | Uchida et al. | |
| 2002/0065137 A1 | 5/2002 | Tonomura | |
| 2002/0083160 A1 | 6/2002 | Middleton | |
| 2003/0033413 A1 | 2/2003 | Wilson, Jr. et al. | |
| 2003/0038731 A1 | 2/2003 | Sako et al. | |
| 2003/0126218 A1 | 7/2003 | Sakonsaku | |
| 2003/0134623 A1 | 7/2003 | Kanamaru et al. | |
| 2003/0207700 A1 | 11/2003 | Yamanaka | |
| 2004/0002774 A1 | 1/2004 | Conti et al. | |
| 2004/0082383 A1 | 4/2004 | Muncaster et al. | |
| 2004/0122931 A1 | 6/2004 | Rowland et al. | |
| 2004/0127288 A1 | 7/2004 | Furuhashi et al. | |
| 2004/0151126 A1 | 8/2004 | Matsubara | |
| 2004/0224769 A1 | 11/2004 | Hansen et al. | |
| 2004/0259642 A1 | 12/2004 | Tanaka et al. | |
| 2005/0047356 A1 | 3/2005 | Fujii et al. | |
| 2005/0068928 A1 | 3/2005 | Smith et al. | |
| 2005/0070327 A1 | 3/2005 | Watanabe | |
| 2005/0073764 A1* | 4/2005 | Ogawa et al. | 360/60 |
| 2005/0154759 A1 | 7/2005 | Hofmeister et al. | |
| 2005/0282639 A1 | 12/2005 | Tanaka et al. | |
| 2006/0068702 A1 | 3/2006 | Miwa et al. | |
| 2006/0106963 A1 | 5/2006 | Sasaki et al. | |
| 2006/0166739 A1* | 7/2006 | Lin | 463/39 |
| 2006/0168574 A1 | 7/2006 | Giannini et al. | |
| 2006/0234631 A1 | 10/2006 | Dieguez | |
| 2006/0247059 A1 | 11/2006 | Nogami et al. | |
| 2006/0282518 A1* | 12/2006 | Karaoguz et al. | 709/221 |
| 2006/0282834 A1 | 12/2006 | Cheng et al. | |
| 2007/0078004 A1 | 4/2007 | Suzuki et al. | |
| 2007/0105623 A1 | 5/2007 | Tanaka et al. | |
| 2007/0118587 A1 | 5/2007 | Ishikawa et al. | |
| 2007/0121534 A1 | 5/2007 | James et al. | |
| 2007/0123168 A1 | 5/2007 | Takehara et al. | |
| 2007/0136817 A1 | 6/2007 | Nguyen | |
| 2007/0149183 A1 | 6/2007 | Dunko et al. | |
| 2007/0174471 A1 | 7/2007 | Van Rossum | |
| 2007/0203969 A1 | 8/2007 | Wakasa et al. | |
| 2007/0213975 A1 | 9/2007 | Shimoda et al. | |
| 2007/0232310 A1 | 10/2007 | Schiff et al. | |
| 2007/0271234 A1 | 11/2007 | Ravikiran | |
| 2008/0119281 A1 | 5/2008 | Hirose et al. | |
| 2008/0123582 A1* | 5/2008 | Maekawa | 370/315 |
| 2008/0139310 A1 | 6/2008 | Kando et al. | |
| 2008/0148350 A1 | 6/2008 | Hawkins et al. | |
| 2008/0209071 A1 | 8/2008 | Kubota | |
| 2009/0011709 A1 | 1/2009 | Akasaka et al. | |
| 2009/0017767 A1 | 1/2009 | Mashimo | |
| 2009/0037526 A1 | 2/2009 | Elliott et al. | |
| 2009/0058639 A1 | 3/2009 | Tanaka et al. | |
| 2009/0061870 A1 | 3/2009 | Finkelstein et al. | |
| 2009/0064299 A1 | 3/2009 | Begorre et al. | |
| 2009/0093310 A1 | 4/2009 | Tanaka et al. | |
| 2009/0124393 A1 | 5/2009 | Tanaka et al. | |
| 2009/0137321 A1 | 5/2009 | Katsume et al. | |
| 2009/0143114 A1 | 6/2009 | Vargas et al. | |
| 2009/0143140 A1 | 6/2009 | Kitahara | |
| 2009/0158430 A1 | 6/2009 | Borders | |
| 2009/0186603 A1 | 7/2009 | Usami et al. | |
| 2009/0193365 A1 | 7/2009 | Sugiura | |
| 2009/0217307 A1 | 8/2009 | Ooe | |
| 2009/0253518 A1 | 10/2009 | Sasaki et al. | |
| 2009/0307105 A1 | 12/2009 | Lemay et al. | |
| 2009/0310594 A1 | 12/2009 | Nakata et al. | |
| 2010/0083181 A1 | 4/2010 | Matsushima et al. | |
| 2010/0111057 A1 | 5/2010 | Nakamura et al. | |
| 2010/0130254 A1 | 5/2010 | Kamada et al. | |
| 2010/0167697 A1 | 7/2010 | Ishikawa et al. | |
| 2010/0312817 A1 | 12/2010 | Steakley | |
| 2010/0325235 A1 | 12/2010 | Konno et al. | |
| 2011/0045910 A1 | 2/2011 | McKenna et al. | |
| 2011/0060825 A1 | 3/2011 | Ooe et al. | |
| 2011/0070950 A1 | 3/2011 | Tanaka et al. | |
| 2011/0143840 A1 | 6/2011 | Sotoike et al. | |
| 2011/0176455 A1* | 7/2011 | Matsunada | 370/254 |
| 2011/0205953 A1 | 8/2011 | Kuwahara et al. | |
| 2011/0231559 A1* | 9/2011 | Yamaguchi | 709/228 |
| 2011/0292033 A1 | 12/2011 | Umezu et al. | |
| 2011/0295709 A1 | 12/2011 | Kubo et al. | |
| 2011/0306294 A1 | 12/2011 | Yamazaki et al. | |
| 2011/0307554 A1 | 12/2011 | Konno et al. | |
| 2011/0307884 A1 | 12/2011 | Wabe | |
| 2011/0307892 A1 | 12/2011 | Yamazaki et al. | |
| 2012/0010000 A1 | 1/2012 | Masuda et al. | |
| 2012/0011256 A1 | 1/2012 | Masuda et al. | |
| 2012/0021703 A1 | 1/2012 | Yamazaki et al. | |
| 2012/0054297 A1 | 3/2012 | Konno et al. | |
| 2012/0071242 A1 | 3/2012 | Fujiwara et al. | |

FOREIGN PATENT DOCUMENTS

| | | |
|---|---|---|
| EP | 1 513 066 | 5/2003 |
| EP | 1 493 474 | 1/2005 |
| EP | 1 810 732 | 7/2007 |
| EP | 1 872 838 | 1/2008 |
| EP | 2 135 650 | 12/2009 |
| JP | 11-53184 | 2/1999 |
| JP | 11-207031 | 8/1999 |
| JP | 2000-167233 | 6/2000 |
| JP | 2000-181822 | 6/2000 |
| JP | 2000-249569 | 9/2000 |
| JP | 2001-231067 | 5/2001 |
| JP | 2001-175556 | 6/2001 |
| JP | 2002-027552 | 1/2002 |
| JP | 2002-102530 | 4/2002 |
| JP | 2002-159739 | 6/2002 |
| JP | 2002-253866 | 9/2002 |
| JP | 2002-297483 | 10/2002 |
| JP | 2003-023661 | 1/2003 |
| JP | 2003-050771 | 2/2003 |
| JP | 2003-196217 | 7/2003 |
| JP | 2003-219465 | 7/2003 |
| JP | 2003-229809 | 8/2003 |
| JP | 2004-057515 | 2/2004 |
| JP | 2004221671 | 8/2004 |
| JP | 2004-329948 | 11/2004 |
| JP | 2004-348203 | 12/2004 |
| JP | 2005018377 | 1/2005 |
| JP | 2005-028103 | 2/2005 |
| JP | 2005-242399 | 9/2005 |
| JP | 2005-242886 | 9/2005 |
| JP | 2005-251167 | 9/2005 |
| JP | 2005-266160 | 9/2005 |
| JP | 2006-005630 | 1/2006 |
| JP | 2006-072685 | 3/2006 |

(56) References Cited

FOREIGN PATENT DOCUMENTS

| JP | 2006-101474 | 4/2006 |
|---|---|---|
| JP | 2006-146306 | 6/2006 |
| JP | 2006-228113 | 8/2006 |
| JP | 2007-004316 | 1/2007 |
| JP | 2007507982 | 3/2007 |
| JP | 2007-088900 | 4/2007 |
| JP | 2007-125185 | 5/2007 |
| JP | 2007-142613 | 6/2007 |
| JP | 2007-164699 | 6/2007 |
| JP | 2007175508 | 7/2007 |
| JP | 2007-330642 | 12/2007 |
| JP | 2008-113259 | 5/2008 |
| JP | 2008-125659 | 6/2008 |
| JP | 2008-136737 | 6/2008 |
| JP | 2008-142181 | 6/2008 |
| JP | 2008-153905 | 7/2008 |
| JP | 2008-160303 | 7/2008 |
| JP | 2008-206800 | 9/2008 |
| JP | 2009015551 | 1/2009 |
| JP | 2009-026178 | 2/2009 |
| JP | 2009-065306 | 3/2009 |
| JP | 2009-512239 | 3/2009 |
| JP | 2009-147828 | 7/2009 |
| JP | 2009-225000 | 10/2009 |
| JP | 2010-022704 | 2/2010 |
| JP | 2010-028171 | 2/2010 |
| JP | 2010028171 | 2/2010 |
| JP | 2010028672 | 2/2010 |
| JP | 2010-079546 | 4/2010 |
| JP | 2010-086327 | 4/2010 |
| JP | 2011-509541 | 3/2011 |
| WO | 2005/111815 | 11/2005 |
| WO | 2009/048473 | 4/2009 |
| WO | 2009/148781 | 12/2009 |
| WO | 2010/010645 | 1/2010 |

OTHER PUBLICATIONS

English-language machine translation of JP 2006-005630.
English-language machine translation of JP 2006-228113.
English-language machine translation of JP 2007-330642.
English-language machine translation of JP 2008-113259.
English-language machine translation of JP 2008-160303.
English-language machine translation of JP 2009-026178.
English-language machine translation of JP 2002-102530.
Dissidia Final Fantasy Ultimania, Japan, Square Enix Co., Ltd., Feb. 19, 2009, First Edition, (4 pages) and partial English-language translation thereof.
Konno et al., U.S. Appl. No. 12/816,672, filed Jun. 16, 2010.
Ooe et al., U.S. Appl. No. 12/871,243, filed Aug. 30, 2010.
Kubo et al., U.S. Appl. No. 12/940,426, filed Nov. 5, 2010.
Yamazaki et al., U.S. Appl. No. 12/948,050, filed Nov. 17, 2010.
Yamazxaki et al., U.S. Appl. No. 12/948,371, filed Nov. 17, 2010.
Wabe et al., U.S. Appl. No. 13/027,723, filed Feb. 15, 2011.
Konno et al., U.S. Appl. No. 13/101,811, filed May 5, 2011.
Konno et al., U.S. Appl. No. 13/251,204, filed Oct. 1, 2011.
Partial EP Search Report in counterpart application No. EP 11 15 3645, dated Oct. 25, 2011.
Miki, "Oideyo Doubutsu No Mori Kanpeki Guidebook", First Edition, Enterbrain, Inc., Hamamura Kouichi, Jan. 9, 2006 (partial English-language translation), 6 pages.
Dragon Quest Monsters Joker 2, Weekly Famitsu, Enterbrain, Inc., Apr. 22, 2010, vol. 25, No. 18, Serial No. 1116, pp. 115-119, with a partial English translation, 8 pages.
Dragon Quest Monsters Joker 2, Nintendo Dream, Mainichi Communications, Inc., Jul. 1, 2010, vol. 15, No. 7, Serial No. 195, pp. 52-59, with a partial English translation, 12 pages.
Game Broadway STAGE27, Gamaga, Softbank Creative Corp., Jun. 1, 2010, vol. 27, No. 6, Serial No. 475, pp. 36-37, with a partial English translation, 6 pages.
EP Search Report dated Jan. 19, 2012 in EP Application No. 10 19 1411.

Ooe et al., U.S. Appl. No. 12/871,243, filed Aug. 30, 2010—RCE filed Nov. 29, 2013.
Kubo et al., U.S. Appl. No. 12/940,426, filed Nov. 5, 2010—allowed.
Bhupender Virk, "Development of Low Power Consumption Wireless IC for Realization of Sensor Network with Wireless LAN," *Nikkei Electronics*, vol. 997, Feb. 9, 2009, pp. 87-94, published by Nikkei Business Publications, Inc., and partial English-language translation.
English-language machine translation of JP 2007-125185.
English-language machine translation of JP 2006-072685.
English-language machine translation of JP 2007-164699.
English-language machine translation of JP-2002-297483.
English-language machine translation of JP-2005-242886.
English-language machine translation of JP-2006-146306.
English-language machine translation of JP-2009-225000.
English-language machine translation of JP-2010-079546.
Konno et al., U.S. Appl. No. 12/816,672, filed Jun. 16, 2010—response to office action filed Mar. 12, 2014.
Kubo et al., U.S. Appl. No. 12/940,426, filed Nov. 5, 2010—now USP 8,700,478.
Wabe et al., U.S. Appl. No. 13/027,723, filed Feb. 15, 2011—final office action mailed Apr. 28, 2014.
Konno et al., U.S. Appl. No. 13/101,811, filed May 5, 2011—RCE filed Jan. 22, 2014.
Fujiwara et al., U.S. Appl. No. 13/111,033, filed May 19, 2011—non-final office action mailed Apr. 25, 2014.
Konno et al., U.S. Appl. No. 13/251,204, filed Oct. 1, 2011—allowed.
Kubo et al., U.S. Appl. No. 14/181,690, filed Feb. 16, 2014—awaiting USPTO action.
Saeki, K., "Apparent and Substantial Improvement in Function! Report on Nintendo DSi Giving Impression of Development," Impress Watch Corporation, Game Watch, uploaded on Nov. 1, 2008 [retrieved Feb. 4, 2014]; http://game.watch.impress.co.jp/docs/20081101/dsi1.htm with partial English-language translation thereof.
English-language machine translation of http://game.watch.impress.co.jp/docs/20081101/dsi1.htm [retreived Apr. 15, 2014].
English-language machine translation of JP2004-221671.
English-language machine translation of JP2007-175508.
English-language machine translation of JP2010-028171.
English-language machine translation of JP2010-028672.
Kubo et al., U.S. Appl. No. 14/181,692, filed Feb. 16, 2014—awaiting USPTO action.
Konno et al., U.S. Appl. No. 12/816,672, filed Jun. 16, 2010—non-final office action mailed Sep. 12, 2013.
Ooe et al., U.S. Appl. No. 12/871,243, filed Aug. 30, 2010—allowed.
Kubo et al., U.S. Appl. No. 12/940,426, filed Nov. 5, 2010—RCE filed Jul. 22, 2013.
Fujiwara et al., U.S. Appl. No. 12/969,855, filed Dec. 16, 2010.
Wabe et al., U.S. Appl. No. 13/027,723, filed Feb. 15, 2011—RCE filed Oct. 21, 2013.
Konno et al., U.S. Appl. No. 13/101,811, filed May 5, 2011—final office action mailed Sep. 18, 2013.
Fujiwara et al., U.S. Appl. No. 13/111,033, filed May 19, 2011.
Konno et al., U.S. Appl. No. 13/251,204, filed Oct. 1, 2011—response to office action filed Sep. 25, 2013.
Yamazaki et al., U.S. Appl. No. 13/251,205, filed Oct. 1, 2011—non-final office action mailed Sep. 12, 2013.
English-language machine translation of JP 2000-167233.
English-language machine translation of JP 2010-022704.
Yu Kuribayashi, "Check In: Castanet [English ver.] Noteworthy push-type system for automatically delivering Java application comes to Japan," netPC, Japan, ASCII Corporation, Jul. 1, 1997, vol. 2, No. 7 (No. 15 throughout volumes), pp. 66-67, and partial English-language translation thereof.
"Nintendo 3DS, formal announcement!!" E3 2010 report "Perfect analysis of veiled fascinating hardware! This changes partable game devices!?" Weekly Famitsu, Japan, Enterbrain, Inc., June. 24, 2010, vol. 25 (No. 1125 throughout volumes), pp. 12-13, and partial English-language translation thereof.

* cited by examiner

F I G. 6
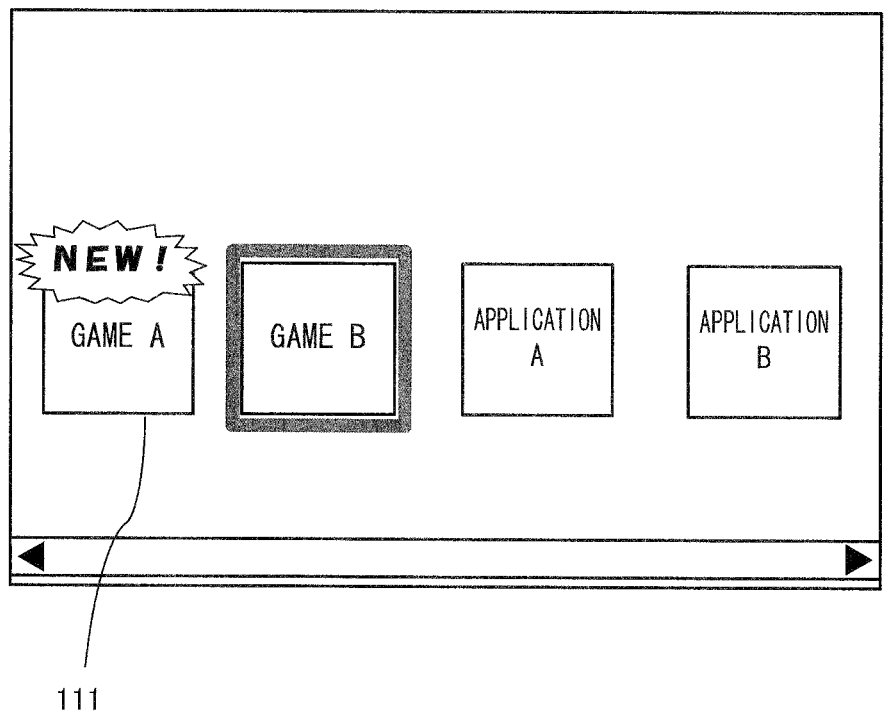

FIG. 11
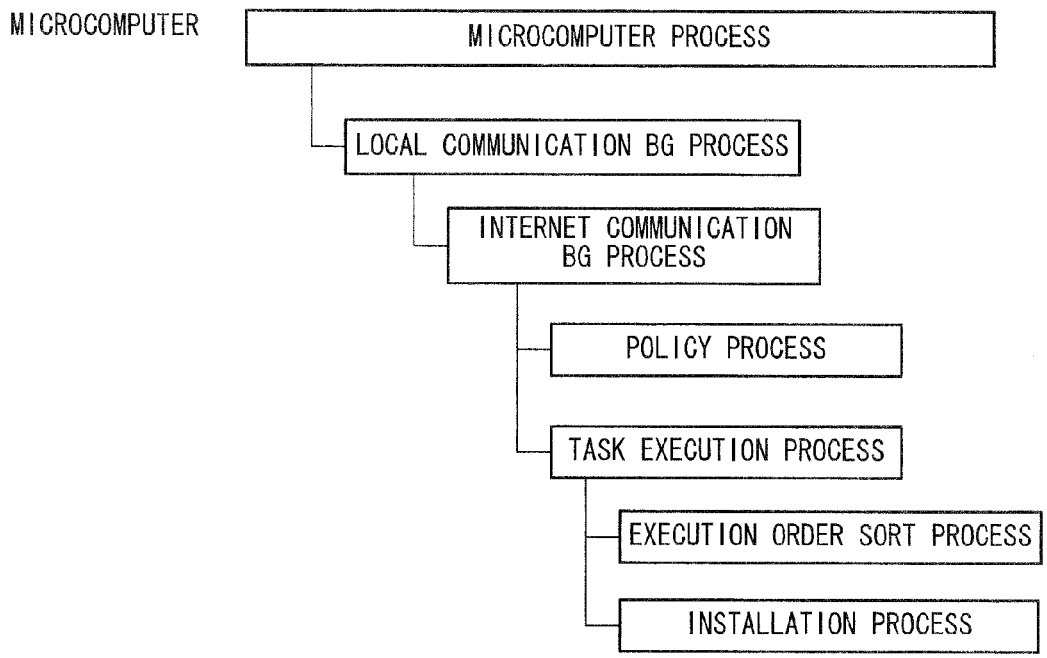
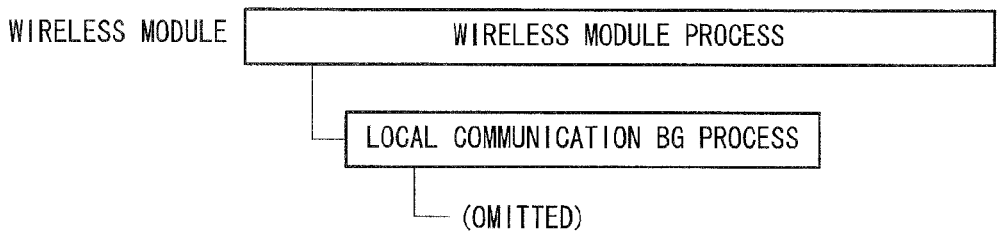
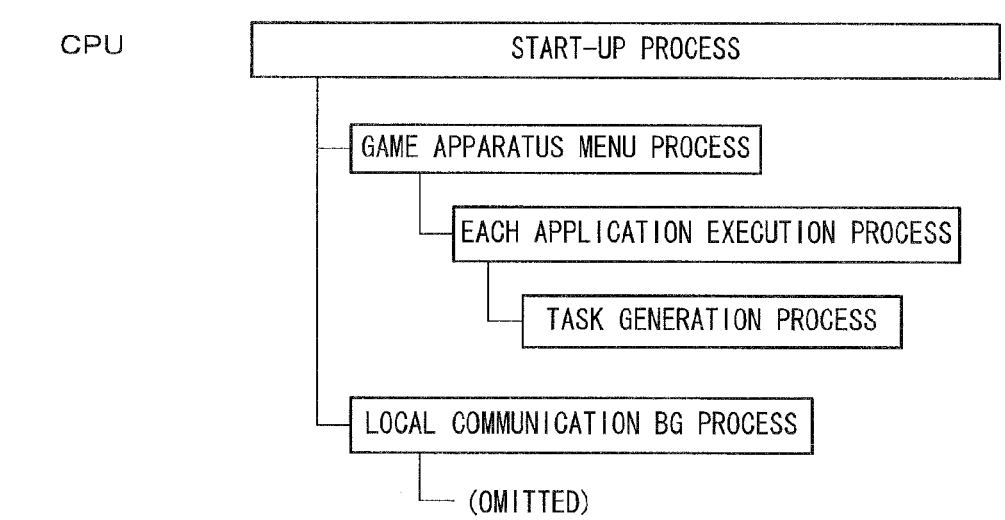

| AP INFORMATION | AREA |
|---|---|
| ***** | KYOTO |
| ***** | OSAKA |
| ***** | TOKYO |
| ⋮ | ⋮ |

PORTABLE INFORMATION SYSTEM

CROSS REFERENCE TO RELATED APPLICATION

This application is a continuation of application Ser. No. 12/948,050, filed Nov. 17, 2010, which claims priority from Japanese Patent Application No. 2010-134563, filed on Jun. 11, 2010. The entire contents of these applications are incorporated herein by reference.

BACKGROUND AND SUMMARY

The present invention relates to a portable information terminal having a communication function, and more particularly, to a portable information terminal having a power saving mode.

Conventionally, there is a technique which executes a scheduled communication task at a timing when a certain condition is satisfied (e.g., Japanese Laid-Open Patent Publication No. 2008-125659). In an apparatus using such a technique, a scheduled task, such as transmission and reception of a message and downloading, is executed in a cycle of a predetermined unit time or at a timing which is set for the task. The communication task is executed by an input-output processor independently of a CPU. Thus, the communication task is executed even in a standby mode in which power is not supplied to the CPU, and hence a user does not need to make an instruction for transmission and reception or downloading.

However, an apparatus disclosed in Japanese Laid-Open Patent Publication No. 2008-125659 intermittently performs a process such as transmission and reception of a message and downloading, on the premise that a connection to a network has been previously established. Thus, in the case where a connection to the network has not been established when a process such as transmission and reception or downloading should be performed, the apparatus cannot attempt to connect to the network. The invention disclosed in Japanese Laid-Open Patent Publication No. 2008-125659, which assumes that the apparatus is constantly connected to the network, is useful for a stationary apparatus which is set and used at a predetermined location such as home. However, concerning a portable apparatus which is carried and used, the distance between the portable apparatus and an access point changes due to movement of a user, and a situation also occurs in which there is no access point around the portable apparatus. Thus, it is difficult to apply the invention disclosed in Japanese Laid-Open Patent Publication No. 2008-125659, to the portable apparatus. Further, there is known a method of connecting to an access point specified by a user. However, in this method, even when there is a connectable access point around the user, the user needs to notice the access point and make an instruction for connection, in order to connect to the access point. Therefore, the operation for the connection is troublesome for the user, and the user needs to always pay attention to whether or not there is any access point around the user.

Therefore, an object of the present invention is to provide a portable terminal which, even in a state where a constant connection cannot be achieved due to an environment in which the distance from an access point is not constant, can achieve a connection state similar to the constant connection, by automatically attempting to connect to the access point when needed. In addition, another object of the present invention is to provide a portable terminal which can be present on a network by automatically attempting to connect to an access point when needed, without user's attention and instruction for performing the connection.

The present invention has the following features to attain the objects mentioned above.

A first aspect of the present invention is directed to a portable information terminal including first change means, search means, and communication processing means. The first change means changes a state of the portable information terminal between an unused state and a used state. The search means searches for a predetermined access point at least when the portable information terminal operates in the unused state. When the predetermined access point is detected by the search means, the communication processing means connects to the predetermined access point and performs a predetermined data communication process.

According to the first aspect, even in the unused state, the access point is searched for and communication is also performed. Thus, the portable information terminal can connect to the network without the user realizing it.

In a second aspect based on the first aspect, power consumption in the unused state is lower than that in the used state.

According to the second aspect, even in a state in which power consumption is low, the access point can be searched for and data communication can be performed.

In a third aspect based on the first aspect, the portable information terminal is capable of being opened and closed by a user. The first change means changes the state of the portable information terminal to the used state when the portable information terminal is in an opened state, and changes the state of the portable information terminal to the unused state when the portable information terminal is in a closed state.

According to the third aspect, the portable information terminal can perform data communication even while being closed (i.e., without the user realizing it).

In a fourth aspect based on the first aspect, the search means automatically and repeatedly searches for the predetermined access point. The communication processing means automatically connects to the predetermined access point and automatically performs the data communication process.

According to the fourth aspect, since the portable information terminal automatically connects to the network, the portable information terminal can perform data communication without the user realizing it. Further, since the connection is repeatedly performed, a feeling of use as if being constantly in connection can be provided to the user.

In a fifth aspect based on the first aspect, the portable information terminal further includes program execution means and reception means. The program execution means executes a plurality of application programs. The reception means receives, from each application program, an instruction for a process of transmission or reception of data which is performed with another information processing apparatus via a network. The search means automatically searches for the predetermined access point. Further, the communication processing means automatically performs transmission or reception of the data, which is received by the reception means from each application program, via the predetermined access point.

According to the fifth aspect, each application does not need to perform a connection to the access point and a process of transmission and reception of data, by itself, and when an instruction is issued, transmission and reception of data are automatically performed. Thus, it is easy for the developer of each application to design the application, and the user does not need to activate a target application when data communication is performed.

In a sixth aspect based on the first aspect, the portable information terminal further includes storage means, access point information setting means, and search time defining means. The storage means stores information concerning at least one first access point, which is settable by a user, and information concerning at least one second access point, which is settable by the user. The access point information setting means sets the information concerning the at least one first access point, by the user. The search time defining means defines a time to search for the at least one first access point. The search means includes first access point search means and second access point search means. When the time defined by the search time defining means comes, the first access point search means searches for the at least one first access point on the basis of the information concerning the at least one first access point. The second access point search means automatically and repeatedly searches for the at least one second access point on the basis of the information concerning the at least one second access point.

According to the sixth aspect, an AP which is set by the user is searched for at the defined time, and an AP which is previously set is automatically and repeatedly searched for. The former AP is at home or the like, and thus it is sufficient to search for the AP at the defined time. However, the latter AP can be sometimes detected or cannot be sometimes detected. Thus, by repeatedly searching for the latter AP, the detection efficiency is increased.

In a seventh aspect based on the first aspect, the communication processing means connects to the predetermined access point and receives predetermined data via the predetermined access point.

According to the seventh aspect, the portable information terminal can connect to the network and receive the predetermined data, without the user realizing it. In addition, since the portable information terminal is in the power saving mode until the data reception is started, the power consumption can be saved.

In an eighth aspect based on the first aspect, the portable information terminal further includes communication cutoff means for cutting off a connection to the predetermined access point after the communication processing means ends the predetermined data communication process via the predetermined access point detected by the search means.

According to the eighth aspect, the power consumption can be further saved.

In a ninth aspect based on the first aspect, the search means searches for the predetermined access point by using near-field wireless communication.

According to the ninth aspect, when a communicable range of equipped wireless communication is limited, the probability of maintaining connection when moving the portable information terminal is generally low. Even in such a case, a feeling of use as if being constantly in connection can be provided to the user.

In a tenth aspect based on the first aspect, the portable information terminal further includes condition determination means for determining whether or not a predetermined condition is satisfied at least when the portable information terminal operates in the unused state. The search means searches for the predetermined access point when it is determined by the condition determination means that the predetermined condition is satisfied.

In an eleventh aspect based on the tenth aspect, when a predetermined time comes, the condition determination means determines that the predetermined condition is satisfied.

According to the tenth and eleventh aspects, the portable information terminal attempts to connect to the access point without an instruction of the user. Thus, the portable information terminal can connect to the network without the user realizing it.

In a twelfth aspect based on the tenth aspect, the portable information terminal further includes process defining means for defining a process of transmission or reception of data, which is performed with the other information processing apparatus via a network, and an execution time of the process. The communication processing means includes data transmission/reception process means for performing the transmission or reception of the data which is defined by the process defining means, via the predetermined access point detected by the search means. When the execution time defined by the process defining means comes, the condition determination means determines that the predetermined condition is satisfied. Further, when it is determined by the condition determination means that the predetermined condition is satisfied and the predetermined access point is detected by the search means, the data transmission/reception process means performs the transmission or reception of the data.

According to the twelfth aspect, the portable information terminal attempts to connect to the access point at a time when the process is to be executed, namely, when needed. Thus, if the access point is present near the portable information terminal when needed, the same effect as that when being constantly in connection can be provided.

In a thirteenth aspect based on the first aspect, at least when the portable information terminal operates in the unused state, the search means searches for the predetermined access point by automatically and repeatedly attempting to receive a beacon transmitted from the predetermined access point, and detects the predetermined access point by receiving the beacon. The communication processing means includes connection establishment means and data transmission/reception means. When it is determined by the search means that the beacon is received, the connection establishment means attempts to establish a connection to the predetermined access point which transmits the beacon. When the connection to the predetermined access point is established, the data transmission/reception means performs transmission or reception of predetermined data via the predetermined access point.

According to the thirteenth aspect, without an instruction of the user, the portable information terminal automatically and repeatedly attempts to receive a beacon from the access point, and when receiving the beacon, the portable information terminal attempts to connect to the access point. Thus, the portable information terminal can connect to the network without the user realizing it.

In a fourteenth aspect based on the thirteenth aspect, the portable information terminal further includes process defining means. The process defining means defines a process of transmission or reception of data, which is performed with the other information processing apparatus via a network, and an execution time of the process. The communication processing means further includes execution time determination means. When the connection to the predetermined access point is established by the connection establishment means, the execution time determination means determines whether or not the defined execution time has come. When the execution time has come, the data transmission/reception means performs the defined transmission or reception of the data.

According to the fourteenth aspect, when receiving a beacon and connecting to the access point, the portable information terminal performs a process whose scheduled execution time has already come (a process which has not been executed even when its scheduled execution time has already come). Thus, an effect close to the effect when being constantly in connection can be provided.

In a fifteenth aspect based on the first aspect, the portable information terminal further includes display means. Power is supplied to the display means in the used state, and the power is not supplied to the display means in the unused state. The first change means changes the state of the portable information terminal between the used state and the unused state in accordance with a predetermined operation performed by a user. The portable information terminal further includes display control means for, when the state of the portable information terminal is changed from the unused state to the used state in accordance with the predetermined operation performed by the user, displaying contents of data received by the communication processing means, on the display means.

According to the fifteenth aspect, when the user performs an operation, the mode of the portable information terminal is changed to the mode in which power is supplied to the display means, the received data is displayed, and the user can know that the new data has been received. Thus, a surprise can be provided to the user.

In a sixteenth aspect based on the eighth aspect, the portable information terminal further includes second change means for changing a power control mode between a power saving mode and a non-power saving mode. The search means searches for the predetermined access point at least when the portable information terminal operates in the unused state and in the power saving mode. The second change means changes the power control mode to the non-power saving mode when the predetermined access point is detected by the search means, and changes the power control mode to the power saving mode when the connection to the predetermined access point is cut off by the communication cutoff means.

In a seventeenth aspect based on the first aspect, the portable information terminal further includes second change means for changing a power control mode between a power saving mode and a non-power saving mode. The search means searches for the predetermined access point at least when the portable information terminal operates in the unused state and in the power saving mode. The second change means changes the power control mode to the non-power saving mode when the predetermined access point is detected by the search means, and changes the power control mode to the power saving mode when the data communication process by the communication processing means ends.

According to the sixteenth and seventeenth aspects, when the AP is detected, the portable information terminal shifts to the non-power save mode to perform data communication. After the end of the data communication, the communication is cut off, and the portable information terminal shifts to the power save mode. Thus, even when power is needed at data communication (i.e., even in the case (even with specification information of the terminal) where communication cannot be performed in the power save mode), the power consumption can be saved.

In an eighteenth aspect based on the first aspect, the communication processing means automatically performs reception of one or more application programs via the predetermined access point. The portable information terminal further includes installation means for, when the reception of the one or more application programs is performed, automatically performing installation of the one or more application programs to the portable information terminal.

According to the eighteenth aspect, the portable information terminal automatically performs downloading (reception) and installation of an application program. In other words, the portable information terminal can receive a new application without the user realizing it. Thus, a surprise can be provided to the user, and the application provider can increase chances of the application being used.

In a nineteenth aspect based on the first aspect, the communication processing means automatically performs reception of one or more application programs via the predetermined access point. The portable information terminal further includes list creation means, selection means, application program execution means, and list creation object addition means. When the portable information terminal is started, the list creation means creates and outputs a list of application programs. The selection means selects an application program from the list in accordance with a predetermined operation performed on the portable information terminal. The application program execution means executes the selected application program. The list creation object addition means automatically adds the one or more application programs received automatically by the communication processing means, as displayed objects to the list created by the list creation means.

According to the nineteenth aspect, the automatically received application automatically becomes a displayed object of the list (menu). Thus, the user can notice the newly received application.

In a twentieth aspect based on the first aspect, the communication processing means automatically performs reception of one or more application programs via the predetermined access point. The portable information terminal further includes list creation means, selection means, application program execution means, and list creation object addition means. The list creation means creates and outputs a list of application programs in accordance with a predetermined operation performed on the portable information terminal. The selection means selects an application program from the list in accordance with a predetermined operation performed on the portable information terminal. The application program execution means executes the selected application program. The list creation object addition means automatically adds the one or more application programs received automatically by the communication processing means, as displayed objects to the list created by the list creation means.

According to the twentieth aspect, the automatically received application automatically becomes a displayed object of the list (menu). Thus, the user can notice the newly received application.

In a twenty-first aspect based on the first aspect, the portable information terminal further includes near field data communication means for: repeatedly searching for another terminal which becomes a communication partner present in a communicable range of the portable information terminal, by using near field wireless communication; automatically wirelessly connecting to the other terminal; and automatically transmitting or receiving data to or from the wirelessly connected other terminal. The communication processing means transmits the data received by the near field data communication means, to another information processing apparatus via the predetermined access point.

According to the twenty-first aspect, when there is a terminal which can communicate with another terminal by near field wireless communication but cannot connect to the AP, the portable information terminal can transmit data via the AP for this terminal.

In a twenty-second aspect based on the first aspect, the portable information terminal further includes near field data communication means for: repeatedly searching for another terminal which becomes a communication partner present in a communicable range of the portable information terminal, by using near field wireless communication; automatically wirelessly connecting to the other terminal; and automatically transmitting or receiving data to or from the wirelessly connected other terminal. The near field data communication means transmits data received by the communication processing means to the other terminal.

According to the twenty-second aspect, when there is a terminal which can communicate with another terminal by near field wireless communication but cannot connect to the AP, the portable information terminal can receive data via the AP for this terminal.

In a twenty-third aspect based on the first aspect, the portable information terminal further includes: clocking means; a wireless communication module for performing near-field wireless communication; arithmetic processing means; second change means; and time determination means. The second change means changes a power control mode between a non-power saving mode, in which power is supplied to the clocking means, the arithmetic processing means, and the wireless communication module, and a power saving mode, in which the power is supplied to the clocking means and the wireless communication module but the power is not supplied to the arithmetic processing means. The time determination means determines, by using the clocking means, whether or not a predetermined time has come at least when the portable information terminal operates in the unused state and in the power saving mode. Further, the second change means changes the power control mode to the non-power saving mode when it is determined by the time determination means that the predetermined time has come. The search means searches for the predetermined access point by using the wireless communication module and the arithmetic processing means, at least when the portable information terminal operates in the unused state and in the non-power saving mode.

In a twenty-fourth aspect based on the first aspect, the portable information terminal further includes a wireless communication module for performing near-field wireless communication; arithmetic processing means; and second change means. The second change means changes a power control mode between a non-power saving mode, in which power is supplied to the arithmetic processing means and the wireless communication module, and a power saving mode, in which the power is supplied to the wireless communication module but the power is not supplied to the arithmetic processing means. The search means searches for the predetermined access point by using the wireless communication module, at least when the portable information terminal operates in the unused state and in the power saving mode. The second change means changes the power control mode to the non-power saving mode when the predetermined access point is detected by the search means. When the power control mode is changed to the non-power saving mode by the second change means, the communication processing means connects to the predetermined access point by using the wireless communication module and the arithmetic processing means, and performs the data communication process.

According to the twenty-third and twenty-fourth aspects, the same effect as that of the first aspect can be obtained.

A twenty-fifth aspect of the present invention is directed to a portable information terminal including process defining means, time determination means, connection means, and data transmission/reception means. The process defining means defines a process of transmission or reception of data, which is performed with another apparatus via a network, and an execution time of the process. The time determination means determines whether or not the execution time defined by the process defining means has come. When it is determined by the time determination means that the execution time has come, the connection means attempts to connect to a predetermined access point. When a connection to the predetermined access point is established by the connection means, the data transmission/reception means performs the transmission or reception of the data, which is defined by the process defining means, via the predetermined access point.

According to the twenty-fifth aspect, the portable information terminal attempts to connect to the access point at a time when the process is to be executed, namely, when needed. Thus, if the access point is present near the portable information terminal when needed, the same effect as that when being constantly in connection can be provided.

A twenty-sixth aspect of the present invention is directed to a portable information system including first change means, search means, and communication processing means. The first change means changes a state of the portable information system between an unused state and a used state. The search means searches for a predetermined access point at least when the portable information system operates in the unused state. When the predetermined access point is detected by the search means, the communication processing means connects to the predetermined access point and performs a predetermined data communication process via the predetermined access point.

A twenty-seventh aspect of the present invention is directed to a computer-readable storage medium having stored thereon a portable information terminal control program which is executed by a computer of a portable information terminal having two modes of an unused state and a used state. The program causes the computer to operate as: first change means; search means; and communication processing means. The first change means changes a state of the portable information terminal between the unused state and the used state. The search means searches for a predetermined access point at least when the portable information terminal operates in the unused state. When the predetermined access point is detected by the search means, the communication processing means connects to the predetermined access point and performs a predetermined data communication process via the predetermined access point.

A twenty-eighth aspect of the present invention is directed to a method of controlling a portable information terminal. The method includes a first change step, a search step, and a communication processing step. At the first change step, a state of the portable information terminal is changed between an unused state and a used state. At the search step, at least when the portable information terminal operates in the unused state, a predetermined access point is searched for. At the communication processing step, when the predetermined access point is detected at the search step, a connection to the predetermined access point is performed, and a predetermined data communication process is performed via the predetermined access point.

According to the twenty-sixth to twenty-eighth aspects, the same effect as that of the first aspect can be obtained.

According to the present invention, even a portable information terminal which is not of constant connection type can provide a feeling of use as if being constantly in connection, to the user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows another example of the menu screen;

FIG. 11 is a diagram showing the relationships among various functions (programs) executed in the embodiment;

DETAILED DESCRIPTION OF EXAMPLE EMBODIMENTS

Hereinafter, embodiments of the present invention will be described with reference to the drawings. Note that the present invention is not limited to the embodiments.

First Embodiment

Figure 1:
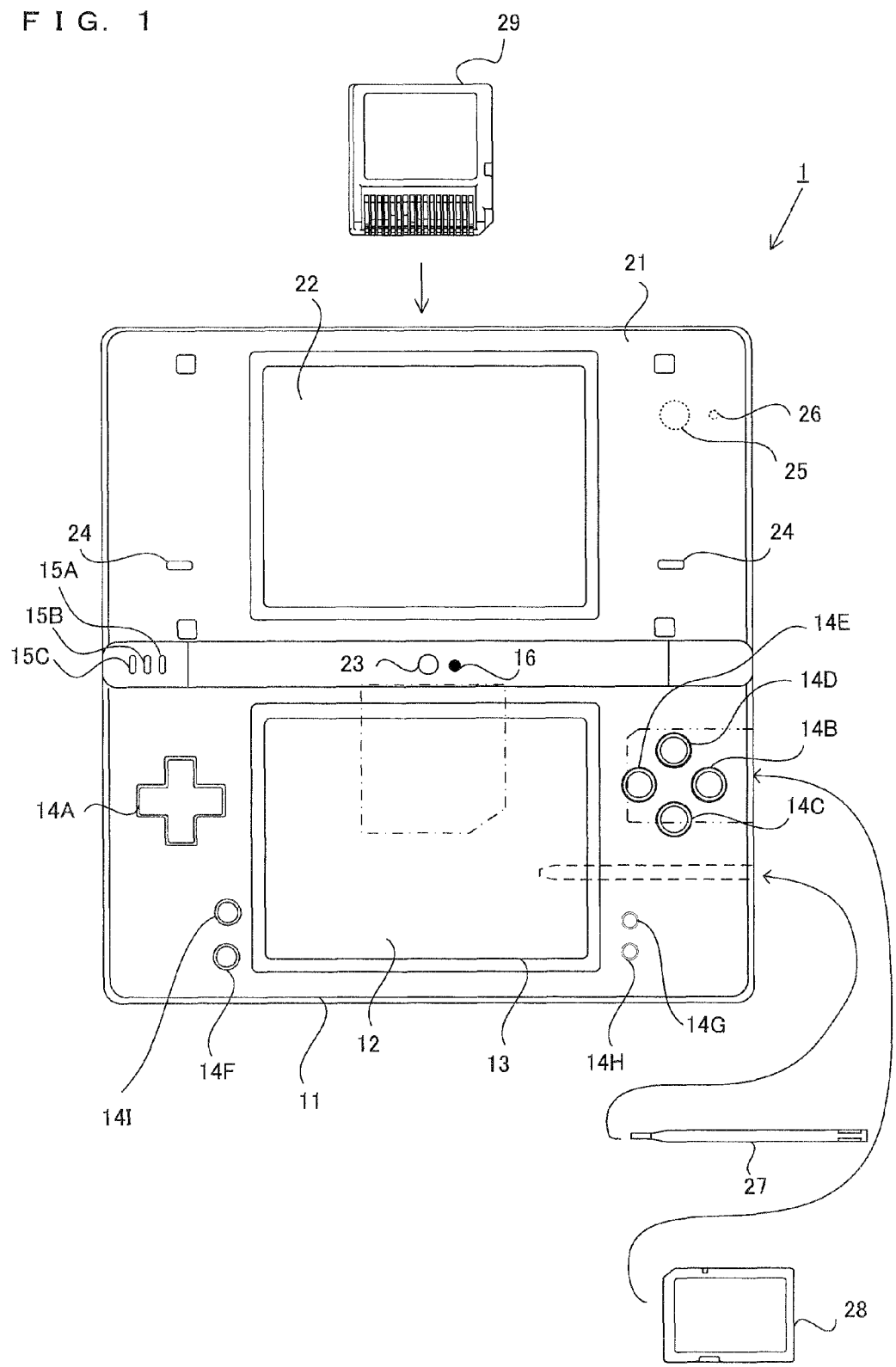
FIG. 1 is an external view of a game apparatus 1 according to a first embodiment of the present invention.

FIG. 1 shows an example of a hand-held game apparatus (hereinafter, referred to merely as a game apparatus) which is an example of a portable terminal according to the present invention. In FIG. 1, the game apparatus 1 is a foldable hand-held game apparatus in an opened state. The game apparatus 1 is configured to have such a size as to be held by a user with both hands or one hand in the opened state.

The game apparatus 1 includes a lower housing 11 and an upper housing 21. The lower housing 11 and the upper housing 21 are connected to each other so as to be capable of being opened or closed (foldable). In the example of FIG. 1, the lower housing 11 and the upper housing 21 are each formed in a plate-like shape of a horizontally long rectangle, and foldably connected to each other at long side portions thereof. Unusually, the user uses the game apparatus 1 in the opened state. When not using the game apparatus 1, the user keeps the game apparatus 1 in a closed state. In the example shown in FIG. 1, in addition to the closed state and the opened state, the game apparatus 1 is capable of maintaining an angle between the lower housing 11 and the upper housing 21 at any angle ranging between the closed state and the opened state by frictional force generated at a connection portion and the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side direction thereof corresponds to a long side direction of the lower housing 11. Note that although an LCD is used as a display device provided in the game apparatus 1 in the present embodiment, any other display devices such as a display device using an EL (Electro Luminescence) and the like may be used. In addition, the game apparatus 1 can use a display device of any resolution. Although details will be described below, the lower LCD 12 is used mainly for displaying an image taken by an inner camera 23 or an outer camera 25 in real time.

In the lower housing 11, operation buttons 14A to 14L and a touch panel 13 are provided as input devices. As shown in FIG. 1, among the operation buttons 14A to 14L, the direction input button 14A, the operation button 14B, the operation button 14C, the operation button 14D, the operation button 14E, the power button 14F, the home button 14I, the start button 14G, and the select button 14H are provided on an inner main surface of the lower housing 11 which is located inside when the upper housing 21 and the lower housing 11 are folded. The direction input button 14A is used, for example, for a selection operation and the like. The operation buttons 14B to 14E are used, for example, for a determination operation, a cancellation operation, and the like. The power button 14F is used for changing a power control mode of the game apparatus 1. Although details will be described below, there are a "normal power mode" and a "sleep mode" as power control modes in the present embodiment. The home button 14I is used for returning to a menu screen when an application such as a game is executed. In the example shown in FIG. 1, the direction input button 14A and the home button 14I are provided on the inner main surface of the lower housing 11 and on one of a left side and a right side (on the left side in FIG. 1) of the lower LCD 12 provided in the vicinity of the center of the inner main surface of the lower housing 11. Further, the operation buttons 14B to 14E, the start button 14G, and the select button 14H are provided on the inner main surface of the lower housing 11 and on the other of the left side and the right side (on the right side in FIG. 1) of the lower LCD 12. The direction input button 14A, the operation buttons 14B to 14E, the start button 14G, and the select button 14H are used for performing various operations on the game apparatus 1.

Note that the operation buttons 14J to 14L are omitted in FIG. 1. For example, the L button 14J is provided at a left end of an upper surface of the lower housing 11, and the R button 14K is provided at a right end of the upper surface of the lower housing 11. The L button 14J and the R button 14K are used, for example, for performing a photographing instruction operation (shutter operation) on the game apparatus 1. In addition, the volume button 14L is provided on a left side surface of the lower housing 11. The volume button 14L is used for adjusting volume of speakers of the game apparatus 1.

The game apparatus 1 further includes the touch panel 13 as another input device in addition to the operation buttons 14A to 14L. The touch panel 13 is mounted on the lower LCD 12 so as to cover the screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as that of the lower LCD 12. However, the resolution of the touch panel 13 and that of the lower LCD 12 may not necessarily be the same. In a right side surface of the lower housing 11, an insertion opening (indicated by a dashed line in FIG. 1) is provided. The insertion opening is capable of accommodating a touch pen 27 which is used for performing an operation on the touch panel 13. Although an input onto the touch panel 13 is usually performed using the touch pen 27, in addition to the touch pen 27, a finger of the user can be used for operating the touch panel 13.

In the right side surface of the lower housing 11, an insertion opening (indicated by a two-dot chain line in FIG. 1) is formed for accommodating a memory card 28. Inside the insertion opening, a connector (not shown) is provided for electrically connecting the game apparatus 1 to the memory card 28. The memory card 28 is, for example, an SD (Secure Digital) memory card, and detachably mounted on the connector. The memory card 28 is used, for example, for storing an image taken by the game apparatus 1, and loading an image generated by another apparatus into the game apparatus 1.

Further, in the upper surface of the lower housing 11, an insertion opening (indicated by a chain line in FIG. 1) is formed for accommodating a cartridge 29. Inside the insertion opening, a connector (not shown) is provided for electrically connecting the game apparatus 1 to the cartridge 29. The cartridge 29 is a storage medium having stored thereon a game program and the like, and detachably mounted in the insertion opening provided in the lower housing 11.

Three LEDs 15A to 15C are mounted on a left side part of the connection portion where the lower housing 11 and the upper housing 21 are connected to each other. The game apparatus 1 is capable of performing wireless communication with another apparatus, and the first LED 15A is lit up while the power of the game apparatus 1 is ON. The second LED 15B is lit up while the game apparatus 1 is being charged. The third LED 15C is lit up while wireless communication is established. Thus, by the three LEDs 15A to 15C, a state of ON/OFF of the power of the game apparatus 1, a state of charge of the game apparatus 1, and a state of communication establishment of the game apparatus 1 can be notified to the user.

Meanwhile, in the upper housing 21, an upper LCD 22 is provided. The upper LCD 22 has a horizontally long shape, and is located such that a long side direction thereof corresponds to a long side direction of the upper housing 21. In a similar manner to that of the lower LCD 12, a display device of another type having any resolution may be used instead of the upper LCD 22. A touch panel may be provided so as to cover the upper LCD 22. On the upper LCD 22, for example, an operation explanation screen for teaching the user roles of the operation buttons 14A to 14L and the touch panel 13 is displayed.

In the upper housing 21, two cameras (the inner camera 23 and the outer camera 25) are provided. As shown in FIG. 1, the inner camera 23 is mounted in an inner main surface in the vicinity of the connection portion of the upper housing 21. On the other hand, the outer camera 25 is mounted in a surface opposite to the surface in which the inner camera 23 is mounted, namely, in an outer main surface of the upper housing 21 (which is the surface located on the outside of the game apparatus 1 in the closed state, and the back surface of the upper housing 21 shown in FIG. 1). In FIG. 1, the outer camera 25 is indicated by a dotted line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. In other words, in the present embodiment, the two cameras 23 and 25 are provided such that the imaging directions thereof are opposite to each other. For example, the user can take an image of a view seen from the game apparatus 1 toward the user with the inner camera 23 as well as an image of a view seen from the game apparatus 1 in a direction opposite to the user with the outer camera 25.

In the inner main surface in the vicinity of the connection portion, a microphone (a microphone 44 shown in FIG. 2) is accommodated as a voice input device. In the inner main surface in the vicinity of the connection portion, a microphone hole 16 is formed to allow the microphone 44 to detect sound outside the game apparatus 1. The accommodating position of the microphone 44 and the position of the microphone hole 16 are not necessarily in the connection portion. For example, the microphone 44 may be accommodated in the lower housing 11, and the microphone hole 16 may be formed in the lower housing 11 so as to correspond to the accommodating position of the microphone 44.

In the outer main surface of the upper housing 21, a fourth LED 26 (indicated by a dashed line in FIG. 1) is mounted. The fourth LED 26 is lit up at a time when photographing is performed with the outer camera 25 (when the shutter button is pressed). Further, the fourth LED 26 is lit up while a moving picture is being taken by the outer camera 25. By the fourth LED 26, it is notified to an object person whose image is taken and people around the object person that photographing is performed (being performed) by the game apparatus 1.

Sound holes 24 are formed in the inner main surface of the upper housing 21 and on left and right sides, respectively, of the upper LCD 22 provided in the vicinity of the center of the inner main surface of the upper housing 21. The speakers are accommodated in the upper housing 21 and at the back of the sound holes 24. The sound holes 24 serve to release sound from the speakers to the outside of the game apparatus 1 therethrough.

As described above, the inner camera 23 and the outer camera 25 which are components for taking an image, and the upper LCD 22 which is display means for displaying, for example, an operation explanation screen at the time of photographing are provided in the upper housing 21. On the other hand, the input devices for performing an operation input on the game apparatus 1 (the touch panel 13 and the buttons 14A to 14L), and the lower LCD 12 which is display means for displaying a game screen are provided in the lower housing 11. Accordingly, when using the game apparatus 1, the user can hold the lower housing 11 and perform an input on the input device while seeing a taken image (an image taken by one of the cameras) displayed on the lower LCD 12.

Figure 2:
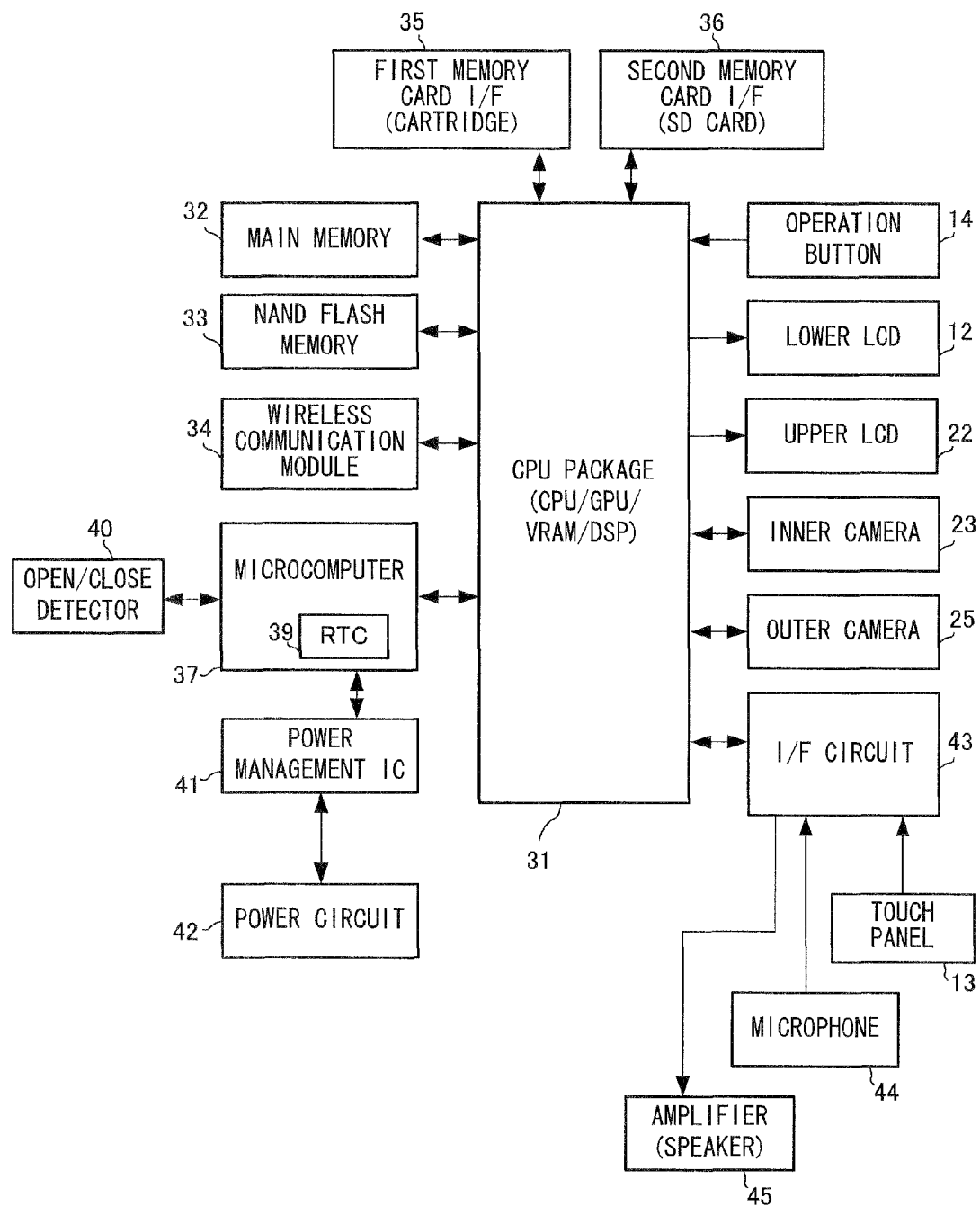
FIG. 2 is a block diagram of the game apparatus 1 according to the first embodiment of the present invention.

Now, an internal configuration of the game apparatus 1 will be described with reference to FIG. 2. FIG. 2 is a block diagram showing an example of the internal configuration of the game apparatus 1.

As shown in FIG. 2, the game apparatus 1 includes electronic components including a CPU package 31, a main memory 32, a NAND flash memory 33, a wireless communication module 34, a first memory card interface (memory card I/F) 35, a second memory card I/F 36, a microcomputer 37, an open/close detector 40, a power management IC 41, a power circuit 42, and an interface circuit (I/F circuit) 43. These electronic components are mounted on an electronic circuit substrate and accommodated in the lower housing 11 (or may be accommodated in the upper housing 21).

In the CPU package 31, a CPU which is information processing means for executing predetermined programs is provided. In the present embodiment, the CPU has two cores therein (is a so-called dual core processor), and causes: one of the two cores to mainly perform a process concerning system control; and the other core to mainly perform a process concerning execution of applications. In addition, in the CPU package 31, a GPU (Graphics Processor Unit), a DSP (Digital Signal Processor) and a VRAM (Video RAM) are provided. Moreover, an internal main memory and the like are also provided therein. Although not shown, these components are connected to each other via an internal bus in the CPU package 31 (namely, integrated into a single chip). Note that these components may not be integrated into a single chip, and the number of the cores of the CPU is not limited to two.

The GPU is a part of rendering means, and generates an image in accordance with a graphics command (image generation command) from the CPU. The VRAM stores necessary data (data such as polygon data, texture data, and the like) for the GPU to execute the graphics command. When an image is generated, the GPU generates image data using data stored in the VRAM.

The DSP acts as an audio processor, and generates audio data by using sound data and sound waveform (tone) data stored in the internal main memory and in the main memory 32.

In the following description, the CPU package 31 is referred to merely as CPU 31.

A program executed by the CPU 31 may be stored previously in the NAND flash memory 33 within the game apparatus 1, may be obtained from the memory card 28 and/or the cartridge 29, or may be obtained from another apparatus by means of communication with the other apparatus. For example, a program may be obtained by means of downloading via the Internet from a predetermined server, or may be obtained by downloading a predetermined program stored in a stationary game apparatus through communication therewith.

The main memory 32, the NAND flash memory 33, and the wireless communication module 34 are connected to the CPU 31. The main memory 32 is storage means used as a work area and a buffer area of the CPU 31. In the present embodiment, for example, a PSRAM (Pseudo-SRAM) is used as the main memory 32.

The NAND flash memory 33 is formed of a nonvolatile storage medium. In addition, a memory control circuit (not shown) controls reading of data from the NAND flash memory 33 or writing of data to the NAND flash memory 33 in accordance with an instruction from the CPU 31.

The wireless communication module 34 functions to connect to a wireless LAN, for example, by a method conforming to the standard of IEEE802.11.b/g (this method is used for later-described "Internet communication"). In addition, the wireless communication module 34 functions to wirelessly communicate with a game apparatus of the same type by a predetermined communication method (this method is used for later-described "local communication"). The wireless communication module 34 is connected to the CPU 31. The CPU 31 is capable of receiving data from and transmitting data to another apparatus via the Internet using the wireless communication module 34, and is capable of receiving data from and transmitting data to another game apparatus of the same type using the wireless communication module 34. Further, although not shown, the wireless communication module 34 has a microcomputer chip which performs a predetermined process during a later-described sleep mode.

The first memory card I/F 35 is connected to the CPU 31. The first memory card I/F 35 reads out data from the cartridge 29 mounted to the connector or writes data to the cartridge 29 in accordance with an instruction from the CPU 31. For example, an application program executable by the game apparatus 1 is read out from the cartridge 29 and executed by the CPU 31, and data concerning the application program (e.g. saved data and the like) is written to the cartridge 29.

The second memory card I/F 36 is connected to the CPU 31. The second memory card I/F 36 reads out data from the memory card 28 mounted to the connector or writes data to the memory card 28 in accordance with an instruction from the CPU 31. For example, data of an image taken by the outer camera 25 is written to the memory card 28, and image data stored in the memory card 28 is read from the memory card 28 and stored in the NAND flash memory 33.

The microcomputer 37 is connected to the CPU 31. The microcomputer 37 performs processes such as a process concerning power management of the game apparatus 1, a process concerning time, a process of detecting opening or closing of the housing. In addition, the microcomputer 37 receives a notification concerning these processes from the CPU 31, and also gives a notification to the CPU 31. The microcomputer 37 has a real time clock (RTC) 39. The RTC 39 counts a time, and outputs the time to the CPU 31 via the microcomputer 37. For example, the CPU 31 is capable of calculating a current time (date) and the like on the basis of the time counted by the RTC 39.

The microcomputer 37 is also connected to the open/close detector 40 and the power management IC 41. The power management IC 41 is further connected to the power circuit 42. The open/close detector 40 detects opening or closing of the housing, and notifies the detection result to the microcomputer 37 (further to the CPU 31). The power management IC 41 receives a notification of shift to the sleep mode or cancellation of the sleep mode, from the microcomputer 37 (from the CPU 31 via the microcomputer 37). Then, the power management IC 41 performs control for appropriately supplying power, on the basis of the notification. The power circuit 42 controls power supplied from a power supply (typically, a battery accommodated in the lower housing 11) of the game apparatus 1 to supply the power to each component of the game apparatus 1.

Now, the power control mode of the game apparatus 1 according to the present embodiment will be described. After the power supply such as a battery is mounted to the game apparatus 1 so as to allow power to be supplied to each component, the game apparatus 1 basically operates in any one of the two power control modes which are the "normal power mode" and the "power saving mode". The "normal power mode" is a state where power is supplied to all the components. For example, when the user operates the game apparatus 1 and plays a predetermined game, or when the user operates various applications, the power control mode is the "normal power mode". The "power saving mode" is a state where power supply to only some of the components is continued and power supply to the other components is stopped. In the present embodiment, the "power saving mode" includes a "sleep mode". The "sleep mode" is a state where power is supplied to only the microcomputer 37 and the wireless communication module 34 and power supply to the other components such as the CPU 31 and the LCDs is stopped (note that the CPU 31 is capable of receiving an instruction for cancelling the "sleep mode"). Further, in the "sleep mode", the microcomputer 37 and the wireless communication module 34 repeatedly perform processes called "microcomputer process" and "wireless module process", respectively, in a cycle of a predetermined time period. These processes will be described in detail later.

In the present embodiment, in addition to the method of shifting to the sleep mode and cancelling the sleep mode on the basis of the detection result of the open/close detector 40 as described above, it is possible to change the power control mode between the "normal power mode" and the "sleep mode" in accordance with an operation of the power button 14F. Moreover, in addition to an operation of the power button 14F, it is possible to automatically cancel the "sleep mode" or shift to the "sleep mode" by a process as will be described later. For example, after the user finishes playing a predetermined game, if the user presses the power button 14F (it seems to the user that this operation is an operation to turn off the power), the game apparatus 1 shifts to the "sleep mode". In this state, the user can close and carry the game apparatus 1. Then, if the user opens the game apparatus 1 and presses the power button 14F again, the "sleep mode" is cancelled and the game apparatus 1 shifts to the "normal power mode". Alternatively, the game apparatus 1 may shift to the "sleep mode" when a predetermined time period elapses from the last operation.

Note that, in addition to the "sleep mode", as one "power saving mode", a "monitor off mode" is possible, in which power supply to only each LCD is stopped. In this case, power is supplied to the CPU 31 and the main memory 32 (note that the power may be supplied to only the CPU cores and the internal memory within the CPU 31 and may not be supplied to the GPU). Further, by pressing the power button 14F for a predetermined time period or longer, it is possible to shift to a "complete stop mode" in which power supply to all the components including the microcomputer 37 and the wireless communication module 34 is stopped (namely, the power is completely turned off). In this case, if the power button 14F is pressed for the predetermined time period or longer, the game apparatus 1 shifts to the "normal power mode" and is started.

Here, in view of whether or not the user is using the game apparatus 1, the power control mode can be rephrased as follows. That is, the game apparatus 1 has two states, namely, a "used state" and an "unused state". The "used state" is a state where the normal power mode continues since the user opens the housing of the game apparatus 1 and directly uses the game apparatus 1. For example, a state where the user plays a game or the like by operating the operation button 14 or the like, corresponds to this state. On the other hand, the "unused state" is a state where the user does not independently and directly use the game apparatus 1. The "unused state" also includes a state where the power control mode is the "sleep mode" since the housing is closed, as well as a state where, in execution of a task as will be described later, the "sleep mode" is temporarily cancelled (while the housing is closed), a process concerning the task is performed, and the game apparatus 1 returns to the "sleep mode" after the execution of the task. For example, a state where the user closes the housing of the game apparatus 1 and the game apparatus 1 is put in a bag when the user goes out, is the "unused state". Further, as described above, a state where the "sleep mode" is temporarily cancelled while the game apparatus 1 is put in the bag and the user goes out, and a state where the game apparatus 1 shifts to the "sleep mode" again after execution of a task (in this state, the user does not use the game apparatus 1), are also the "unused state". Further, in addition to opening or closing of the housing, the trigger for changing the state of the game apparatus 1 between the "used state" and the "unused state" also includes an operation of the power button 14F. In other words, the user has been playing a game (used state), and, then, by the user pressing the power button 14F of the game apparatus 1 after finishing the game play, the state of the game apparatus 1 is changed from the "used state" to the "unused state". Further, for example, when the user has not performed an operation for a constant time period, the state of the game apparatus 1 may be changed from the "used state" to the "unused state".

In the following description, for simplification of explanation, the power control mode will be described using an example where only the "normal power mode" and the "sleep mode" are used.

The game apparatus 1 includes the microphone 44 and an amplifier 45. The microphone 44 and the amplifier 45 are connected to the I/F circuit 43. The microphone 44 detects voice produced by the user toward the game apparatus 1, and outputs a sound signal indicating the voice to the I/F circuit 43. The amplifier 45 amplifies the sound signal from the I/F circuit 43, and causes the speakers (not shown) to output the sound signal. The I/F circuit 43 is connected to the CPU 31.

The touch panel 13 is connected to the I/F circuit 43. The I/F circuit 43 includes a sound control circuit for controlling the microphone 44 and the amplifier 45 (the speakers), and a touch panel control circuit for controlling the touch panel 13. The sound control circuit performs A/D conversion or D/A conversion of the sound signal, and converts the sound signal into sound data in a predetermined format. The touch panel control circuit generates touch position data in a predetermined format based on a signal from the touch panel 13, and outputs the touch position data to the CPU 31. For example, the touch position data is data indicating coordinates of a position at which an input is performed on an input surface of the touch panel 13. The touch panel control circuit reads a signal from the touch panel 13 and generates touch position data every predetermined period of time. The CPU 31 is capable of recognizing a position at which an input is performed on the touch panel 13, by obtaining the touch position data via the I/F circuit 43.

An operation button 14 includes the above operation buttons 14A to 14L, and is connected to the CPU 31. The operation button 14 outputs operation data indicating an input state of each of the buttons 14A to 14L (whether or not each button is pressed) to the CPU 31. The CPU 31 obtains the operation data from the operation button 14, and performs processing in accordance with an input performed onto the operation button 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. In the present embodiment, the CPU 31 gives an imaging instruction to the inner camera 23 or the outer camera 25, and the camera which has received the imaging instruction takes an image and transmits image data to the CPU 31.

The lower LCD 12 and the upper LCD 22 are connected to the CPU 31. Each of the lower LCD 12 and the upper LCD 22 displays an image thereon in accordance with an instruction from the CPU 31.

The following will describe an outline of a process assumed in the present embodiment.

[Entire Configuration of Network]

Figure 3:
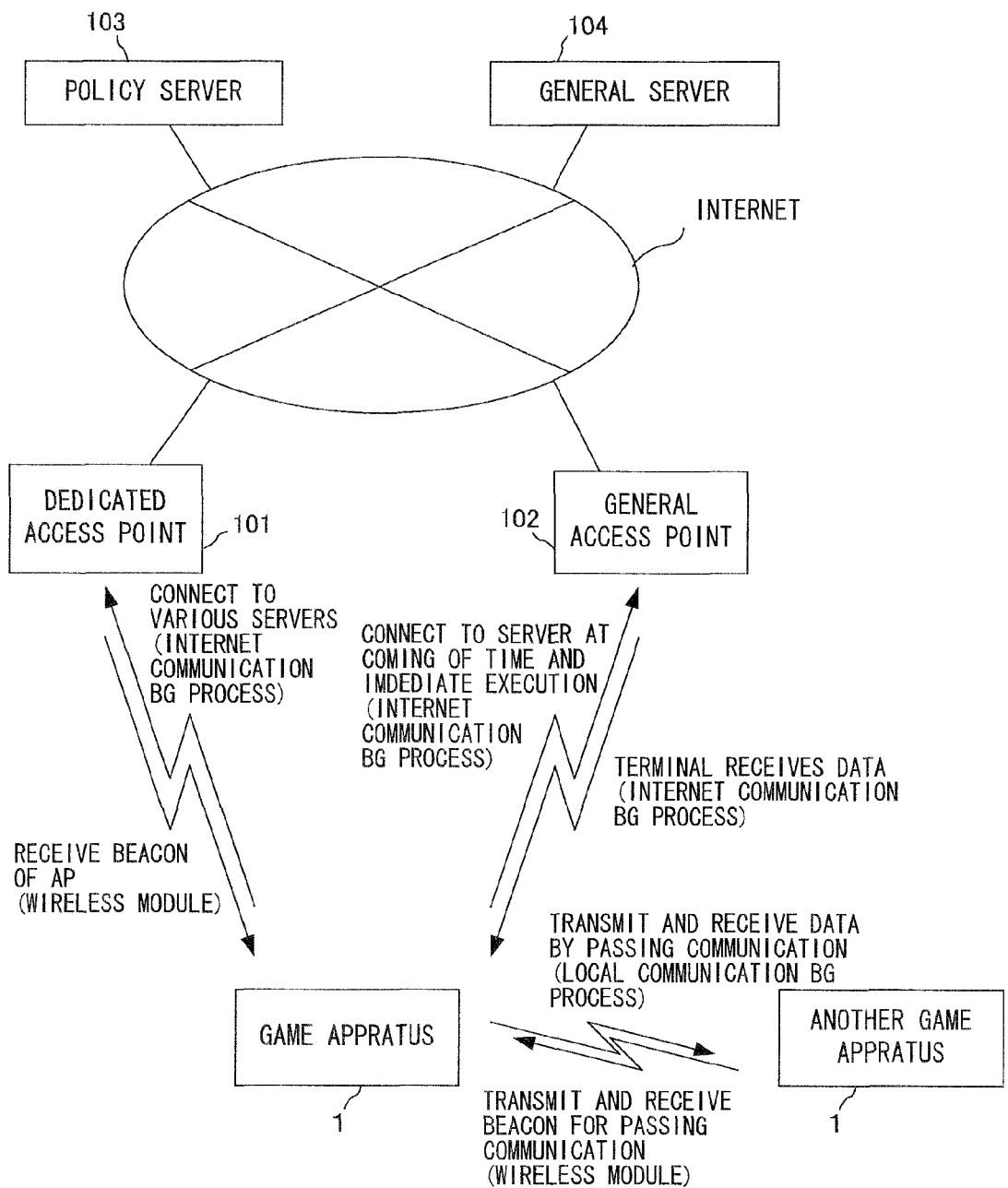
FIG. 3 is a schematic diagram showing the entirety of a network configuration according to the first embodiment.

First, the entire configuration of a network assumed in the present embodiment will be described. FIG. 3 is a schematic diagram showing the entirety of the network configuration according to the present embodiment. The game apparatus 1 shown in FIG. 3 uses two main types of communication modes. A first communication mode is "Internet communication" in which the Internet is used. A second communication mode is "local communication" in which game apparatuses are wirelessly connected directly to each other not via the Internet.

[Internet Communication]

First, the "Internet communication" will be described. In the "Internet communication", the game apparatus 1 connects to an access point (hereinafter, referred to as AP) by the above-described method conforming to the standard of IEEE802.11, and connects to the Internet via the AP. Further, the game apparatus 1 communicates with a predetermined server via the Internet.

In the present embodiment, the AP is classified into two main types, specifically into two types of a dedicated AP 101 and a general AP 102 in FIG. 3. In the present embodiment, the dedicated AP 101 is, for example, an AP which is managed by the manufacturer of the game apparatus 1. In other words, the manufacture of the game apparatus 1 know and manages the location and the configuration of each dedicated AP, and the like. Such dedicated APs are set at specific places such as electronics retail stores and fast food restaurants. On the other hand, in the present embodiment, the general AP 102 refers to an AP in general other than the dedicated AP. For example, the general AP 102 corresponds to an AP which is set at user's home, or an AP which is set by a company other than the manufacture of the game apparatus 1.

In each AP, a so-called ESSID and a frequency channel at which the AP emits electric waves are previously set and stored in a storage medium (e.g., a flash memory or the like) of each AP. In addition, in the dedicated AP 101, later-described vendor specific information is further stored, and a beacon including the contents of this information is transmitted.

Further, in the present embodiment, the server is also classified into two main types, specifically into two types of a policy server 103 and a general server 104 in FIG. 3. The policy server 103 is a dedicated server for obtaining data called "policy data". In the present embodiment, the game apparatus 1 obtains data called "policy data" from the policy server 103, and performs processes on the basis of the data. These processes will be described later. The general server 104 is a server other than the policy server 103. Note that each server includes an arithmetic processing section such as a CPU, a storage section such as a memory or an HDD, and a communication section for connecting to the Internet (these components are not shown).

The reason why the dedicated AP is set in the present embodiment as described above, is that, concerning the "policy data", it is made possible to define "policy data" corresponding to the dedicated AP. In other words, the reason is that, when the game apparatus 1 accesses a policy server via a specific AP, it is made possible to use "policy data" corresponding to the AP used for the connection (the place at which the AP is set).

[Local Communication]

The following will describe the "local communication" which is the other communication mode. In the "local communication", a direct connection is established between game apparatuses 1, and the game apparatuses 1 communicate with each other. In the example of FIG. 3, communication between a game apparatus 1 and another game apparatus 1 corresponds to the "local communication".

With the network configuration and the communication modes as described above, the following process is mainly performed in the present embodiment. First, as a process using the "Internet communication", there is a process of executing a task. The task in the present embodiment refers to a process which involves transmitting and receiving predetermined data. Specifically, the task is classified into two types of a "transmission task" and a "reception task". However, in the following description, these tasks may collectively be referred to merely as task. Since the task in the present embodiment is a process which involves transmitting and receiving predetermined data as described above, data indicating the contents of the task includes the URL of a server which is a connection destination, and the like. Examples of the task in the present embodiment will be given below. First, there is a task of "receiving announcement data" for the purpose of notifying an announcement such as a campaign from the provider of a network service to the user. The "announcement data" can be caused to include a notification that a predetermined network service is ended. In such a case, a task concerning a network application which is related to the ended service, is deleted. Further, for a process concerning a game, for example, the case is assumed where a national convention of a racing game is held during a certain period. During the period, there are tasks of "transmitting racing data" and "receiving current ranking data" for the purpose of periodically entering user's racing data into a national ranking (in such a case, the two tasks, "transmission task" and "reception task", are executed).

Further, there is a task of "confirming additional contents". This is a task assuming the case where an additional scenario of a RPG or the like is distributed, and there is such a task of "receiving information indicating presence/absence of additional contents". If additional contents are present as a result of the task, the data is downloaded.

Further, in the present embodiment, as another task, there is a task of "obtaining an installation list". The task is a task which is previously set as a setting before shipment of the game apparatus 1. The installation list includes, for example, information concerning update of system data, each application, and each game program (hereinafter, applications and games are collectively referred to merely as application), and information indicating presence of a free application or a trial version of a new application. Note that, concerning such update, the free application, and the trial version, in the present embodiment, the presence/absence of such items is confirmed, and downloading and installation processes of update data and a trial version program are also performed (such a installation process will be described in detail later).

As described above, the task in the present embodiment is a process of connecting to a predetermined server and transmitting and receiving predetermined data, and such a task is generated as appropriate and executed. Timings of executing the task include three main types as follows.

(1) Time designated execution
(2) Immediate execution
(3) Execution when the dedicated AP is involved.

Processes performed at these three types of timings will be described later.

The following will describe a process using the "local communication". As described above, in the "local communication", the game apparatuses 1 wirelessly connect to each other and communicate with each other. Thus, the "local communication" is used for various situations such as a communication competitive game. However, in the present embodiment, a description will be given, in particular, on the premise that the "local communication" is communication called "passing communication" which will be described later.

The following will describe the three types of execution timings of a task executed in the above-described "Internet communication", and a process outline thereof. Prior to this description, a parameter of "execution priority" which is set for the task, and a parameter of "number of uses" which is set for the task, will be described. The execution priority indicates a priority of execution of the task, and when there are tasks which are to be executed at the same timing, the execution priority is used for determining the execution order of the tasks. In the present embodiment, the execution priority is defined by using five levels. Specifically, the five levels are "EXPEDITE", "HIGH", "MEDIUM", "LOW", and "STOPPED", and the priority is high in this order. Among them, "EXPEDITE" indicates a highest execution priority. In addition, "STOPPED" indicates that the task is not executed. In other words, the execution priority "STOPPED" is used when a task itself is present but is not desired to be executed. "HIGH" indicates a high priority, "MEDIUM" indicates a standard priority, and "LOW" indicates a low priority. In the present embodiment, basically, the execution priority of a task is set by using "HIGH", "MEDIUM", and "LOW". The other two execution priorities, "EXPEDITE" and "STOPPED", are used for special circumstances. For example, when system update of the game apparatus 1 is desired to be urgently performed, the execution priority of a task concerning the system update is set as "EXPEDITE". Further, for example, it is assumed that a national convention of a racing game as described above is held once a year. In this case, during a period when the national convention is held, the execution priority of a task of transmitting user's racing data and receiving a ranking data is set as appropriate by using "HIGH", "MEDIUM", and "LOW". On the other hand, after end of the national convention, execution of the task is stopped by setting the execution priority of the task as "STOPPED". Then, when the national convention is started again one year later, the execution priority of the task is set as appropriate by using "HIGH", "MEDIUM", and "LOW", so that it is possible to execute the task only during the period of the national convention.

The following will describe the number of uses. When the task is generated, a predetermined numerical value is set as an initial value for the number of uses. The number of uses is decreased, for example, by 1, each time the task is executed. In addition, each time a game or the like corresponding to the task is started, the number of uses is reset to be the initial value. Then, a task whose number of uses becomes 0 (in other words, it indicates that the game or the like corresponding to such a task has not been executed for a long time period) is not executed regardless of the execution priority thereof (the task itself is not deleted).

As described above, in the present embodiment, execution control of tasks are possible by using parameters for the execution control of tasks, which are the execution priority and the number of uses. In addition, these parameters for the execution control are changeable by later-described policy data.

The following will describe the three types of execution timings of a task executed in the above-described "Internet communication" and a process outline thereof, on the basis of the execution priority and the number of uses.

[Time Designated Execution]

First, in the time designated execution, when the task is generated, an execution time is designated for the task. At coming of the designated time, the task is executed. The time designated execution is carried out even during the "sleep mode". In addition, depending on the contents of a task, a later-described installation process may be performed. Thus, in the present embodiment, the following operation is possible.

Figure 4:
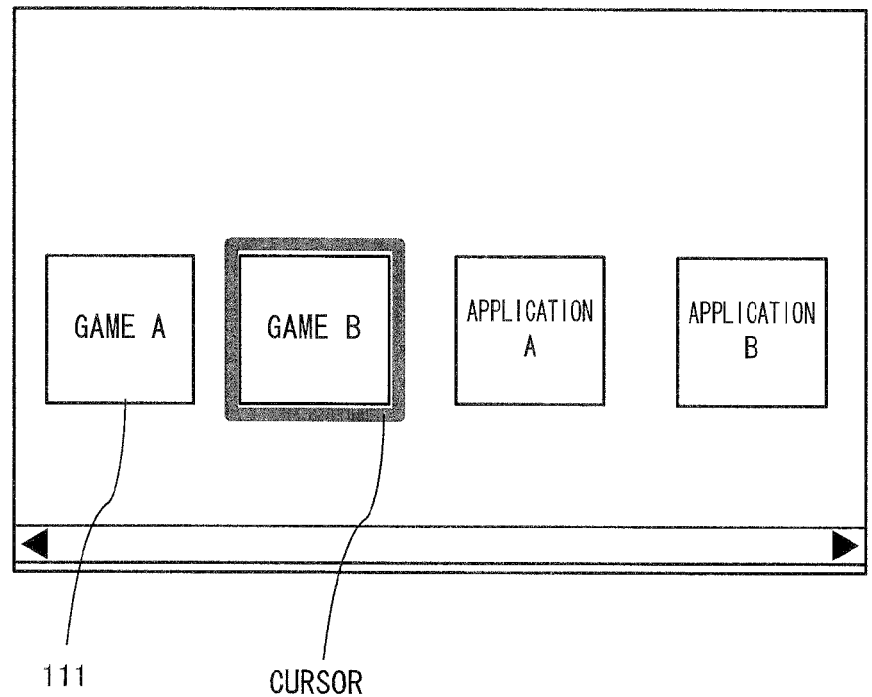
FIG. 4 shows an example of a menu screen.

For example, an assumption is made as follows. When the game apparatus 1 is in the normal power mode, a task of "confirming presence/absence of a new free game" is generated in accordance with an operation of the user, or the like (URL information of a server which is a confirmation destination is included in data of the task as described above). In this case, a scheduled execution time of the task is 15:00. Then, the user presses the power button 14F of the game apparatus 1 to shift to the "sleep mode", and goes out, for example, around 12:00 with the game apparatus 1. At this time, a menu screen has been displayed on the game apparatus 1 as shown in FIG. 4 immediately before shifting to the "sleep mode".

Figure 5:
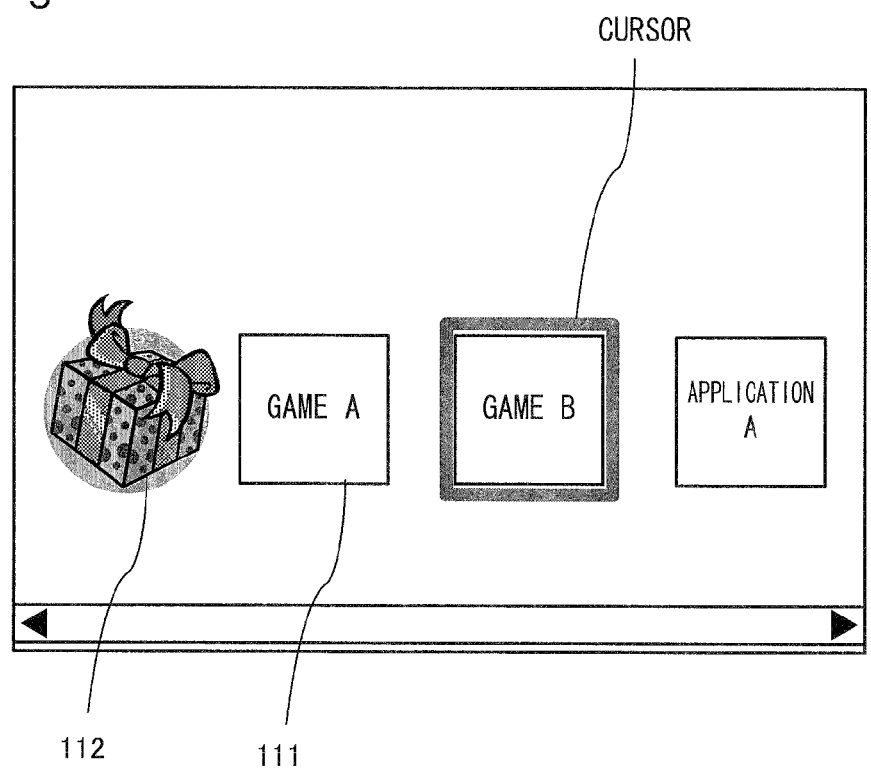
FIG. 5 shows another example of the menu screen.

Then, at 15:00, the game apparatus 1 attempts to execute the task. In other words, at 15:00, first, the game apparatus 1 restarts power supply to the CPU 31 and the main memory 32. Then, in order to connect to the Internet, the game apparatus 1 starts searching for a connectable AP. Here, the game apparatus 1 searches for a general AP 102 whose ESSID or the like is previously registered on a setting screen or the like. When a connectable AP is found, the game apparatus 1 connects to the policy server 103 via the AP. Then, the game apparatus 1 obtains "policy data" from the policy server 103. Although details will be described later, the policy data includes information which defines the execution priority of the task, namely, a parameter for the execution control of the task. Note that it is difficult to define different policy data for each general AP, but it is possible to cause policy data common to general APs to be obtained, and it is also possible to cause different policy data to be obtained, depending on country information which is set in the game apparatus 1, or the like. Then, the game apparatus 1 connects to the server in accordance with the URL information included in the task, and obtains data indicating presence/absence of a new free game. Next, the game apparatus 1 determines whether or not a new free game is present, on the basis of the data, and when the free game is present, the game apparatus 1 connects to a predetermined server in which the program of the free game is stored. Then, the game apparatus 1 obtains data of the free game and installs the free game therein. Thereafter, the game apparatus 1 stops power supply to the CPU 31. As a result, for example, when the user comes back home at 18:00 and turns on the game apparatus 1 (to shift from the sleep mode to the normal power mode), a menu is displayed as shown in FIG. 5, in which a present icon 112 indicating that there is a newly installed application is added. Then, if the user selects the present icon 112 and presses a predetermined button, an animation effect of opening a present box is displayed, and then an icon indicating the new free game installed at this time is displayed so as to replace the present icon 112.

Further, the following operation is also possible in the present embodiment. For example, an assumption is made as follows. Concerning an installed game, a task of "confirming presence/absence of additional contents" is generated. A scheduled execution time of the task is 15:00 similarly to the above. Then, similarly to the above, the user causes the game apparatus 1 to shift to the sleep mode and goes out around 12:00 with the game apparatus 1. Thereafter, the task is executed around 15:00, and additional contents of a game, here, additional contents of a game indicated by an icon 111 in FIG. 4 (e.g., an additional scenario of an RPG) are downloaded. In such a case, when the user comes back home at 18:00 and causes the game apparatus 1 to shift from the sleep mode to the normal power mode, a mark "New!" indicating presence of the additional contents is displayed near the icon 111. This mark notifies the user of arrival of new contents concerning the game indicated by the icon 111.

By the process as described above, the contents of the menu of the game apparatus 1 can be different between before the user goes out and after the user comes back.

Naturally, the time designated execution is also possible in the "normal power mode". For example, even when the user does not go out and plays a game at home around 15:00, the game apparatus 1 may obtain and install a free game as described above (i.e., as a background process) in parallel with processing of the game. In this case, when a shift to the menu screen is performed after the user finishes playing the game, the user notices that the present icon 112 (i.e., some sort of a new software element) is added to the menu without realizing it.

Note that, when a situation occurs which results in a plurality of tasks being executed at the same time, the execution order of each task is determined as appropriate on the basis of the execution priority.

[Immediate Execution]

The following will describe the immediate execution of the task. In the immediate execution, a task is executed immediately in accordance with an instruction of the user, or the like. For example, it is the case where the user manually makes an instruction to execute a predetermined task.

[Task Execution when Dedicated AP is Involved]

The following will describe task execution when a dedicated AP is involved. As described above, since power is supplied to the wireless communication module 34 even in the "sleep mode", the wireless communication module 34 always operates unless the power is completely turned off. Thus, in the present embodiment, in either the "normal power mode" or the "sleep mode", the wireless communication module 34 repeatedly performs scan (i.e., passive scan) of a beacon. Here, a beacon transmitted from the above dedicated AP 101 includes information indicating that the AP 101 is managed by the manufacture of the game apparatus 1. For example, such information (hereinafter, referred to as vendor specific information) is included in "Vendor Specific" which is defined in the standard of IEEE802.11 and which is one of information elements of the beacon. In the present embodiment, using the vendor specific information of the beacon, it is determined whether or not the beacon is a beacon transmitted from the dedicated AP. In other words, it is determined whether or not the user (carrying the game apparatus 1) is near the dedicated AP 101. As a result, when it is determined that the beacon is the beacon transmitted from the dedicated AP 101, the game apparatus 1 establishes a connection to the dedicated AP 101 and further connects to the policy server 103 via the Internet. Then, the game apparatus 1 obtains the "policy data" from the policy server 103. Although details will be described later, the policy data includes information which defines the execution priority of the task. In addition, as described above, in the present embodiment, it is possible to define different policy data for each dedicated AP. For example, when the game apparatus 1 connects to the policy server 103 via a dedicated AP 101 which is set at a store A, "policy data A" is obtained, and when the game apparatus 1 connects to the policy server 103 via a dedicated AP 101 which is set at a store B, "policy data B" is obtained. In this case, for example, in the "policy data A", the execution priorities of tasks are set such that "taskA>task B", and in the "policy data B", the execution priorities of the tasks are set such that "taskB>task A". As a result, a task preferentially executed is different between when the user is at the store A and when the user is at the store B. As a result, it is possible to perform execution control of tasks in accordance with each store (to be exact, in accordance with the dedicated AP 101 which is set at each store). In addition, policy data which is different on the basis of both the dedicated AP 101 and information such as country information which is set in the game apparatus 1, can be caused to be obtained.

Moreover, in the present embodiment, the policy data may include information for changing the number of uses. When such information is included, for example, the number of uses of a task, which is 0, is set to be 1. As a result, the task can be executed once.

As described above, in the present embodiment, when the user carrying the game apparatus 1 comes near the dedicated AP 101, the game apparatus 1 obtains the policy data from the policy server 103. Then, in accordance with the dedicated AP 101 used for the connection to the policy server 103, it is possible to change the execution priority of a task to be executed in the game apparatus 1. Thus, as described above, a task preferentially executed is changed (in execution order of tasks) in accordance with the store. In addition, for example, when the user stops in at the store A at which the dedicated AP 101 is set, it is possible to most preferentially execute a task of downloading data specific to the store A (e.g., an item in a game, which is available only via the dedicated AP 101 at the store A). Further, since it is possible to change the number of uses, for example, it is possible to cause a task, whose number of uses is 0 and which has not been executed for a long time period, to be executed when the user visits a store. Then, as the execution result of the task, a notification is displayed, thereby providing a surprise to the user or drawing "attention" of a user who does not positively collect information. As a result, for example, it is possible to give the user a motivation to play again a game which has not been played for a long time period.

As described above, in the present embodiment, although the game apparatus 1 is actually not a constant connection type terminal, a behavior of the game apparatus 1 as if being constantly in connection can be exhibited to the user, by performing the "Internet communication" and task execution (transmitting and receiving data to and from the server) even when the game apparatus 1 is in the "sleep mode" as described above. As a result, the user can obtain various notifications, free applications, and the like, without independently and positively performing an operation for a connection to the network. In addition, it is possible to provide a surprise and/or a fun to the user by the software configuration of the game apparatus 1 being changed without realizing it.

Figure 7:
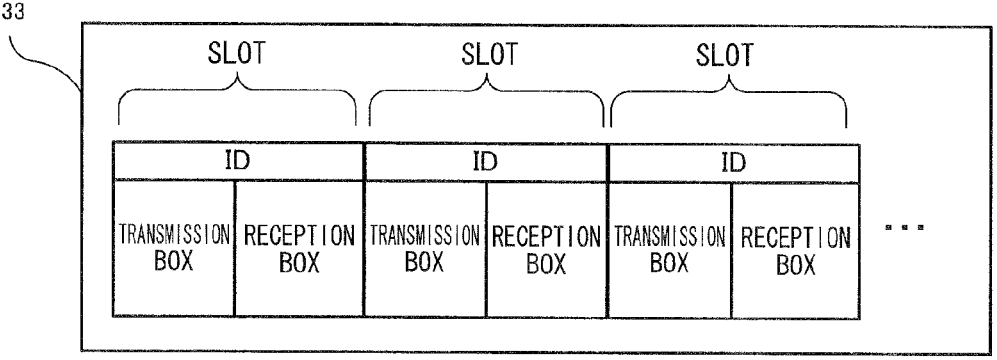
FIG. 7 is a diagram for illustrating "passing communication"

The following will describe a process outline of "passing communication" using the above-described "local communication". FIGS. 7 to 10 are diagrams for illustrating the "passing communication". First, in the present embodiment, a data area for the "passing communication" is reserved in the NAND flash memory 33. FIG. 7 is a schematic diagram showing the data area for the "passing communication". In FIG. 7, the area is constituted of a set of "slots". Each slot is associated with a predetermined application or game. The user can optionally make this association by performing a predetermined operation. Each slot is constituted of an ID indicating the associated application or game, a transmission box, and a reception box. In the "passing communication", when the game apparatuses 1 automatically and repeatedly search for each other and detect each other, data in the boxes are automatically transmitted and received.

Figure 8:
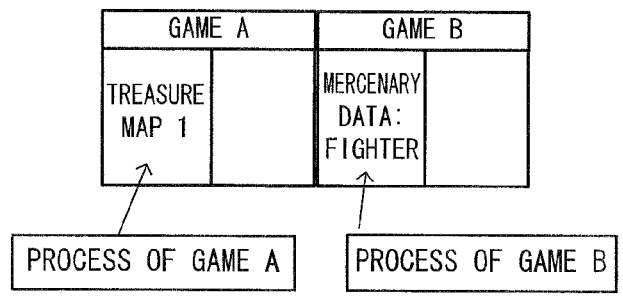
FIG. 8 is another diagram for illustrating the "passing communication"

The following will give one example. For example, it is assumed that a user A plays a game A by using its own game apparatus A. As a result, in a process of the game A, data indicating a "treasure map 1" is stored in the transmission box of a slot associated with the game A. Further, the user A plays another game B, and in a process of the game B, data of a "fighter" which is a "mercenary" useable in the game B is stored in the transmission box of a slot associated with the game B. FIG. 8 is a schematic diagram showing such a storage state of the game apparatus A of the user A.

Figure 9:
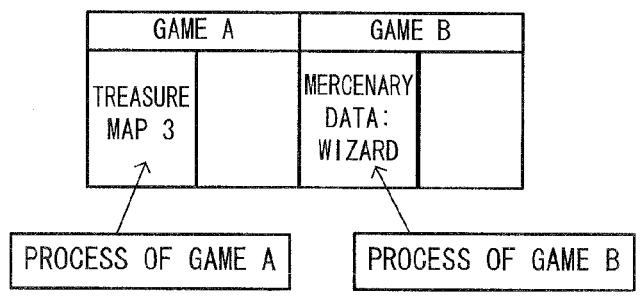
FIG. 9 is another diagram for illustrating the "passing communication"

Similarly, a user B plays the game A by using its own game apparatus B, and, as a result, data indicating a "treasure map 3" is stored in the transmission box of a slot associated with the game A. In addition, as a result of the user B playing the game B, mercenary data of a "wizard" is stored in the transmission box of a slot associated with the game B. FIG. 9 is a schematic diagram showing a storage state of the game apparatus B of the user B.

Figure 10:
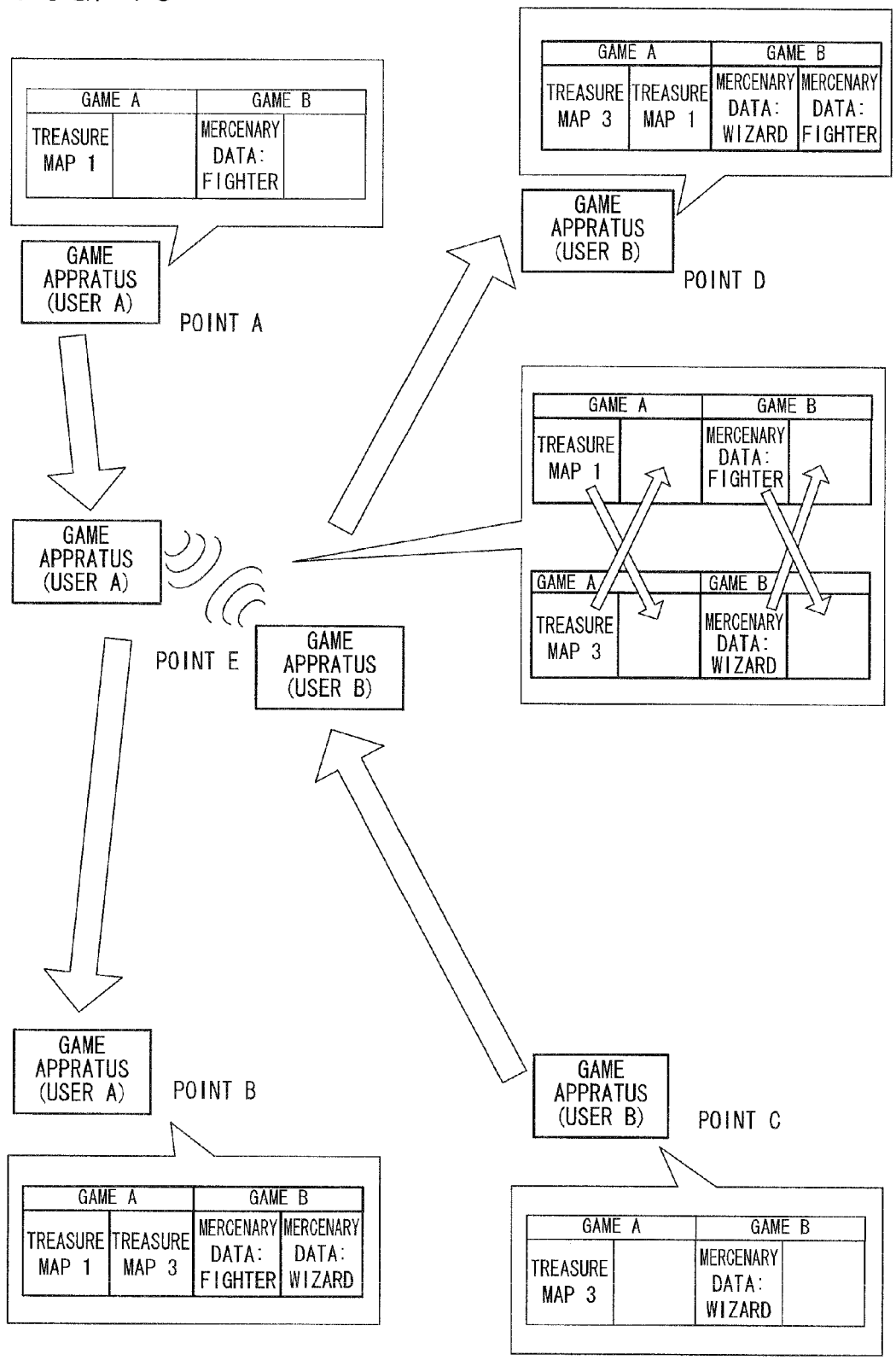
FIG. 10 is another diagram for illustrating the "passing communication"

On the premise of the storage states as described above, an assumption is made as follows. The user A and the user B go out with their own game apparatuses, respectively. Each game apparatus has shifted to the "sleep mode". In each game apparatus, a setting has been performed so as to permit the "passing communication" to be performed. In addition, during the "sleep mode", each game apparatus periodically transmits a signal of a "passing connection request" (a beacon for passing communication). FIG. 10 is a schematic diagram illustrating the "passing communication" on such an assumption. In FIG. 10, a start point of the user A is a point A, and a start point of the user B is a point C. Then, both users arrive at a point E so as to approach each other within a range in which the game apparatuses are allowed to perform local communication with each other. At this time, the "passing connection request" transmitted by one of the game apparatuses is received by the other game apparatus, and a connection for "local communication" between the game apparatuses is established on the basis of the "passing connection request". Then, data is exchanged as follows. In other words, data in the transmission box in the game apparatus A of the user A is transmitted to the reception box of the corresponding slot of a game in the game apparatus B. Specifically, the "treasure map 1" of the game A is transmitted to the reception box of the slot, in the game apparatus B, which is associated with the game A. Similarly, the "mercenary data of the fighter" of the game B in the game apparatus A is transmitted to the reception box of the slot of the game B in the game apparatus B. Similarly, the "treasure map 3" and the "mercenary data of the wizard" are transmitted from the game apparatus B to the reception boxes of the corresponding slots, respectively, in the game apparatus A.

As a result, for example, as shown at a point B in FIG. 10, after the "passing communication", in the game apparatus A, in the slot of the game A, the "treasure map 1" is stored in the transmission box, and the "treasure map 3" is stored in the reception box. In addition, in the slot of the game B, the "mercenary data of the fighter" is stored in the transmission box, and the "mercenary data of the wizard" is stored in the reception box. Then, the user A can use the data stored in the reception boxes, for the corresponding games. Similarly, in the game apparatus B, as shown at a point D, the "treasure map 3" and the "mercenary data of the fighter" received from the game apparatus A are stored, and the user B can use these data for the corresponding games.

As described above, in the "passing communication" in the present embodiment, when the game apparatus 1 is in the "sleep mode", predetermined data stored in the storage area for the passing communication is transmitted and received using the "local communication". Note that applications which are communication objects are limited to games which are set in slots in both of the game apparatuses. For example, in the case where the user B associates only the game B with a slot as described above and does not own the game A itself, only data concerning the game B is transmitted and received, and data concerning the game A is not transmitted and received.

The following will describe in detail the above-described processes performed in the game apparatus 1. First, main programs and data used in these processes will be described, but prior to this description, components which perform the processes in the present embodiment will be described. In the present embodiment, the microcomputer 37, the wireless communication module 34, and the CPU 31 independently perform processes described below, and these processes are performed in a cooperative manner and in parallel with each other. Describing allotment of main process contents, the microcomputer 37 mainly performs processes concerning: detection of opening/closing of the game apparatus 1; change control of the power control mode of the game apparatus 1; management of task execution time; and the like. The wireless communication module 34 mainly performs processes such as monitoring of execution start conditions for the passing communication, scan of a beacon from an AP in the Internet communication, and the like. The CPU 31 mainly performs overall processes other than the processes performed by the microcomputer 37 and the wireless communication module 34. For example, the CPU 31 executes applications and tasks.

For a help to the description below, FIG. 11 shows the relationships among various functions (programs) executed in the present embodiment. FIG. 11 shows that a microcomputer process performed by the microcomputer 37, and a wireless module process performed by the wireless communication module 34, and a start-up process performed by the CPU 31 can be performed in parallel with each other. Each element in FIG. 11 corresponds to each of later-described various programs shown in FIGS. 12 to 14. FIG. 11 shows that, for example, in a program of the "microcomputer process" performed by the microcomputer 37, a "local communication BG (BackGround) process" is called and performed. In addition, FIG. 11 shows that, in the "local communication BG process", an "Internet communication BG process" is called and performed. Further, FIG. 11 shows that the "local communication BG process" is also called in the "wireless module process" performed by the wireless communication module 34 and in the "start-up process" performed by the CPU 31.

Figure 12:
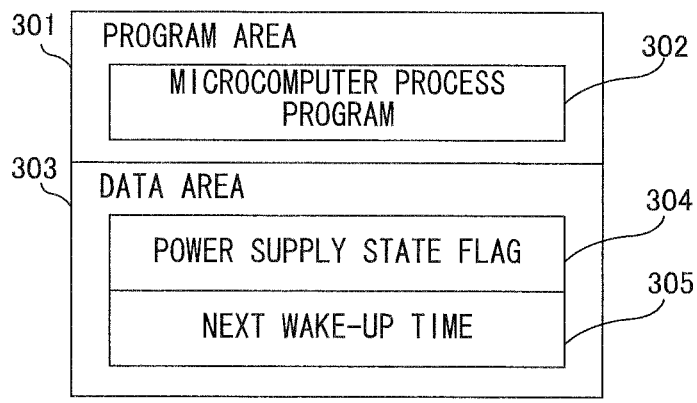
FIG. 12 is a diagram showing main data stored in a storage area included in a microcomputer 37.

The following will describe the main programs and data used in these processes. FIG. 12 is a diagram showing main data stored in a storage area (not shown) included in a microcomputer 37. Within the microcomputer 37, a program area 301 and a data area 303 are present. In the program area 301, a microcomputer process program 302 for the microcomputer 37 to perform the processes as described above, is stored, and in the data area 303, a power supply state flag 304 and a next wake-up time 305 are stored. The power supply state flag 304 is a flag for indicating whether or not it is in the "sleep mode". When the power supply state flag 304 is set to be ON, it is in the "normal power mode", and when the power supply state flag 304 is set to be OFF, it is in the "sleep mode". The next wake-up time 305 is data indicating a time when the "sleep mode" is cancelled. Basically, of next execution times which are respectively set for tasks, the earliest time is set as the next wake-up time 305. Note that, as will be described later, when a time period from a current time to a next execution time is too short or too long, a slight adjustment is made.

Figure 13:
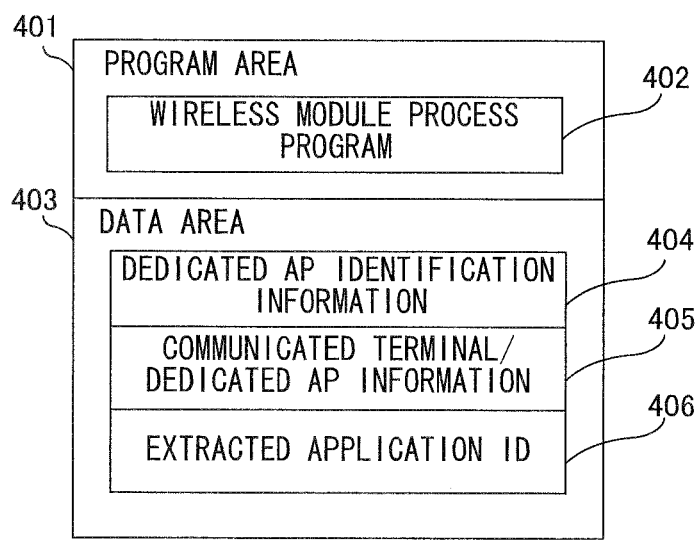
FIG. 13 is a diagram showing main data stored in a storage area included in a wireless communication module 34.

FIG. 13 is a diagram showing main data stored in a storage area (not shown) included in the wireless communication module 34. In the storage area in the wireless communication module 34, a program area 401 and a data area 403 are present. In the program area 401, a wireless module process program 402 for the wireless communication module 34 to perform the processes as described above, is stored, and in the data area 403, dedicated AP identification information 404, communicated terminal/dedicated AP information 405, and an extracted application ID 406 are stored.

The dedicated AP identification information 404 is a character string for identifying the dedicated AP 101. By collating the vendor specific information included in the above beacon with the dedicated AP identification information 404, it can be determined whether or not an AP is the dedicated AP 101. The communicated terminal/dedicated AP information 405 is information for not consecutively communicating with the same communication partner within a short time period. Specifically, when communication is performed with a predetermined communication partner, the MAC address of the communication partner and the communication time are stored as the communicated terminal/dedicated AP information 405 for a predetermined time period (the communicated terminal/dedicated AP information 405 can be stored for a plurality of communication partners). Control is performed such that no communication is performed with a communication partner whose MAC address has been stored, even when presence of the communication partner is detected. Thus, consecutive communication with the same communication partner can be avoided.

The extracted application ID 406 is data in which an application ID 522 of later-described passing communication data 520 is extracted and stored. This data indicates applications and games which become objects of the "passing communication" as described above.

Figure 14:
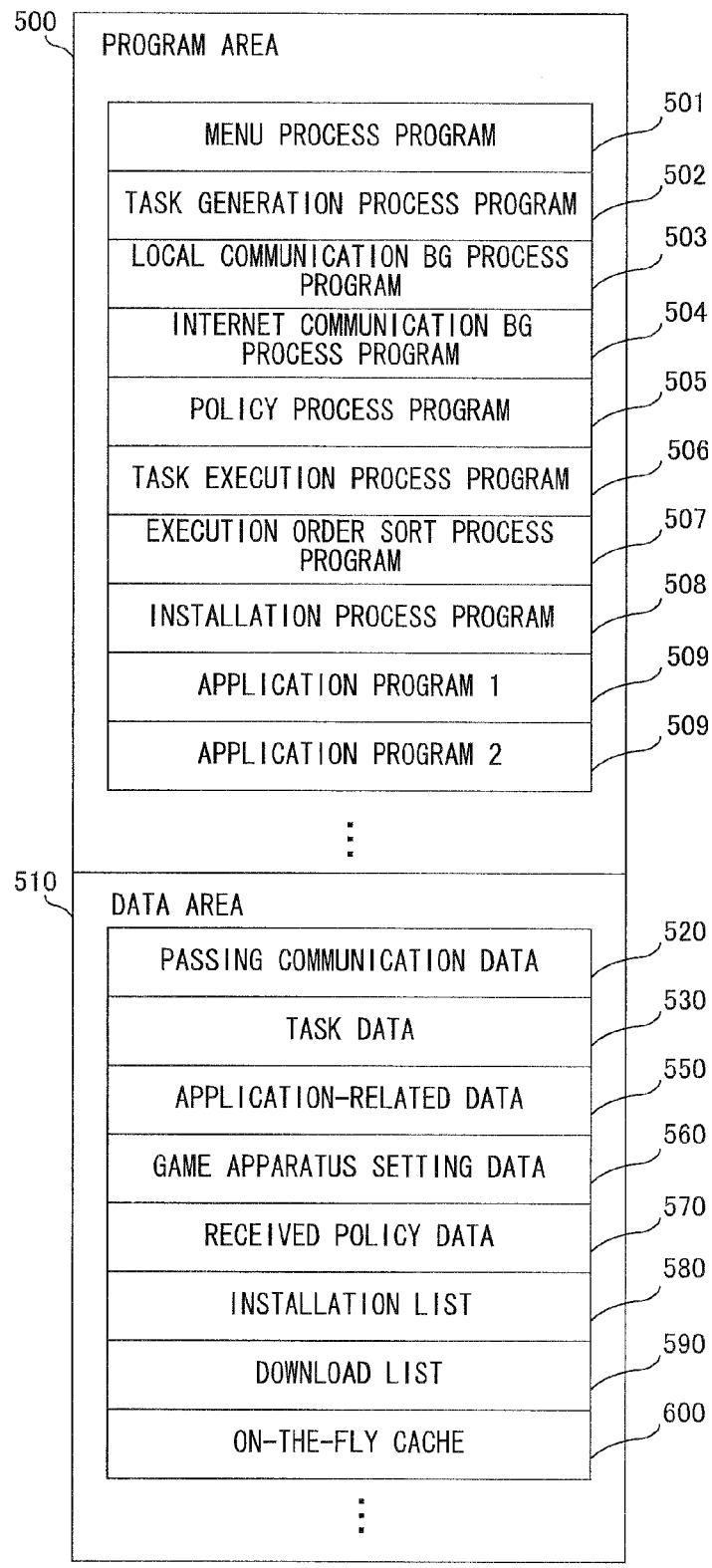
FIG. 14 is a diagram showing programs and data stored in a NAND flash memory 33.

FIG. 14 is a diagram showing programs and data stored in the NAND flash memory 33. Note that these data are expanded onto the main memory 32 for execution according to need. The NAND flash memory 33 has a program area 500 and a data area 510. In the program area 500, a menu process program 501, a task generation process program 502, a local communication BG process program 503, an Internet communication BG process program 504, a policy process program 505, a task execution process program 506, an execution order sort process program 507, an installation process program 508, a plurality of application programs 509, and the like, are stored.

The menu process program 501 is a program for performing a process concerning the menu of the game apparatus 1. The task generation process program 502 is a program for generating each task.

The local communication BG process program 503 and the Internet communication BG process program 504 are programs for performing processes concerning the above "local communication" and the above "Internet communication", respectively.

The policy process program 505 is a program for performing processes such as obtaining the above "policy data" and changing the execution priorities of tasks on the basis of the "policy data". The task execution process program 506 is a program for executing each task, and the execution order sort process program 507 is a program for determining the execution order of the tasks when the tasks are executed. The installation process program 508 is a program for performing processes concerning installation of a trial version or a free application of a game, and update of a system.

The application program 509 is a program for executing various applications such as games. Note that the term "program" is used herein for convenience, but a part of data used for execution of the application is included in the application program.

The following will describe the data area 510. In the data area 510, the passing communication data 520, task data 530, application-related data 550, game apparatus setting data 560, received policy data 570, an installation list 580, a download list 590, and an on-the-fly cache 600 are stored.

Figure 15:
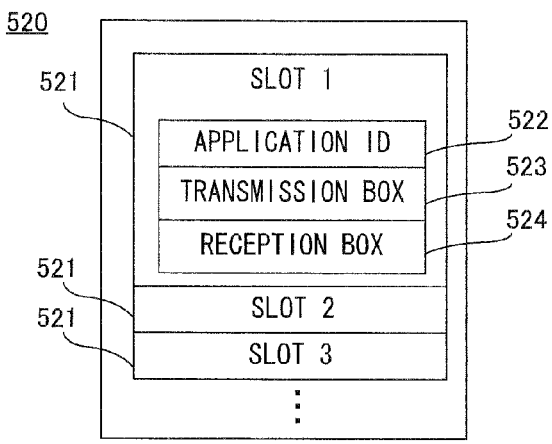
FIG. 15 is a diagram showing an example of a data structure of passing communication data 520 in FIG. 14.

The passing communication data 520 is data for performing transmission and reception in the "passing communication" as described above. FIG. 15 is a diagram showing an example of a data structure of the passing communication data 520. The passing communication data 520 is constituted of a set of slots 521. Each slot 521 is constituted of an application ID 522, a transmission box 523, and a reception box 524. The application ID 522 is an ID for identifying an application or game associated with the slot 521. In the transmission box 523, data to be transmitted to another game apparatus 1 in the "passing communication" is stored. In the reception box 524, data received from another game apparatus 1 in the "passing communication" is stored.

Figure 16:
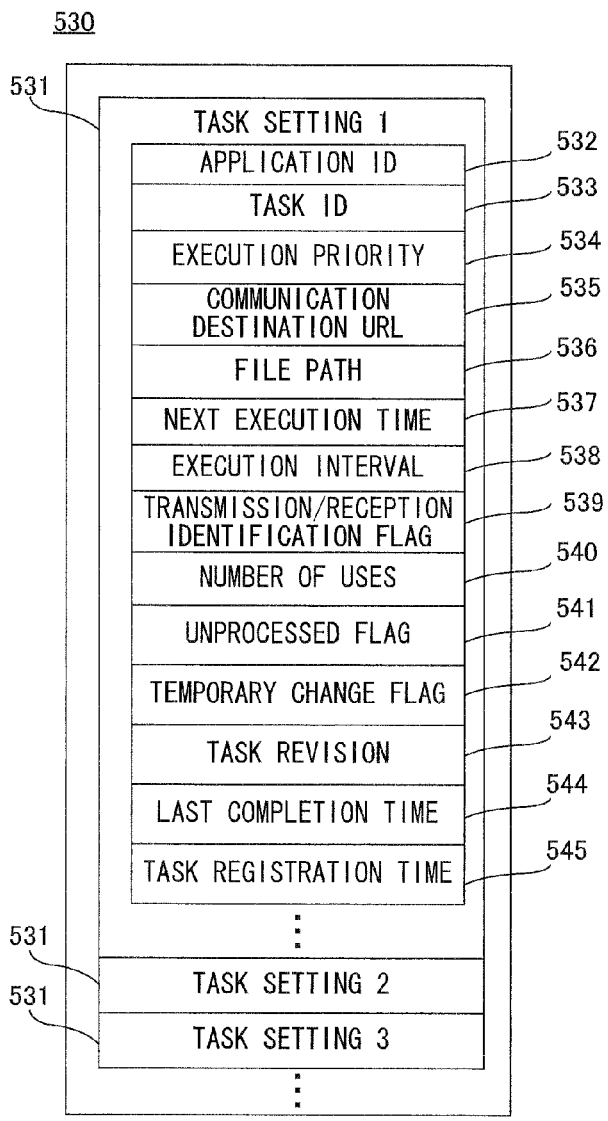
FIG. 16 is a diagram showing an example of a data structure of task data 530 in FIG. 14.

Referring back to FIG. 14, the task data 530 is data which defines the contents of a task executed in the present embodiment. FIG. 16 is a diagram showing an example of a data structure of the task data 530. In the task data 530, a plurality of task settings 531 are stored. Each task setting 531 is constituted of an application ID 532, a task ID 533, an execution priority 534, a communication destination URL 535, a file path 536, a next execution time 537, an execution interval 538, a transmission/reception identification flag 539, a number of uses 540, an unprocessed flag 541, a temporary change flag 542, a task revision 543, a last completion time 544, a task registration time 545, and the like.

The application ID 532 is an ID indicating an application or game which is related to the task (typically, an application or game based on which the task is generated). The task ID 533 is an ID for identifying the task.

The execution priority 534 is data indicating the execution priority of the task, and information indicating "EXPEDITE", "HIGH", "MEDIUM", "LOW", or "STOPPED" as described above is stored therein.

The communication destination URL 535 indicates a commutation destination of the task (typically, an upload destination of data, or a server which is a download source). The file path 536 is data indicating a location, in the game apparatus 1, for storing data to be uploaded or downloaded data. In other words, the file path 536 is data indicating a location, in the game apparatus 1, in which data to be uploaded to the communication destination is present, or a location, in the game apparatus 1, for storing downloaded data.

The next execution time 537 is data indicating a time when the task is to be executed next. The execution interval 538 is data indicating an execution interval of the task. For example, data indicating every day, every three days, every week, or the like, is stored therein. The execution interval 538 is used for determining the next execution time 537.

The transmission/reception identification flag 539 is a flag indicating whether the task is a "transmission task" of transmitting predetermined data, or a "reception task" of receiving predetermined data. For example, when this flag is set to be ON, it indicates that the task is the "reception task", and when this flag is set to be OFF, it indicates that the task is the "transmission task".

The number of uses 540 is a number of uses for the task as described above. A task whose number of uses becomes 0 is not executed regardless of its execution priority 534. The unprocessed flag 541 is a flag indicating whether or not the task has been executed. When this flag is set to be ON, it indicates that the task has been executed, and when this flag is set to be OFF, it indicates that the task has not been executed yet. The temporary change flag 542 is a flag indicating, when the execution priority 534 of the task is changed on the basis of later-described policy data, whether or not the change of the execution priority 534 is temporary.

The task revision 543 is data indicating a final revision of a policy applied to the task. The last completion time 544 is data indicating a time when the task of the task setting 531 is executed last and completed successfully. The task registration time 545 is data indicating a time when the task setting 531 is generated and registered for the first time.

Figure 17:
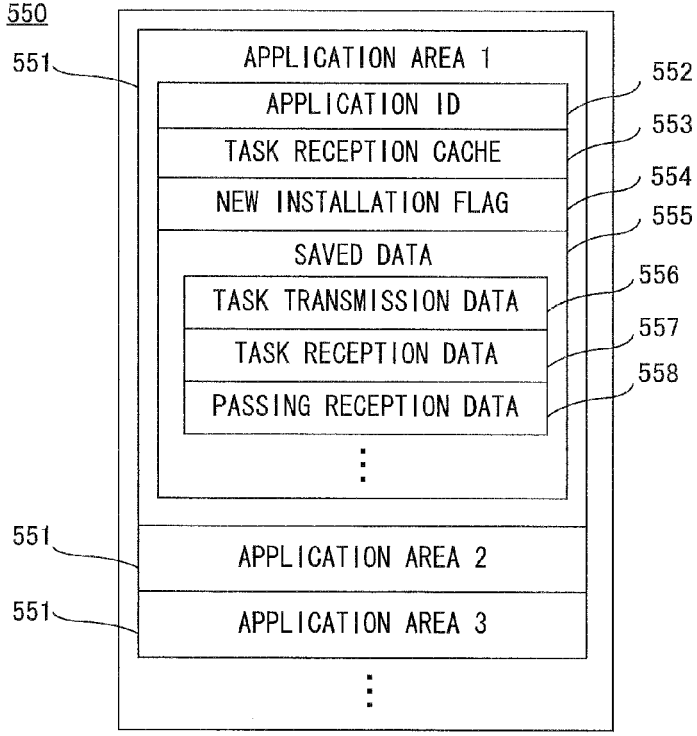
FIG. 17 is a diagram showing an example of a data structure of application-related data 550 in FIG. 14.

Referring back to FIG. 14, the application-related data 550 is data related to various applications which are installed in the game apparatus 1. FIG. 17 is a diagram showing an example of a data structure of the application-related data 550. The application-related data 550 includes a plurality of application areas 551. In each application area 551, an application ID 552, a task reception cache 553, a new installation flag 554, a saved data 555 are stored. The application ID 552 is an ID indicating an application corresponding to the application area 551. The task reception cache 553 is an area in which data which is received as a result of execution of the "reception task" is stored. Thus, in the case of the "reception task", information indicating the location of the task reception cache 553 (e.g., an address) is indicated by the file path 536 of the task setting 531.

The new installation flag 554 is a flag indicating whether or not the application is a newly installed application. When this flag is set to be ON, it indicates that the application indicated by the application ID 552 is a newly installed application (e.g., a trial version of a new game, a new free application, and the like).

The saved data 555 is saved data concerning the application indicated by the application ID 552, and is constituted of task transmission data 556, task reception data 557, and passing reception data 558. In addition, for example, if the application is a game, data of player characters, data indicating progress of the game, and the like are included therein.

The task transmission data 556 is data to be transmitted in the "transmission task". Information indicating the location of this data (e.g., an address) is indicated by the file path 536 of the task setting 531. The task reception data 557 is data obtained by copying data in the task reception cache 553 when the application is executed. As a result, the copied data is handled as a part of the saved data 555, and can be used in the process of the application. Similarly, the passing reception data 558 is data obtained by copying data in the reception box 524 of the passing communication data 520 when the application is executed.

Referring back to FIG. 14, the game apparatus setting data 560 is data of various settings and the like which are registered in the game apparatus 1. For example, user information such as the name and the age of the user and country information is included therein. In addition, for example, network settings, such as a password and an ESSID (Extended Service Set Identifier) of an AP which is set at user's home, are also included therein. The network settings are determined as appropriate and stored in accordance with an operation of the user, by a process for the network settings being performed as appropriate in the game apparatus 1. In addition to the above settings determined by the user, the network settings also include an ESSID of an AP of a predetermined provider which is previously set as a setting before shipment (e.g., a public wireless LAN spot, and the like). In addition, the last update date and time of the system software of the game apparatus 1 and the like are also stored.

Figure 18:
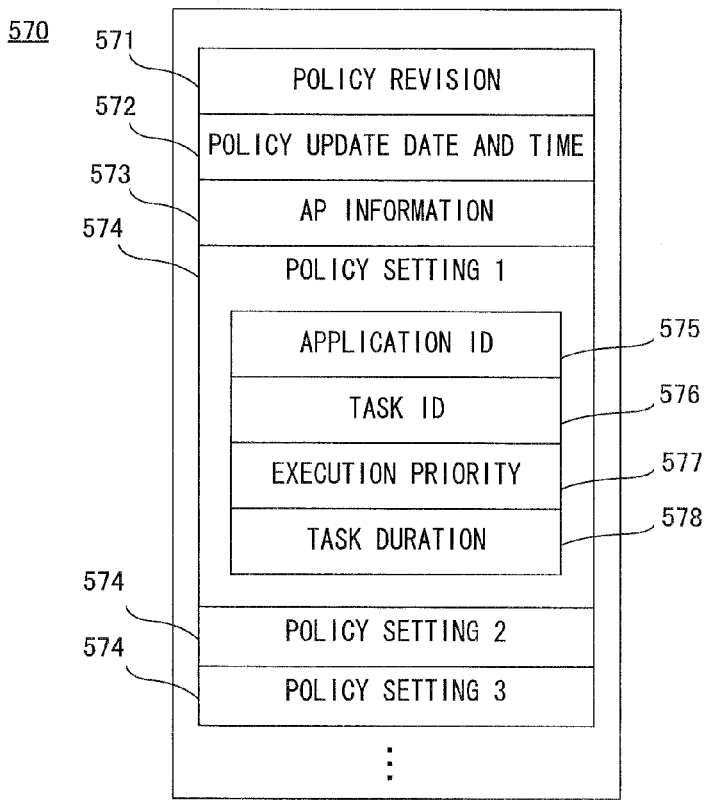
FIG. 18 is a diagram showing an example of a data structure of received policy data 570 in FIG. 14.

The received policy data 570 is policy data received from the policy server 103 as described above (thus, the structure of the policy data stored in the policy server 103 is the same as that of the received policy data 570). FIG. 18 is a diagram showing an example of the data structure of the received policy data 570. The received policy data 570 is constituted of a policy revision 571, policy update date and time 572, AP information 573, and a plurality of policy settings 574.

The policy revision 571 is data indicating a revision of the received policy data 570. The policy update date and time 572 is data indicating date and time when the policy data is updated (date and time when the policy data is uploaded to the policy server). The AP information 573 is information indicating an AP associated with the received policy data 570.

Each policy setting 574 is data which defines a task whose execution priority is to be changed, and the contents of the change. Each policy setting 574 is constituted of an application ID 575, a task ID 576, an execution priority 577, and task duration 578. The application ID 575 is an ID indicating an application to which the policy data is to be applied. The task ID 576 is data indicating a task to which the policy data is to be applied. In addition to data which designates individually the task ID 533 of the task data 530, data indicating generic designation or indicating that a plurality of tasks are designated together may be stored therein.

The execution priority 577 indicates an execution priority after change. The task duration 578 is a flag indicating whether the change is temporary or permanent. When this flag is set to be ON, it indicates that the change is permanent.

Referring back to FIG. 14, the installation list 580 is data indicating contents of installation when the installation of an application such as update of the system or installation of a trial version application is needed (this data indicates a sort of an index of the installation contents). In the present embodiment, a task of "obtaining an installation list" is previously registered in the task data 530 as one of initial settings before shipment of the game apparatus 1. In addition, a value which is previously determined for indicating that the task is an initially-set task is defined as the task ID 533. In the present embodiment, the installation list 580 is periodically obtained as a part of system functions of the game apparatus 1.

Figure 19:
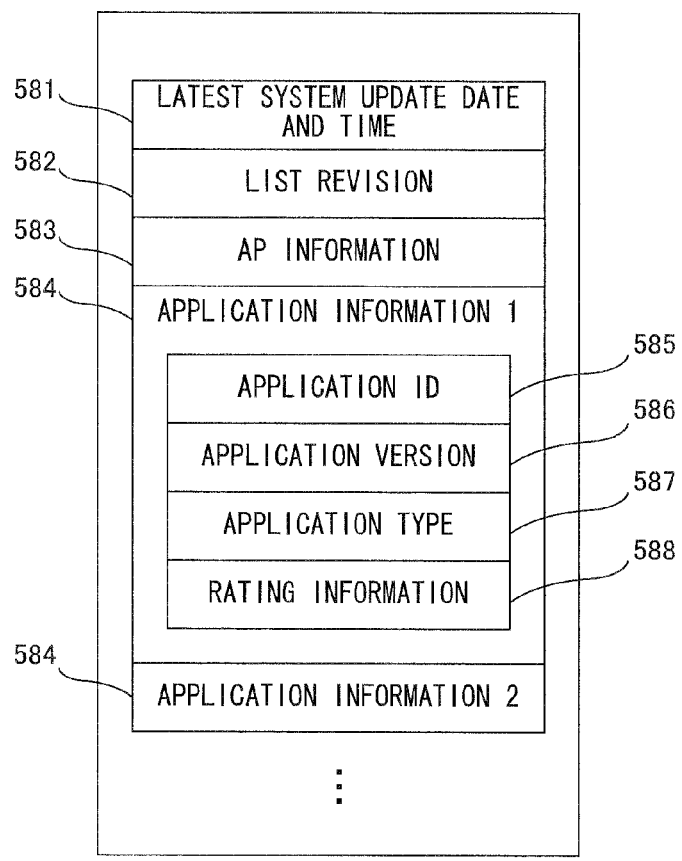
FIG. 19 is a diagram showing an example of a data structure of an installation list 580 in FIG. 14.

FIG. 19 is a diagram showing an example of a data structure of the installation list 580. In FIG. 19, the installation list 580 is constituted of latest system update date and time 581, a list revision 582, AP information 583, and a plurality of application information 584.

The latest system update date and time 581 is data indicating the latest update date and time of the system program of the game apparatus 1, which is currently provided by the manufacture of the game apparatus 1 or the system program via the Internet. Necessity of system update is determined on the basis of whether or not the data indicated here agrees with the latest update date and time of the system software stored in the game apparatus 1. In addition, the list revision 582 indicates a revision (version) of the installation list 580.

The AP information 583 is information indicating an AP associated with the installation list 580. In other words, similarly to the above policy data, the installation list 580 can define different contents for each AP.

The application information 584 is data defined for an application which can be an installation object. Each application information 584 is constituted of an application ID 585, an application version 586, an application type 587, and rating information 588.

The application ID 585 is an ID for identifying a to-be-installed application. The application version 586 indicates a version of the to-be-installed application or the like. The application type 587 is data indicating a type of the to-be-installed application. For example, it is indicated whether the to-be-installed application is a system program, a trial version, or a free application. The rating information 588 is information indicating a rating (suitable age) of the to-be-installed application. On the basis of age information of the user included in the game apparatus setting data 560, it is determined whether or not to install the to-be-installed application.

Figure 20:
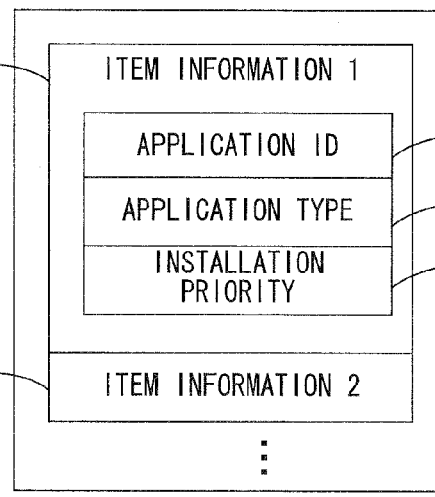
FIG. 20 is a diagram showing an example of a data structure of a download list 590 in FIG. 14.

Referring back to FIG. 14, the download list 590 is data which is obtained by extracting and listing what is to be installed in the game apparatus 1, on the basis of the installation list 580, the rating information, and the like. FIG. 20 is a diagram showing an example of a data structure of the download list 590. In FIG. 20, the download list 590 is constituted of a plurality of item information 591. Each item information 591 is constituted of an application ID 592, an application type 593, and an installation priority 594. The application ID 592 and the application type 593 are obtained by copying the application ID 585 and the application type 587 of the installation list 580. The installation priority 594 is data for indicating a process order at installation.

Referring back to FIG. 14, the on-the-fly cache 600 is an area for, when the system update of the game apparatus 1 is carried out, expanding data for the system update thereon. In the present embodiment, the data for the system update is uploaded to the server as a compressed file. Then, when performing a process of the system update, the game apparatus 1 expands the compressed file on the fly in parallel with downloading of the compressed file. The destination onto which the compressed file is expanded is the on-the-fly cache 600. In addition, a file name different from the actual file name of the system data is assigned to the data for the update at the expansion. For example, if the actual file name of the system data is "firmware.bin", "firmware.upd" is assigned as a file name to the data for the update at the expansion.

The following will describe in detail the above-described processes performed by the game apparatus 1. First, the process performed by the microcomputer 37 will be described. Then, the process performed by the wireless communication module 34 will be described, and the process performed by the CPU 31 will be described.

[Process Performed by Microcomputer 37]

Figure 21:
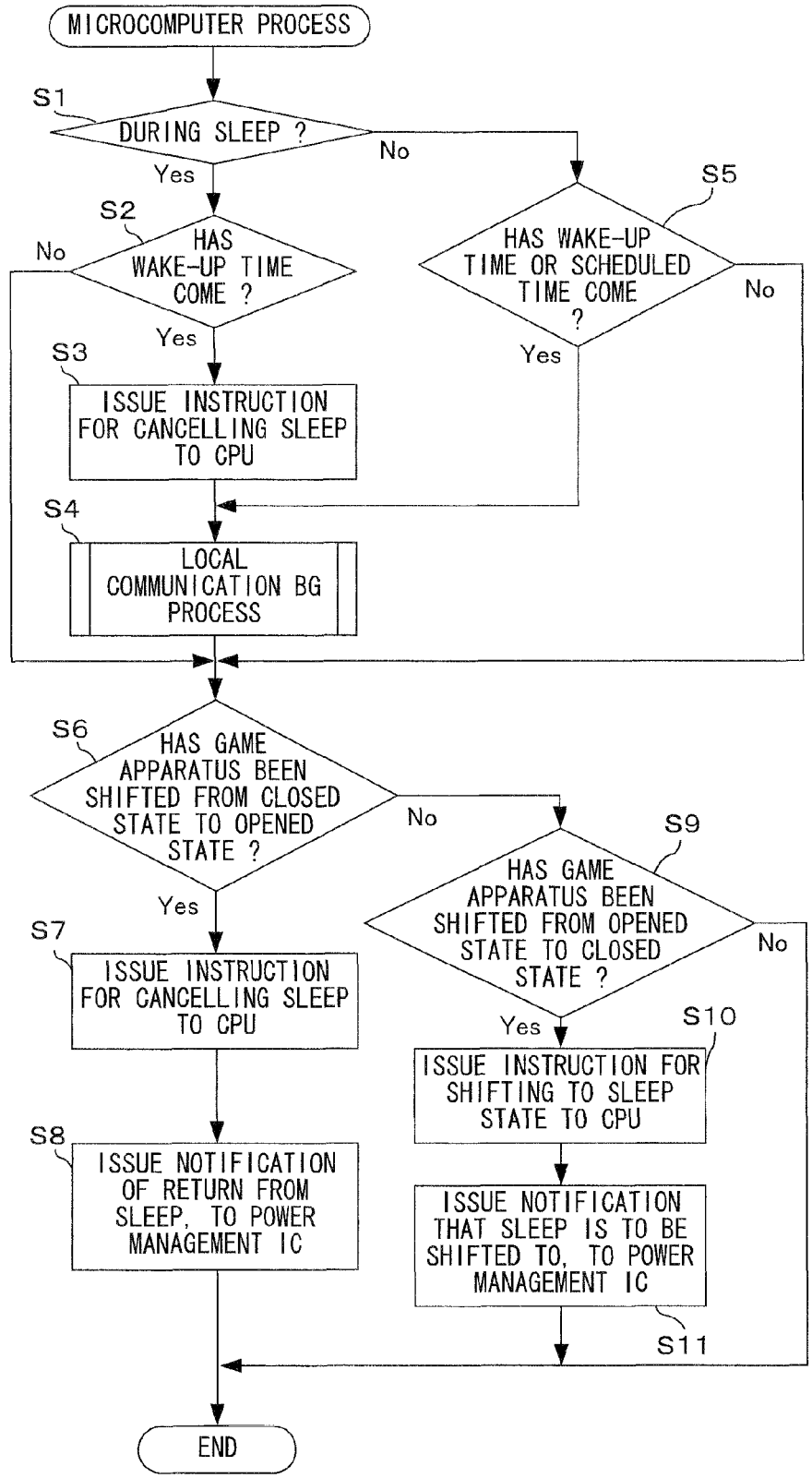
FIG. 21 is a flowchart showing a microcomputer process performed by the microcomputer 37.

FIG. 21 is a flowchart showing the microcomputer process performed by the microcomputer 37. The process shown in FIG. 21 is repeatedly performed as a background process at predetermined time intervals, unless the power of the game apparatus 1 is completely turned off.

In FIG. 21, first, at step S1, it is determined whether or not the game apparatus 1 is in the "sleep mode". Specifically, by referring to the power supply state flag 304, it is determined whether or not the game apparatus 1 is in the "sleep mode". As a result of the determination, when it is determined that the game apparatus 1 is in the "sleep mode" (YES at step S1), it is determined at step S2 whether or not a wake-up time (a time when the sleep mode is to be cancelled) has come. Specifically, the determination is performed by the RTC 39 in the microcomputer 37 comparing the next wake-up time 305 in the storage area in the microcomputer 37 to the current time. As a result of the determination, when it is determined that the wake-up time has not come (NO at step S2), the processing proceeds to later-described step S6. On the other hand, when it is determined that the wake-up time has come (YES at step S2), an instruction to cancel the "sleep mode" to shift to the "normal power mode" is issued at step S3 from the microcomputer 37 to the CPU 31. In addition, the power supply state flag 304 is set to be ON, and a notification that the "sleep mode" is to be cancelled is given to the power management IC 41. Note that, although the game apparatus 1 is caused to shift to the "normal power mode" in this case, the game apparatus 1 may be caused to shift to the above "monitor off mode" in which power is not supplied to the LCD. In other words, the game apparatus 1 may be caused to shift to a power control mode in which power is supplied to the CPU 31.

Next, at step S4, the local communication BG process is performed by the CPU 31. This process will be described in detail later, but an outline of this process will be briefly described now. In the local communication BG process in this flow, as a result, a connection to a predetermined server via the general AP 102 and the Internet by the "Internet communication", and execution of the task, are performed. In addition, an installation process is performed according to need. Then, when the local communication BG process is ended, the processing proceeds to later-described step S6.

On the other hand, as a result of the determination at step S1, when it is determined that the game apparatus 1 is not in the "sleep mode" (i.e., the game apparatus 1 is operating in the "normal power mode") (NO at step S1), at step S5, the next wake-up time 305 and the next execution time 537 of the task data 530 are referred to and it is determined whether or not the wake-up time or a scheduled time, which is a designated execution time of a task, has come. As a result of the determination, when it is determined that either time has come (YES at step S5), the processing proceeds to step S4. On the other hand, when it is determined that both of the times have not come (NO at step S5), the processing proceeds to step S6.

Next, at step S6, it is determined whether or not the game apparatus 1 has been shifted from a closed state (a state in which the housing is closed) to an opened state (a state in which the housing is opened) (i.e., whether or not the game apparatus 1 has been opened). Specifically, the microcomputer 37 determines whether or not a detection signal indicating that the housing is opened has been received from the open/close detector 40. As a result of the determination, when it is determined that the game apparatus 1 has been shifted from the closed state to the opened state (YES at step S6), at the next step S7, an instruction to cancel the "sleep mode" is issued from the microcomputer 37 to the CPU 31, the power supply state flag 304 is set to be ON, and a notification that the "sleep mode" is to be cancelled is given to the power management IC 41. At the subsequent step S8, a notification that the game apparatus 1 has returned from the "sleep mode" (the "sleep mode" has been cancelled) is given from the microcomputer 37 to the power management IC 41. Accordingly, the power management IC 41 starts power supply to each component of the game apparatus 1 as appropriate.

On the other hand, as a result of the determination at step S6, when it is determined that the game apparatus 1 has not been shifted from the closed state to the opened state (NO at step S6), it is determined at step S9, on the basis of a signal from the open/close detector 40, whether or not the game apparatus 1 has been shifted from the opened state to the closed state (i.e., whether or not the game apparatus 1 has been closed). As a result, when it is determined that the game apparatus 1 has been shifted from the opened state to the closed state (YES at step S9), at the next step S10, an instruction to shift to the "sleep mode" is issued from the microcomputer 37 to the CPU 31, and the power supply state flag 304 is set to be OFF. Further, at the subsequent step S11, a notification that the "sleep mode" is to be shifted to is issued from the microcomputer 37 to the power management IC 41. Accordingly, the power management IC 41 stops power supply to the components of the game apparatus 1, other than some components, as appropriate. On the other hand, as a result of the determination at step S9, when it is determined that the game apparatus 1 has not been shifted from the opened state to the closed state (NO at step S9), the processes at the step S10 and S11 are skipped, and the microcomputer process ends.

[Process Performed by Wireless Communication Module 34]

Figure 22:
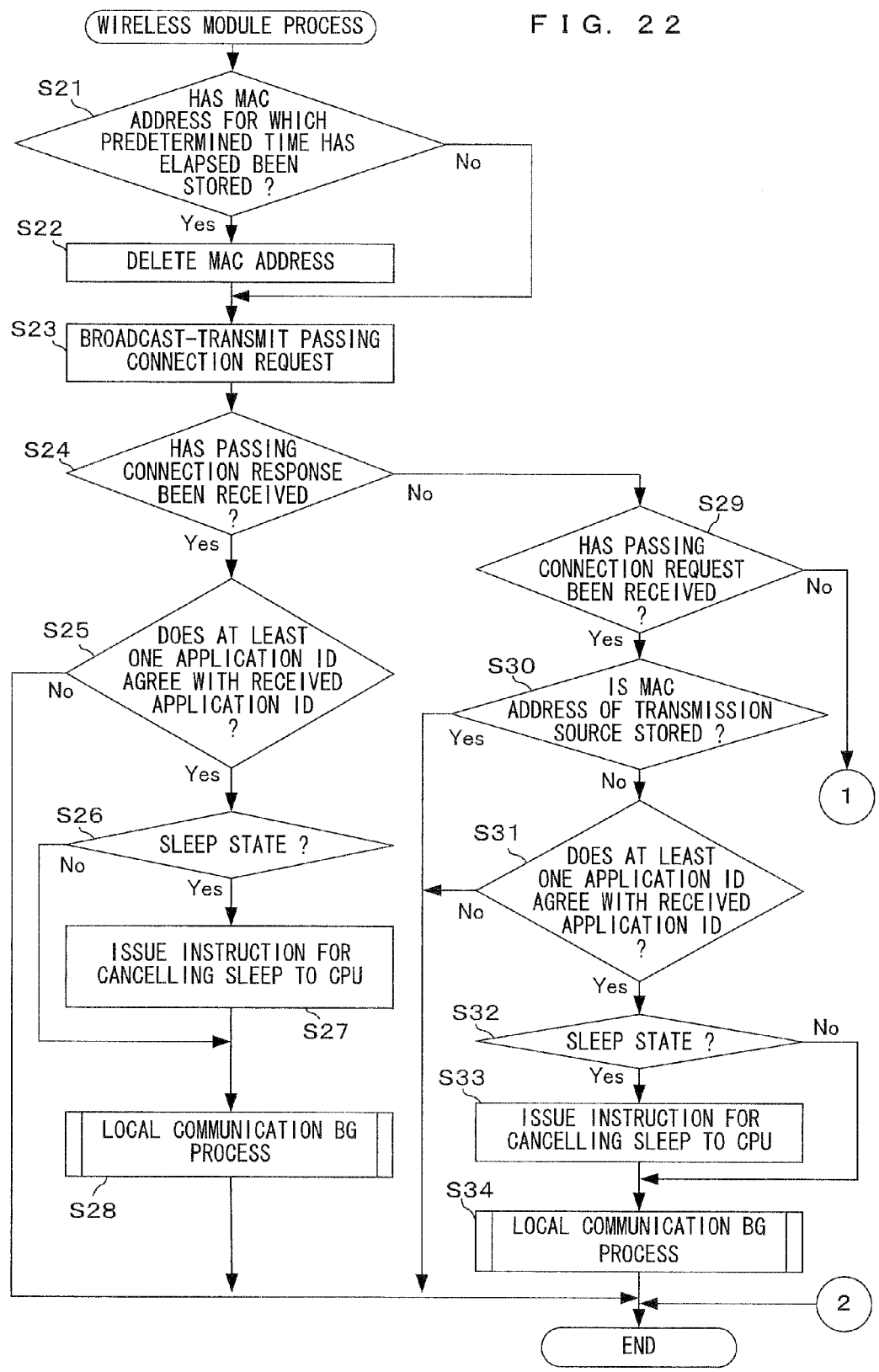
FIG. 22 is a flowchart showing a wireless module process.
Figure 23:
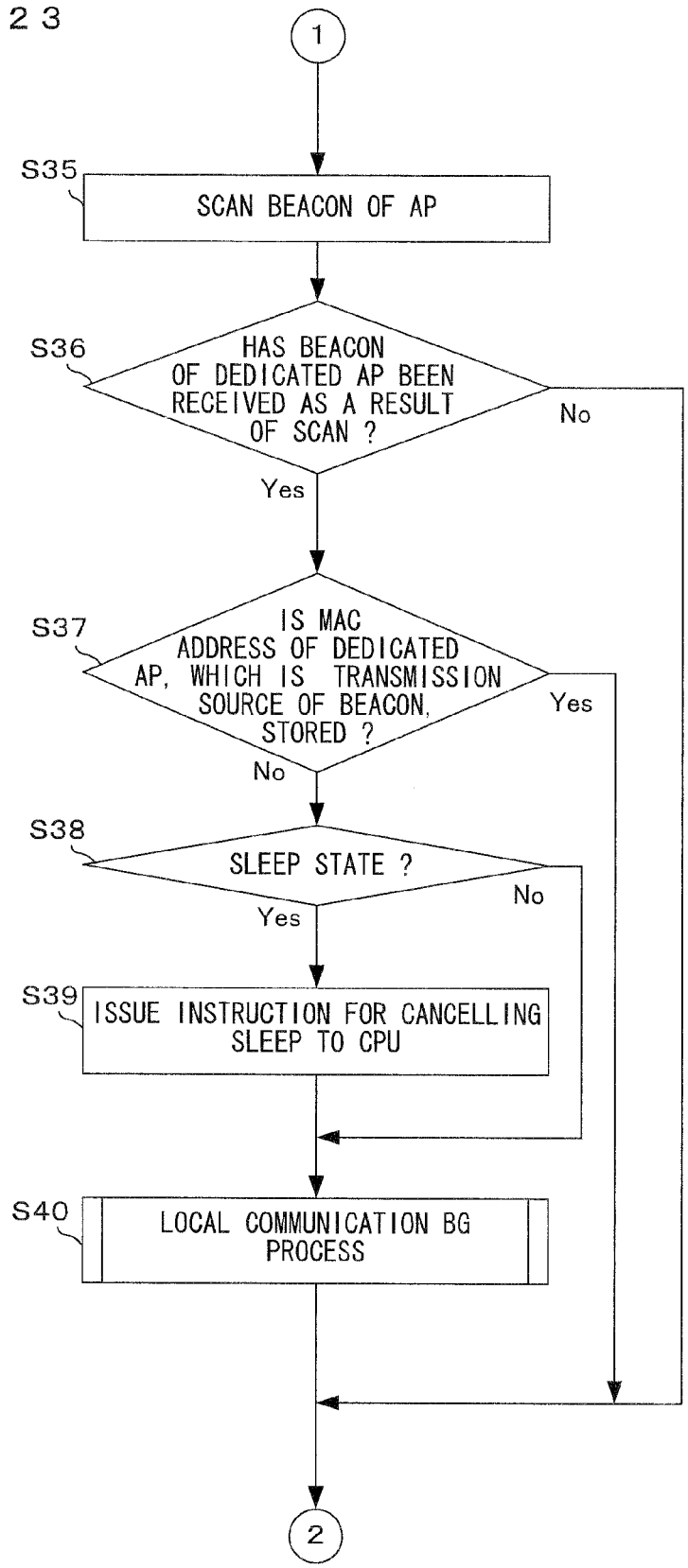
FIG. 23 is another flowchart showing the wireless module process.

The following will describe the wireless module process performed by the wireless communication module 34. FIGS. 22 to 23 are flowcharts showing the wireless module process. Similarly to the above microcomputer process, the process shown in FIG. 22 is repeatedly performed as a background process at predetermined time intervals, unless the power of the game apparatus 1 is completely turned off.

In FIG. 22, first, at step S21, the communicated terminal/dedicated AP information 405 in the storage area in the wireless communication module 34 is referred to, and it is determined whether or not an MAC address with which a predetermined time has elapsed from last communication is stored therein. Since the last communication time is stored in the communicated terminal/dedicated AP information 405 as described above, presence/absence of an MAC address with which the predetermined time has elapsed is determined by comparing this time to the current time.

As a result of the determination, when it is determined that the MAC address with which the predetermined time has elapsed from last communication is stored (YES at step S21), at step S22, the MAC address which satisfies this condition, and data of the last communication time associated therewith, are deleted from the communicated terminal/dedicated AP information 405. Then, the processing proceeds to step S23. On the other hand, when it is determined that no MAC address with which the predetermined time has elapsed from last communication is stored (NO at step S21), the process at step S22 is skipped, and the processing proceeds to the next step S23.

At step S23, a "passing connection request" is broadcast-transmitted. The "passing connection request" is a request signal for, when data is stored in the passing communication data 520, notifying another game apparatus 1 of a request for the "passing communication" as described above. The signal includes an MAC address of the wireless communication module 34. In addition, the signal includes an application ID indicated by the extracted application ID 406. In other words, the "passing connection request" includes data indicating an application which is a transmission and reception object of data (which is desired to be transmitted and received), and is broadcast.

Next, at step S24, it is determined whether or not a "passing connection response" has been received. The "passing connection response" is a response signal from the other game apparatus 1 which receives the "passing connection request" which is broadcast-transmitted at step S23. Reception of the response signal indicates that it is possible to establish a connection to the other game apparatus 1, which transmits back the response signal, by the "local communication". As a result of the determination, when it is determined that the "passing connection response" has been received from the other game apparatus 1 (YES at step S24), it is determined at step S25 whether or not applications registered in the game apparatuses 1 as transmission and reception objects agree with each other. Specifically, an application ID included in the received "passing connection response" is collated with the extracted application ID 406. Then, it is determined whether or not there is at least one agreeing application ID.

As a result of the determination, when it is determined that there is no agreeing application ID (NO at step S25), the "passing communication" is not performed, and the wireless module process ends. On the other hand, when it is determined that there is at least one agreeing application ID (YES step S25), a process for transmitting and receiving passing communication data concerning the application ID is performed. Specifically, first, at step S26, it is determined whether or not the game apparatus 1 is in the "sleep mode". The power supply state flag 304 for determining whether or not the game apparatus 1 is in the "sleep mode" is present in the microcomputer 37, and the wireless communication module 34 and the microcomputer 37 are connected to each other via the CPU 31. Thus, in the state where power is not supplied to the CPU due to the game apparatus 1 being in the "sleep mode", the wireless communication module 34 cannot access the power supply state flag 304. Therefore, on the basis of the result that the wireless communication module 34 cannot access the power supply state flag 304, it can be determined that the game apparatus 1 is in the "sleep mode". As a result, when it is determined that the game apparatus 1 is in the "sleep mode" (YES at step S26), an instruction to cancel the "sleep mode" is issued to the CPU 31 at step S27. In addition, here, the game apparatus 1 is only necessarily in a mode in which power is supplied to the CPU 31, and thus may shift to the above "monitor off mode". Then, at step S28, the local communication BG process is performed. On the other hand, when it is determined that the game apparatus 1 is not in the "sleep mode" (NO at step S26), the game apparatus 1 is thought to be operating in the "normal power mode", and thus the process at step S27 is skipped, and the processing proceeds to step S28.

At step S28, the local communication BG process is performed by the CPU 31. This process will be described in detail later. Briefly describing an outline of the local communication BG process in this flow, as a result, the passing communication data 520 is transmitted by using the "local communication", and then received. Then, when the local communication BG process ends, the wireless module process ends.

On the other hand, as a result of the determination at step S24, when it is not determined that the "passing connection response" to the request signal which is broadcast by the wireless communication module 34 has not been received (NO at step S24), it is determined at step S29 whether or not the wireless communication module 34 has received a "passing connection request" transmitted from another game apparatus 1. As a result of the determination, when it is determined that the wireless communication module 34 has received the "passing connection request" transmitted from the other game apparatus 1 (YES at step S29), at the next step S30, the communicated terminal/dedicated AP information 405 is referred to, and it is determined whether or not an MAC address of the transmission source is stored therein. In other words, it is determined whether or not the "passing connection request" is from a communication partner with which the "passing communication" has been performed just before. As a result of the determination, when it is determined that the MAC address of the transmission source is stored in the communicated terminal/dedicated AP information 405 (YES at step S30), communication is not performed with the transmission source, and the wireless module process ends.

On the other hand, when it is determined that the MAC address of the transmission source is not stored in the communicated terminal/dedicated AP information 405 (NO at step S30), it is determined at step S31, similarly to step S25, whether or not there is an agreeing application ID out of the application IDs of applications registered as objects of the "passing communication". As a result of the determination, when it is determined that there is no agreeing application ID (NO step S31), communication is not performed with the transmission source, and the wireless module process ends.

On the other hand, when it is determined that there is at least one agreeing application ID (YES at step S31), it is determined at step S32, similarly to step S26, whether or not the game apparatus 1 is in the "sleep mode". As a result, when it is determined that the game apparatus 1 is in the "sleep mode" (YES at step S32), at step S33, similarly to step S27, an instruction to cancel the "sleep mode" is issued to the CPU 31. Then, at step S34, the local communication BG process is performed. On the other hand, when it is determined that the game apparatus 1 is not in the "sleep mode" (NO at step S32), it means that the game apparatus 1 is already operating in the "normal power mode", and thus the process at step S33 is skipped, and the processing proceeds to step S34.

At step S34, the local communication BG process is performed similarly to step S28. As an outline of the process in this case, data for the passing communication is transmitted, and then received (the order of transmission and reception is opposite to that at step S28).

The following will describe a process performed when it is determined at step S29 that the wireless communication module 34 has not received any "passing connection request" (NO at step S29). In this case, it is determined whether or not a dedicated AP 101 is present near the game apparatus 1, and when the dedicated AP 101 is present, a process for communicating with the dedicated AP 101 is performed. Specifically, at step S35 in FIG. 23, scan of a beacon transmitted from the access point, namely, so-called "passive scan", is performed. In the present embodiment, a communication channel used for communicating with the dedicated AP 101 is previously determined. Thus, in this process, by setting the communication channel before shifting to the sleep mode, it is possible to perform passive scan without activating the CPU 31.

Next, at step S36, on the basis of a result of the scan, it is determined whether or not a beacon transmitted from the dedicated AP 101 has been received. Specifically, it is determined whether or not the dedicated AP identification information 404 stored in the storage area in the wireless communication module 34 is included in the vendor specific information of the received beacon obtained by the scan. As a result of the determination, when it is determined that the beacon from the dedicated AP 101 has not been received (NO at step S36), the wireless module process ends.

On the other hand, when it is determined that the beacon from the dedicated AP has been received (YES at step S36), it is determined at step S37 whether or not the MAC address of the dedicated AP 101 which is the transmission source of the beacon is stored in the communicated terminal/dedicated AP information 405. In other words, it is determined whether or not the beacon is from the dedicated AP 101 with which communication has been performed just before. As a result of the determination, when it is determined that the MAC address of the dedicated AP 101 is stored in the communicated terminal/dedicated AP information 405 (YES at step S37), the wireless module process ends.

On the other hand, when it is determined that the MAC address of the dedicated AP 101 is not stored in the communicated terminal/dedicated AP information 405 (NO at step S37), it is determined at step S38, similarly to steps S26 and S32, whether or not the game apparatus 1 is in the "sleep mode". As a result, when it is determined that the game apparatus 1 is in the "sleep mode" (YES at step S38), an instruction to cancel the "sleep mode" is issued to the CPU 31 at step S39 similarly to steps S27 and S33. Then, at step S40, the local communication BG process is performed. On the other hand, when it is determined that the game apparatus 1 is not in the "sleep mode" (NO at step S38), the process at step S39 is skipped, and the processing proceeds to step S40.

At step S40, the local communication BG process is performed. This process will be described in detail later. Briefly describing the contents executed in this flow, as a result, a process of connecting to the policy server 103 via the dedicated AP 101, a process of changing priorities of tasks on the basis of the policy data, and the like, are performed, and various tasks are executed. Then, when the local communication BG process ends, the wireless module process ends.

[Process Performed by CPU 31]

The following will describe the process performed by the CPU 31.

[Start-Up Process]

Figure 24:
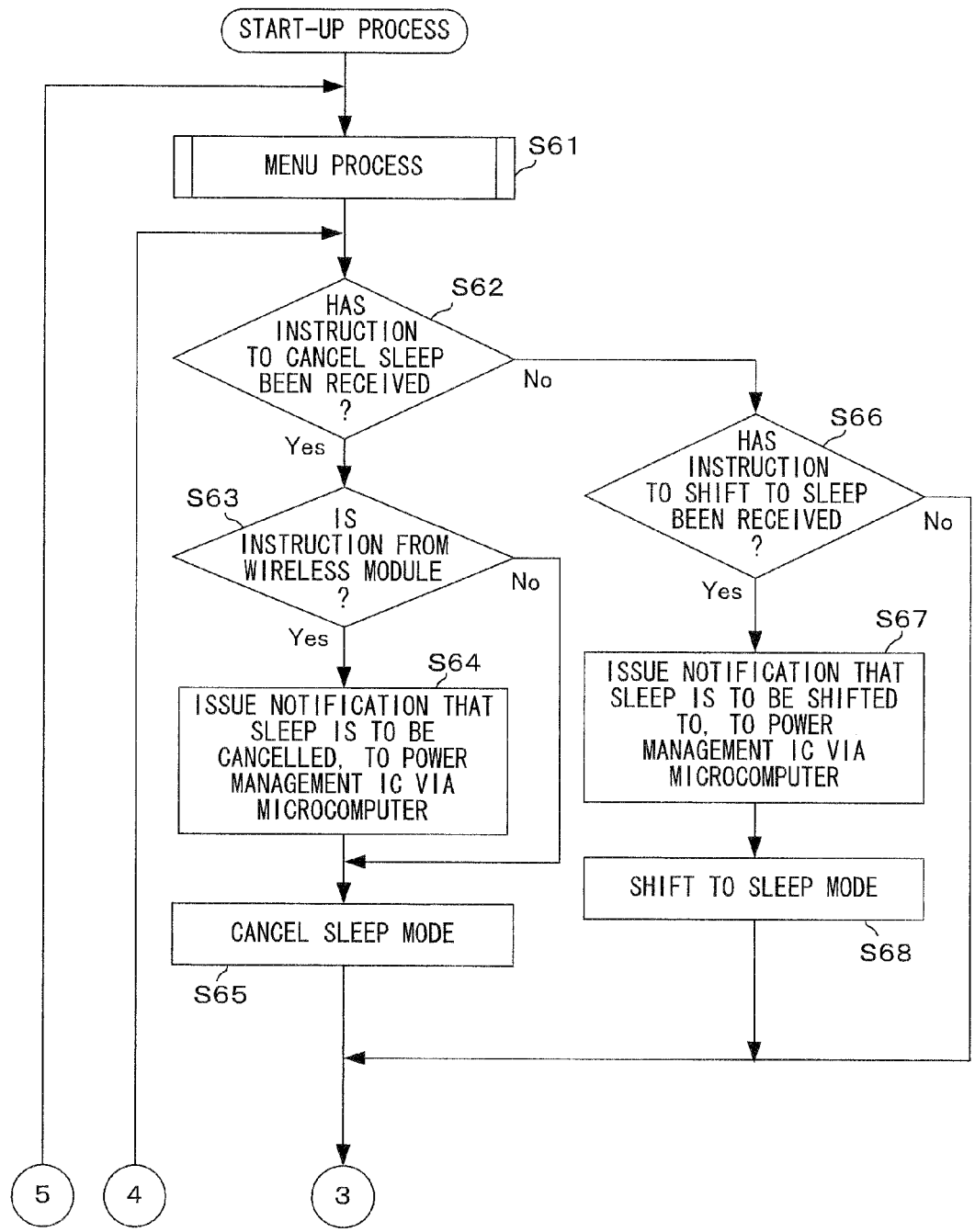
FIG. 24 is a flowchart showing in detail a start-up process.
Figure 25:
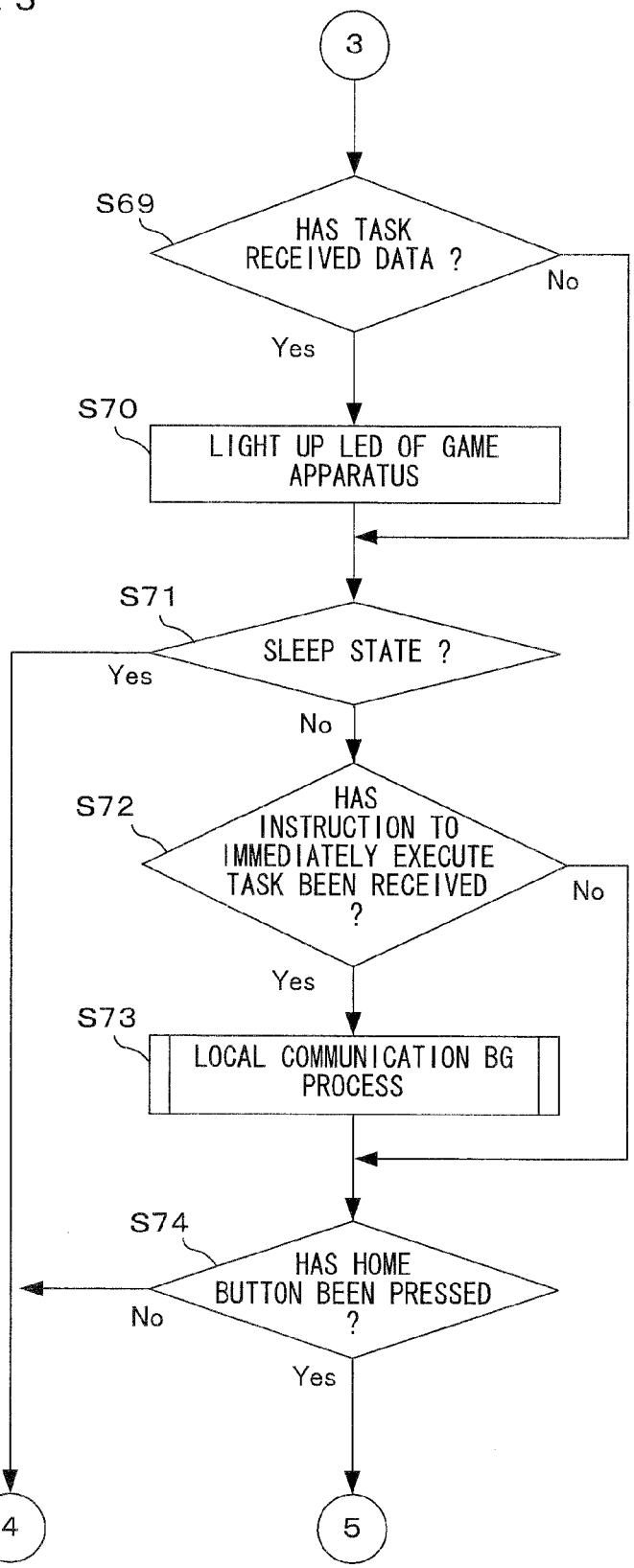
FIG. 25 is another flowchart showing in detail the start-up process.

FIGS. 24 and 25 are flowcharts showing in detail the start-up process performed when the game apparatus 1 is started. When the game apparatus 1 is started for the first time after purchasing, the process in the flowcharts is started. Then, unless the power is completely turned off, a process loop of steps S62 to S74 shown in FIGS. 24 and 25 is repeatedly performed as a background process. For example, even when a game process or the like is performed, the process in the flowcharts shown in FIGS. 24 and 25 is performed as a background process in parallel (this is because this process is monitoring of the home button 14I being pressed during the game process or the like and is an interrupt process at that time).

In FIG. 24, first, at step S61, a menu process is performed. This process will be described in detail later. Briefly describing an outline of this process, a process concerning display of a menu screen, a process of activating and executing an application which is selected by the user on the menu screen, and the like, are performed.

Next, at step S62, it is determined whether or not the CPU 31 has received an instruction to cancel the "sleep mode". Specifically, in the following cases, it is determined that the CPU 31 has received the instruction to cancel the "sleep mode".

(1) When, in the "sleep mode", the wireless communication module 34 receives a "passing connection request" or a "passing connection response" and the CPU 31 receives an instruction to cancel the "sleep mode" from the wireless communication module 34 (step S27 or S33 in FIG. 22).

(2) When, in the "sleep mode", the wireless communication module 34 receives a beacon from the dedicated AP 101 and the CPU 31 receives an instruction to cancel the "sleep mode" from the wireless communication module 34 (step S39 in FIG. 23).

(3) When the microcomputer 37 (RTC 39) detects coming of the next wake-up time and the CPU 31 receives an instruction to cancel the "sleep mode" from the microcomputer 37 (step S3 in FIG. 21).

(4) When the game apparatus 1 changes from the closed state to the opened state and the CPU 31 receives an instruction to cancel the "sleep mode" from the microcomputer 37 (step S7 in FIG. 21).

As a result of the determination, when it is determined that the CPU 31 has received an instruction to cancel the "sleep mode" (YES at step S62, it is determined at step S63 whether or not the cancellation instruction is an instruction issued from the wireless communication module 34. As a result, when it is determined that the cancellation instruction is the instruction issued from the wireless communication module 34 (YES at step S63), at step S64, a notification that the "sleep mode" is to be cancelled is issued to the power management IC 41 via the microcomputer 37, and the power supply state flag 304 in the microcomputer 37 is set to be ON. Accordingly, the power management IC 41 starts power supply to the CPU 31, and the "sleep mode" is cancelled at step S65. On the other hand, as a result of the determination at step S63, when it is determined that the cancellation instruction is not the instruction issued from the wireless communication module 34 (NO at step S63), the cancellation instruction is thought to be from the microcomputer 37. When the cancellation instruction is from the microcomputer 37, the notification to the power management IC 41 is already performed and the power supply state flag 304 is already changed. Thus, the process at the step S64 is skipped, and the processing proceeds to step S65. Then, the processing proceeds to later-described step S69.

On the other hand, as a result of the determination at step S62, when it is determined that the CPU 31 has not received the instruction to cancel the "sleep mode" (NO at step S62), it is determined at step S66 whether or not the CPU 31 has received an instruction to shift to the "sleep mode". Specifically, in the following cases, it is determined that the CPU 31 has received the instruction to shift to the "sleep mode".

(1) When an instruction to return to the "sleep mode" again is issued after the "sleep mode" is cancelled and the "passing communication" is performed (step S166 in later-described FIG. 31).

(2) When the "sleep mode" is cancelled and communication is performed with the dedicated AP, and then an instruction to return to the "sleep mode" again is issued (step S195 in later-described FIG. 33).

(3) When an instruction to return to the "sleep mode" again is issued after the "sleep mode" is cancelled due to coming of the wake-up time and communication is performed (step S195 in later-described FIG. 33).

(4) When the game apparatus 1 changes from the opened state to the closed state and the CPU 31 receives an instruction to shift to the "sleep mode" from the microcomputer 37 (step S10 in FIG. 21).

The instructions in the above (1) to (3) are issued in the "local communication BG process" or "Internet communication BG process" described later.

As a result of the determination at step S66, when it is determined that the CPU 31 has received the instruction to shift to the "sleep mode" (YES at step S66), at step S67, a notification that the "sleep mode" is to be shifted to is given to the power management IC 41 via the microcomputer 37, and the power supply state flag 304 in the microcomputer 37 is set to be OFF. Then, at step S68, the shift to the "sleep mode" is performed. On the other hand, as a result of the determination at step S66, when it is determined that the CPU 31 has not received the instruction to shift to the "sleep mode" (NO at step S66), the processes at steps S67 and S68 are skipped, and the processing proceeds to step S69 which will be described below.

Next, at step S69 in FIG. 25, it is determined whether or not data has been received as a result of any task being executed. As a result, when it is determined that data has been received in any task (YES at step S69), at least any one of LEDs 15A to 15C of the game apparatus 1 is lit up at step S70. This operation corresponds to a so-called "new arrival notification". On the other hand, when it is determined that data has not been received (NO at step S69), the process at step S70 is skipped, and the processing proceeds to the next step S71.

Next, at step S71, it is determined whether or not the game apparatus 1 is in the "sleep mode". Specifically, the determination can be performed by referring to the power supply state flag 304. As a result, when it is determined that the game apparatus 1 is in the "sleep mode" (YES at step S71), the processing returns to step S62 and the same process is repeated. On the other hand, as a result of the determination at step S71, when it is determined that the game apparatus 1 is not in the "sleep mode" (NO at step S71), it is determined at step S72 whether or not the CPU 31 has received an instruction to immediately execute a predetermined task. As a result of the determination, when it is determined that the CPU 31 has not received the instruction to immediately execute the predetermined task (NO at step S72), the processing proceeds to later-described step S74. On the other hand, when it is determined that the CPU 31 has received the instruction to immediately execute the predetermined task (YES at step S72), the local communication BG process is performed at step S73. This process will be described in detail later. Briefly describing an outline of this process in this flow, a process of attempting to connect to an AP which is previously registered in the game apparatus 1, a process of transmitting and receiving data by using the "Internet communication" if the connection is successful, and the like, are performed (i.e., the task is executed).

Next, at step S74, it is determined whether or not the home button 14I has been pressed. As a result of the determination, when it is determined that the home button 14I has been pressed (YES at step S74), the processing returns to step S61 and the same process is repeated, and when it is determined that the home button 14I has not been pressed (NO step S74), the processing returns to step S62 and the same process is repeated. This is the end of the description of the start-up process.

[Menu Process]

The following will describe the menu process shown at step S61. In the process, a process concerning display of the menu screen and activation of an application is performed. Particularly, a process of reflecting a "new arrival element", such as a newly installed application, in the menu screen and displaying the menu screen, and the like, is performed. In addition, a process concerning update of the system of the game apparatus 1 is also performed.

Figure 26:
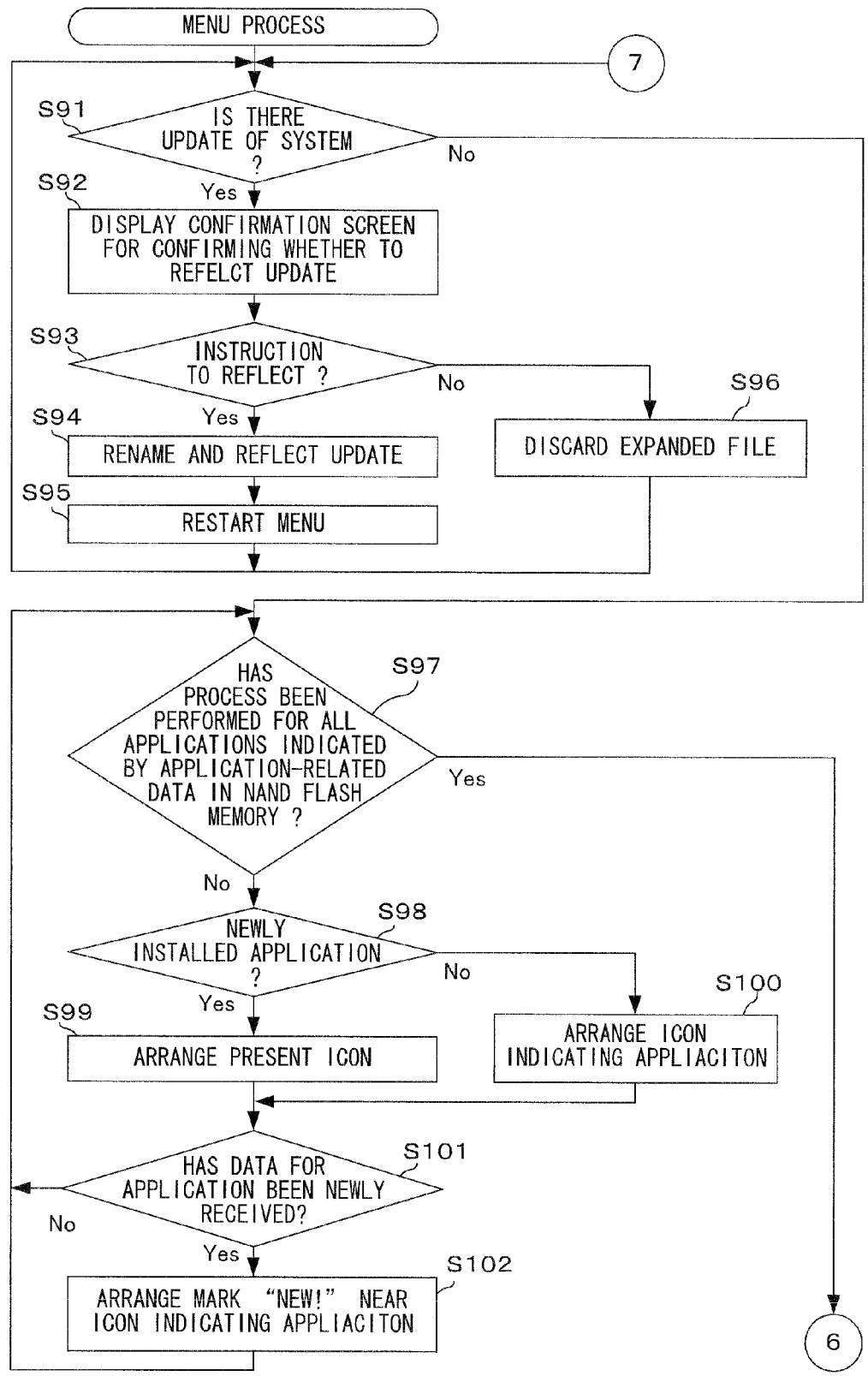
FIG. 26 is a flowchart showing in detail a menu process shown at step S61 in FIG. 24.

FIG. 26 is a flowchart showing in detail the menu process. In FIG. 26, first, at step S91, it is determined whether or not data for update of the system has been obtained as a result of execution of a task. The determination is performed on the basis of whether or not the data for update of the system is present in the on-the-fly cache 600 (note that the data is generated in the later-described "installation process"). In addition to such a determination method, a predetermined flag may be set to be ON when the data for update of the system is obtained, and the determination may be performed by referring to this flag.

As a result of the determination, when it is determined that the data for update of the system has not been obtained (NO at step S91), the processing proceeds to later-described step S97. On the other hand, when it is determined that the data for update of the system has been obtained (YES at step S91), a process concerning the update of the system of the game apparatus 1 is performed. Specifically, first, the data for update of the system, which is present in the on-the-fly cache 600, is transferred to a memory area in which the system data is stored. As described above, a file name different from the actual file name of the system data is assigned to the data for update of the system, which is expanded onto the on-the-fly cache 600. Thus, at that time, in the memory area in which the system data is stored, two data, for example, data having a name of "firmware.bin" (the system data stored before update) and data having a name of "firmware.upd" (the data for update) are present together.

Next, at step S92, a confirmation screen for confirming with the user whether or not to reflect the data for update of the system is generated and displayed on the lower LCD 12. Then, an instruction input from the user is received on the confirmation screen. The reason why such a confirmation screen is provided is as follows. Update of the system is related to the basis of the game apparatus 1. Thus, depending on the contents, update of the system may have a great effect on the user. Thus, such a confirmation is made with the user.

Next, at step S93, it is determined whether or not an instruction of the user on the confirmation screen is an instruction to reflect the data for update of the system. As a result of the determination, when it is determined that the instruction of the user is the instruction to reflect the data for update of the system (YES at step S93), update of the system data is reflected at step S94. Specifically, update of the system data is reflected by deleting the original system data (before update), and renaming the file name of the data for update of the system to the file name of the original system data. As described above, after the update confirmation, the system data is updated by a process of renaming the file name. Thus, it seems to the user that update of the system is performed in a moment. Conventionally, the user usually has to wait for completion of such an update process for a certain time period. However, as described above, when the data for update of the system is present, the data is downloaded and the file is expanded previously, and then the confirmation is made with the user as described above. By so doing, the user can be prevented from feeling that the user waits for completion of the update of the system. After the end of the process at step S94, the menu is restarted at step S95. As a result, the processing returns to step S91.

Note that, since items, such as free applications and trial version games, other than update of the system are thought to have a small effect on the entire system, the items are automatically installed without making a confirmation as described above, and reflected in the menu screen (the later-described "installation process").

On the other hand, as a result of the determination at step S93, when it is determined that the instruction of the user is an instruction not to reflect the data for update of the system (NO at step S93), the data for update of the system ("firmware.upd" in the above example) is discarded at step S96. Then, the processing returns to step S91.

The following will describe a process performed when, as a result of the determination at step S91, it is determined that the data for update of the system has not been obtained (NO at step S91). In this case, generation of a menu screen is performed. In the present embodiment, a menu screen is generated and displayed by performing a process of scanning applications installed in the game apparatus 1, and arranging an icon corresponding to each detected application, in the menu screen as appropriate. In addition, during the process of the scan, a process concerning presence/absence of a new arrival element (an application or the like installed newly in the later-described "installation process") is also performed.

Specifically, first, at step S97, the application-related data 550 in the NAND flash memory 33 is referred to, and it is determined whether or not a process (scan of an application) as will be described below has been performed for all the applications installed in the game apparatus 1. As a result of the determination, when it is determined that unprocessed applications remain (NO at step S97), one application is selected from the unprocessed applications as a processing target (hereinafter, referred to as a scan target application), and it is determined at step S98 whether or not the scan target application is a newly installed application. The determination is performed by referring to the application-related data 550, and on the basis of whether or not the new installation flag 554 in the application area corresponding to the scan target application has been set to be ON.

As a result of the determination, when it is determined that the scan target application is a newly installed application (YES at step S98), at step S99, a present icon 112 as shown in FIG. 5 is generated and arranged as appropriate in the menu screen. On the other hand, when it is determined that the scan target application is not a newly installed application (NO at step S98), at step S100, an icon corresponding to the scan target application is generated and arranged as appropriate in the menu screen.

Next, at step S101, it is determined whether or not data for the scan target application (e.g., an announcement, additional contents, and the like) has been received. The determination is performed by referring to, for example, the task reception cache 553 in the application area 551 and/or the reception box 524 of the passing communication data 520 associated with the scan target application. As a result of the determination, when it is determined that there is newly received data (YES at step S101), at step S102, a mark "NEW!" as shown in FIG. 6 is arranged near the icon corresponding to the scan target application. Then, the processing returns to step S97, and the next scan target application is selected. On the other hand, as a result of the determination at step S101, when it is determined that there is no newly received data (NO at step S101), the process at step S102 is skipped, and the processing returns to step S97.

Figure 27:
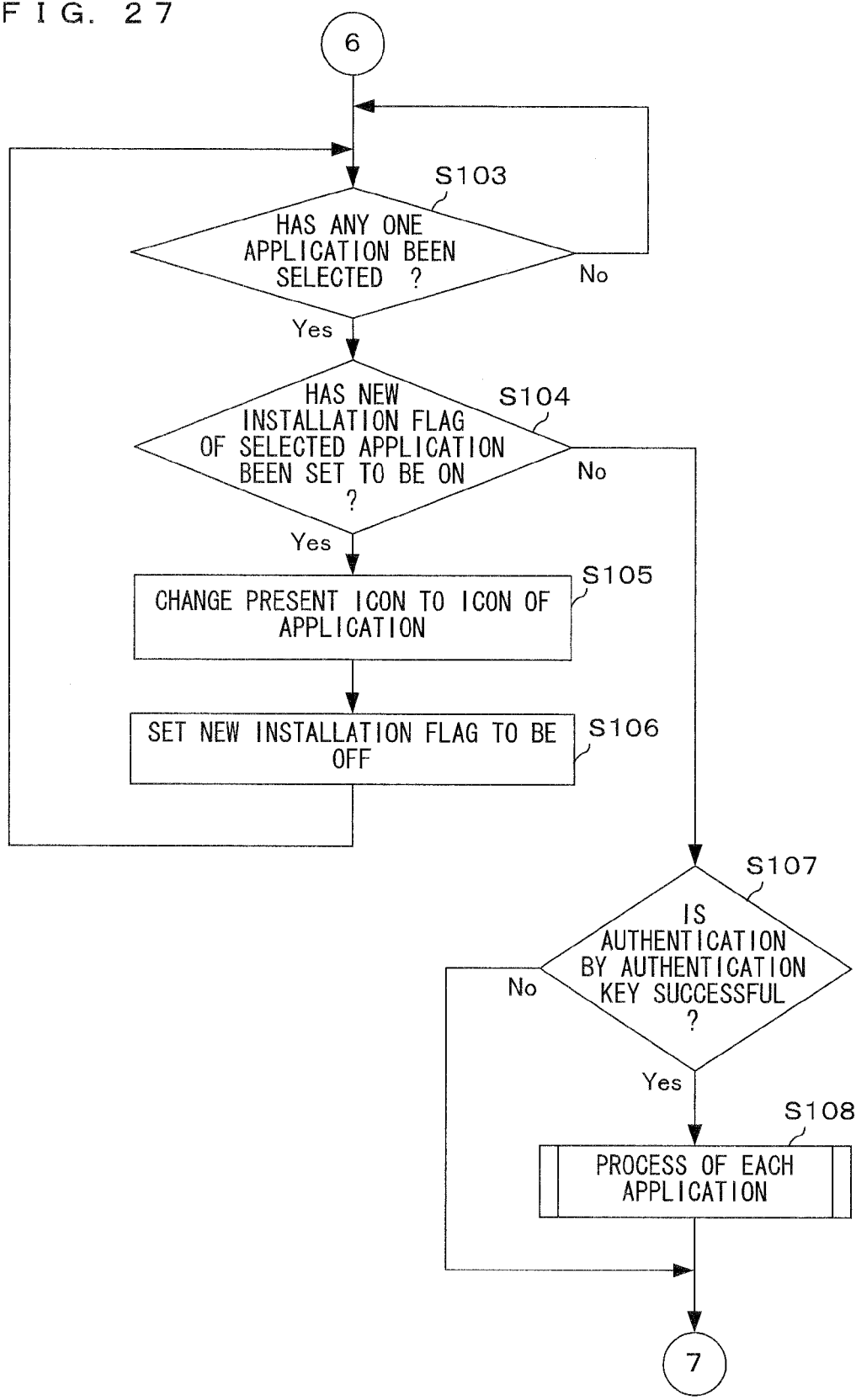
FIG. 27 is another flowchart showing in detail the menu process shown at step 61 in FIG. 24.

The following will describe a process performed when it is determined at step S97 that the process (scan) has been performed for all the applications (YES at step S97). In this case, a process concerning activation and execution of an application is performed. Specifically, at step S103 in FIG. 27, it is determined whether or not any one icon indicating an application has been selected from the menu screen. For example, it is determined whether or not the user performs a touch-on operation on a predetermined icon in the menu screen as shown in FIG. 4. As a result of the determination, when it is determined that no (icon of) application on the menu screen has been selected (NO at step S103), the determination at step S103 is repeated.

On the other hand, when it is determined that any one (icon of) application in the menu screen has been selected (YES at step S103), it is determined at step S104 whether or not the new installation flag 554 corresponding to the selected application has been set to be ON. In other words, it is determined whether or not the selected application is a newly installed application. As a result, when it is determined that the new installation flag 554 has been set to be ON (YES at step S104), an icon corresponding to the application is displayed as the present icon 112, and thus, at step S105, the present icon 112 is changed to an icon which is originally defined as an icon of the application (and which is stored as a part of the application program). In this case, an animation display in which the box of the present icon 112 is opened is performed.

Next, at step S106, the new installation flag 554 for the application is set to be OFF, and the processing returns to step S103.

On the other hand, as a result of the determination at step S104, when it is determined that the new installation flag 554 has been set to be OFF (NO at step S104), activation and execution of an application selected next time are performed. First, when the selected application is activated, at step S107, an authentication process is performed by using an authentication key, and it is determined whether or not the authentication is successful. The authentication process is a process for preventing an unauthorized application, which is installed due to a certain reason, from being executed. It is determined whether or not the application is a genuine application, by using an authentication key downloaded together with the application program. As a result of the determination, when the authentication is successful (YES at step S107), at step S108, a process concerning the selected application (hereinafter, referred to as "process of each application") is performed. Then, when the process concerning the application ends, the processing returns to step S91. On the other hand, when the authentication is failed (NO at step S107), the application is not executed, and the processing returns to step S91. This is the end of the description of the game apparatus menu process.

[Process of Each Application]

The following will describe the process of each application shown at step S108. Note that specific process contents of each application are naturally different from that of the other applications. Thus, the description concerning the difference is omitted, and a part related to the present embodiment, namely, a process concerning the task and a process related to each type of communication described above will be described as process contents common to the applications, namely, as a process which is thought to be performed generally in any of the applications.

Figure 28:
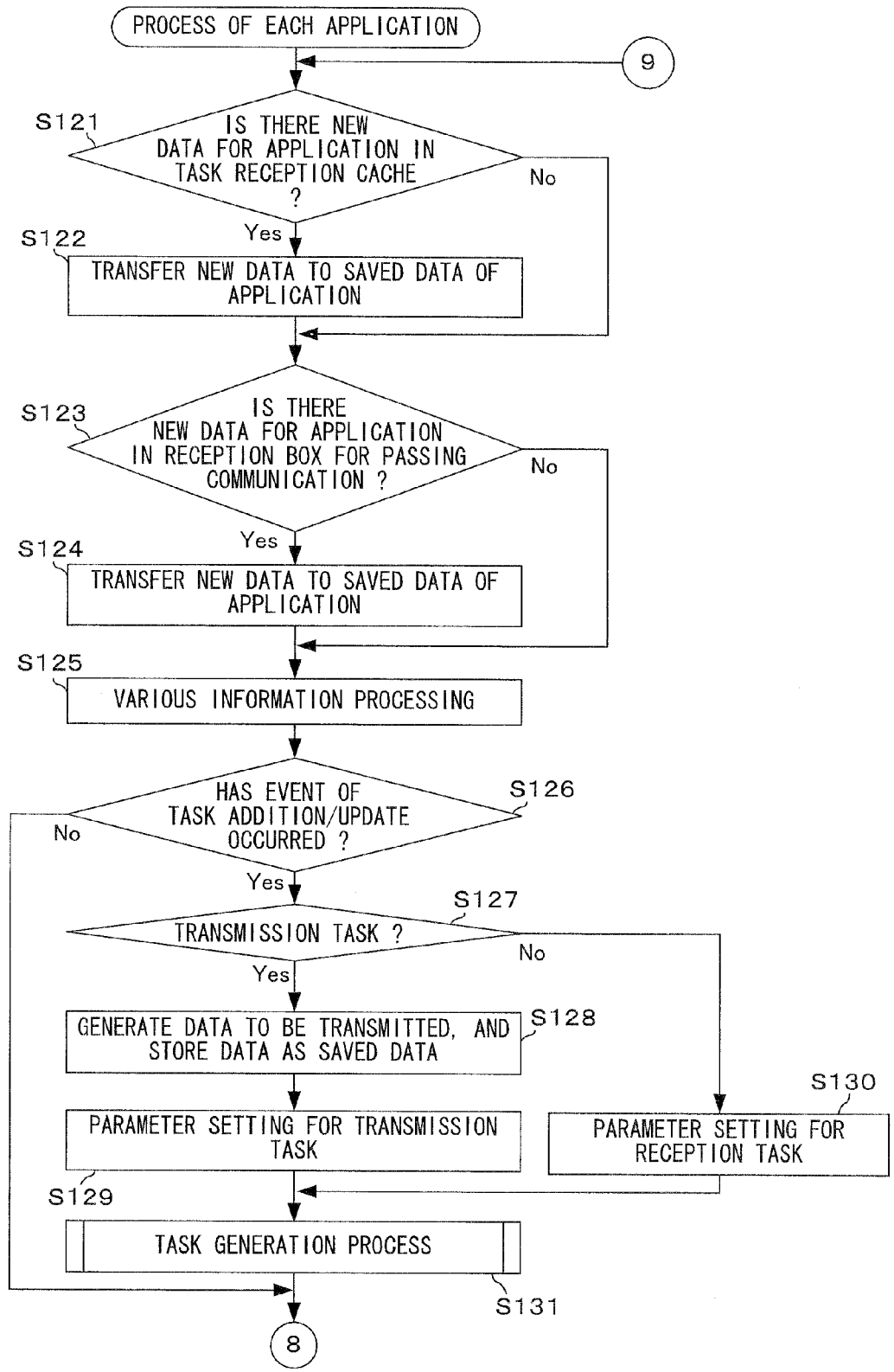
FIG. 28 is a flowchart showing in detail a process of each application shown at step S108 in FIG. 27.
Figure 29:
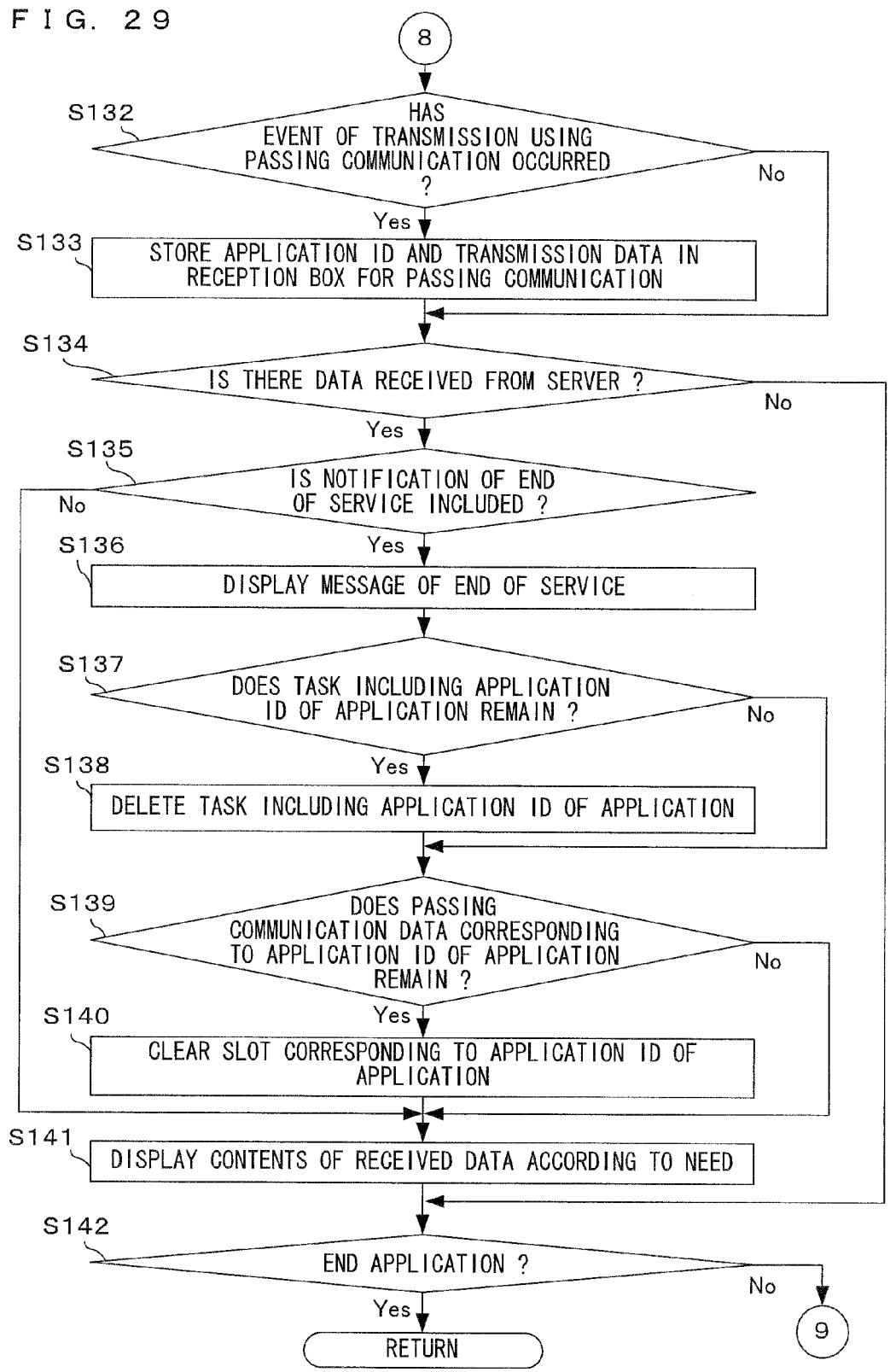
FIG. 29 is another flowchart showing in detail the process of each application shown at step S108 in FIG. 27.

FIGS. 28 and 29 are flowcharts showing in detail the process of each application. First, at step S121, it is determined whether or not, as a result of a task being executed, newly received data for the application is present in the task reception cache 553. As a result of the determination, when it is determined that the newly received data is present (YES at step S121), at step S122, the data in the task reception cache 553 is transferred to the task reception data 557 of the saved data 555 of the application (as a result, the task reception cache 553 becomes empty). Then, the processing proceeds to step S123. On the other hand, when no newly received data is present (NO at step S121), the process at step S122 is skipped, and the processing proceeds to step S123.

Next, at step S123, it is determined whether or not newly received data is present in the reception box 524 of the passing communication data 520 associated with the application. As a result of the determination, when it is determined that newly received data is present in the reception box 524 (YES at step S123), at step S124, the data in the reception box 524 is transferred to the passing reception data 558 of the saved data 555 of the application (as a result, the reception box 524 becomes empty). Then, the processing proceeds to step S125. On the other hand, when no newly received data is present in the reception box 524 (NO at step S123), the process at step S124 is skipped, and the processing proceeds to step S125.

Next, at step S125, various information processing corresponding to the contents of each application is performed. For example, game processing, painting software processing, camera application processing, or the like, is performed. In various information processing, the data in the task reception data 557 and the passing reception data 558, which are newly transferred thereto at steps S122 and S124, can be used.

Next, at step 126, it is determined whether or not an event of newly adding a task or changing the contents of a task has occurred as a result of various information processing at step S125. As a result, when it is determined that the event has not occurred (NO at step S126), the processing proceeds to later-described step S132.

On the other hand, when it is determined that the event of new addition of the task or the event of update of the task has occurred (YES at step S126), it is determined at step S127 whether the contents concerning the event having occurred are related to a "transmission task" or a "reception task". As a result of the determination, when it is determined that the contents are addition or update of the "transmission task" (YES at step S127), at the subsequent step S128, data to be transmitted is produced and stored as the task transmission data 556 of the saved data 555. In addition, at step S129, various parameters for the "transmission task" are set. The parameters which are set here are parameters for setting the items constituting the task setting 531 as shown in FIG. 16. Specifically, the following parameter setting is performed.

(1) Application ID→ID of the application.

(2) Task ID→a new value in the case of new addition of a task, and the same value as the task ID of a task to be updated in the case of update.

(3) Execution priority→an optional value.

(4) Communication destination URL→URL of a server which is a transmission destination.

(5) File path→a value indicating the location of the task transmission data 556.

(6) Next execution time→an optional value.

(7) Execution interval→an optional value.

(8) Transmission/reception identification flag→a value representing "transmission".

(9) Number of uses→an optional value.

After the above parameter setting is performed, the processing proceeds to later-described step S131.

On the other hand, as a result of the determination at step S127, when it is determined that the contents of the event having occurred are related to the "reception task" (NO at step S127), various parameters for the "reception task" are set at step S130. This process is s process of setting parameters for setting the items of the task setting 531, similarly to step S129. Specifically, the following parameter setting is performed.

(1) Application ID→the ID of the application.

(2) Task ID→a new value in the case of new addition of a task, and the same value as the task ID of a task to be updated in the case of update.

(3) Execution priority→an optional value.

(4) Communication destination URL→URL of a server which is a reception destination.

(5) File path→a value indicating a storage destination of received data (the task reception cache 553).

(6) Next execution time→an optional value.

(7) Execution interval→an optional value.

(8) Transmission/reception identification flag→a value representing "reception".

(9) Number of uses→an optional value.

After the above parameter setting is performed, the processing proceeds to later-described step S131.

Figure 30:
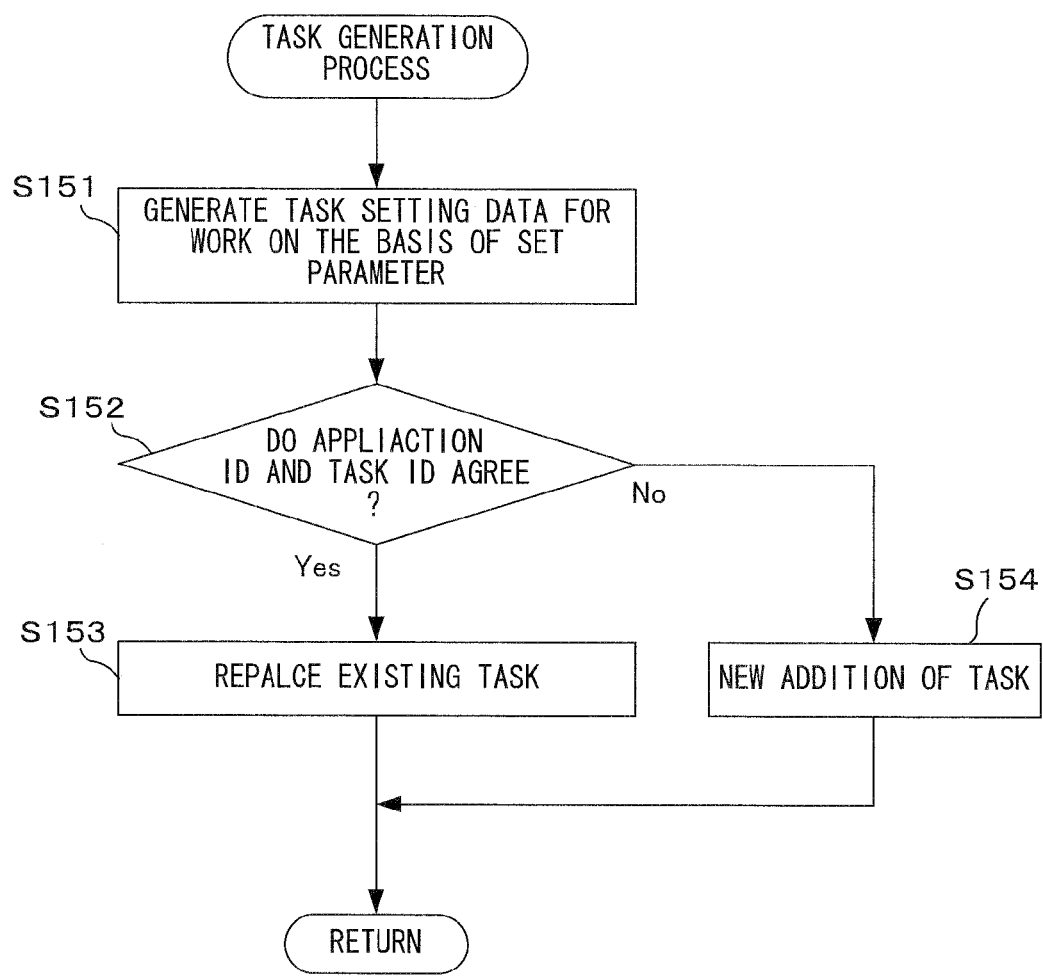
FIG. 30 is a flowchart showing in detail a task generation process shown at step S131 in FIG. 28.

Next, at step S131, a task generation process is performed for performing new addition of a task or update of an existing task on the basis of the above set parameters. FIG. 30 is a flowchart showing in detail the task generation process shown at step S131. In FIG. 30, first, at step S151, task setting data for work is generated on the basis of each of the above parameters. The task setting data for work is temporary data generated in the main memory 32 and has the same data structure as that of the task setting 531. Note that for the items which have optional values and whose parameters have not been determined yet, values which are determined as initial values are set.

Next, at step S152, it is determined whether or not the combination of an application ID and a task ID of the task setting data for work agrees with any combination of the application ID 532 and the any task ID 533 in the task settings 531 stored in the task data 530. In other words, it is determined whether a task is newly added or an existing task is updated. As a result of the determination, when there is an agreeing combination of IDs (YES at step S152), the contents of the agreeing task setting 531 are placed by (i.e, updated with) the task setting data for work at step S153. On the other hand, when there is no agreeing combination of IDs (NO at step S152), the task setting data for work is additionally registered as a new task setting 531 in the task data 530 at step S154. Then, the task setting data for work is deleted, and the task generation process ends.

Referring back to FIG. 28, after the end of the process at step S131, at step S132 in FIG. 29, it is determined whether or, as a result of the various information processing at step S125, an event concerning transmission using the "passing communication" has occurred. For example, in the various information processing, it is determined whether or not an instruction to transmit data using the "passing communication" has been made by the user. As a result of the determination, when it is determined that the event of transmitting data by using the "passing communication" has occurred (YES at step S132), transmission data corresponding to the event contents is generated as appropriate at step S133. Then, the generated transmission data is stored in the transmission box 523 of the slot 521, in the passing communication data 520, corresponding to the application. Then, the processing proceeds to later-described step S134. On the other hand, as a result of the determination at step S132, when it is determined that the event has not occurred (NO at step S132), the process at step S133 is skipped, and the processing proceeds to step S134.

Next, at step S134, it is determined whether or not data received from a server is present. In other words, it is determined whether or not new data has been received as a result of execution of a "reception task" (thus, when it is determined as YES at step S121, it is determined as YES here). For example, when new data has been received from a server, the new data has been transferred to the saved data 555 at step S122. Thus, this determination is performed by referring to the saved data 555.

As a result of the determination, when it is determined that no new data received from the server is present (NO at step S134), the processing proceeds to later-described step S142. On the other hand, when it is determined that new data received from the server is present (YES at step S134), it is determined at step S135 whether or not a notification announcing an end of a network service concerning the currently executed application is included in the received data. As a result, when it is determined that the notification announcing the end of the network service is not included (NO at step S135), the processing proceeds to later-described step S141.

On the other hand, when the notification announcing the end of the network service is included (YES at step S135), a message announcing the end of the network service is displayed on the upper LCD 22 or the lower LCD 12 at step S136. Next, at step S137, it is determined whether or not any task setting 531 including the application ID 532 of the currently executed application remains in the task data 530. When it is determined that the task setting 531 remains (YES at step S137), all the task settings 531 including the application ID 532 of the currently executed application are deleted. On the other hand, when it is determined that no such a task setting 531 remains (NO at step S137), the process at step S138 is skipped.

Next, at step S139, the passing communication data 520 is referred to, and it is determined whether or not a slot 521 to which the application ID 522 of the currently executed application is assigned is present. When it is determined that the slot 521 remains (YES at step S139), the contents in the slot 521 corresponding to the currently executed application are cleared at step S140. As a result, the association of the slot 521 with the application is cancelled. On the other hand, when it is determined that no such a slot remains (NO at step S139), the process at step S140 is skipped.

Next, at step S141, a process of displaying the contents of the new received data is performed according to need.

Next, at step S142, it is determined whether or not a condition for ending the application process being performed is satisfied. As a result, when the condition is not satisfied (NO at step S142), the processing returns to step S121 and the same process is repeated. When the condition is satisfied (YES at step S142), the application processing is ended. This is the end of the description of the processing of each application.

[Local Communication BG Process]

The following will describe the local communication BG process (specifically, step S4 in FIG. 21, steps S28 and S34 in FIG. 22, step S40 in FIG. 23, and step S73 at FIG. 25) which is called as appropriate in each process as described above. In this process, a transmission/reception process in the "passing communication", and control such as scan of the predetermined AP and a process of connecting to the AP, are mainly performed. In addition, when connecting to the predetermined AP, the "Internet communication BG process", which is a process for performing the "Internet communication", and the like are called as appropriate.

Figure 31:
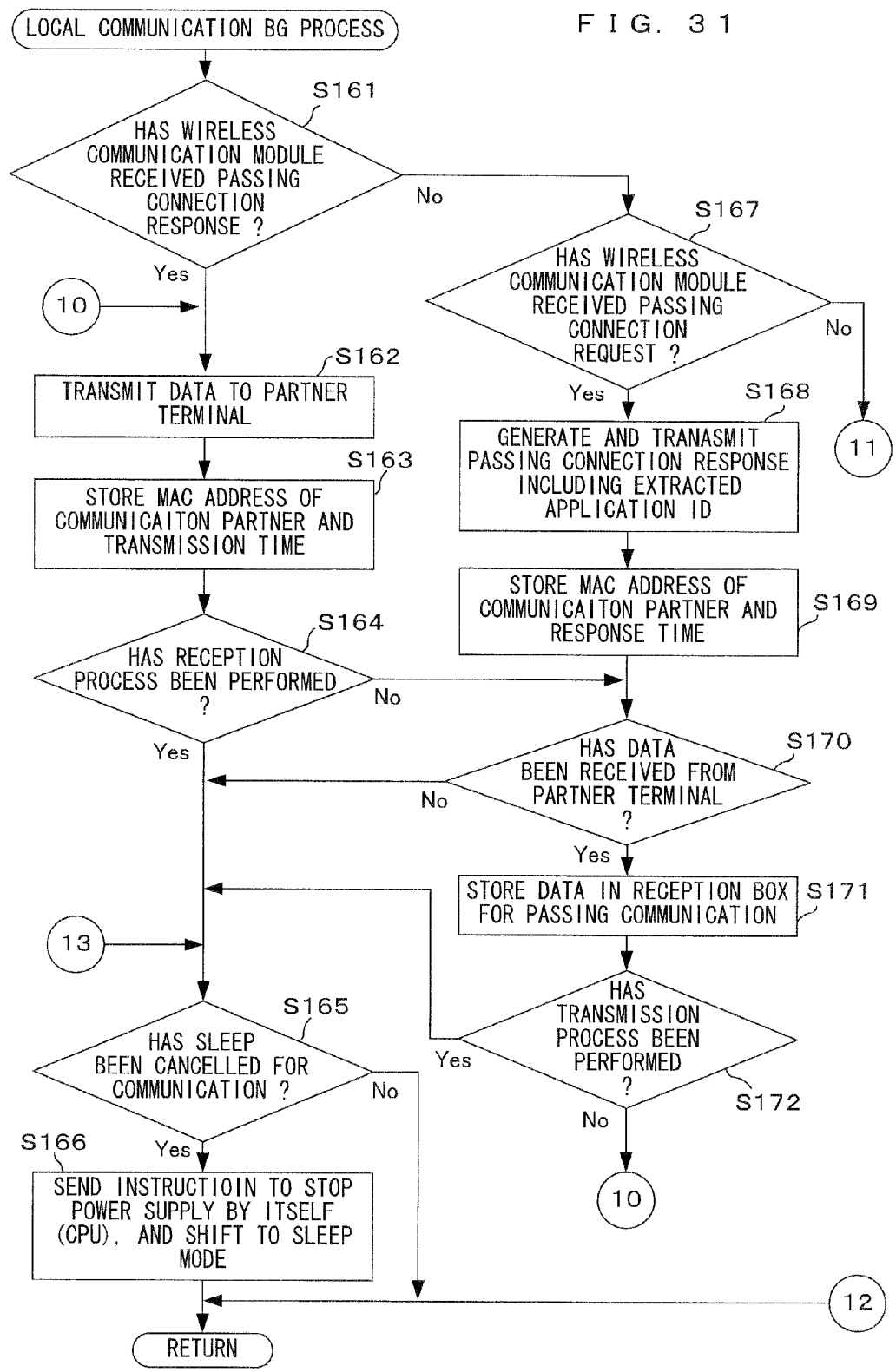
FIG. 31 is a flowchart showing in detail a local communication BG process.
Figure 32:
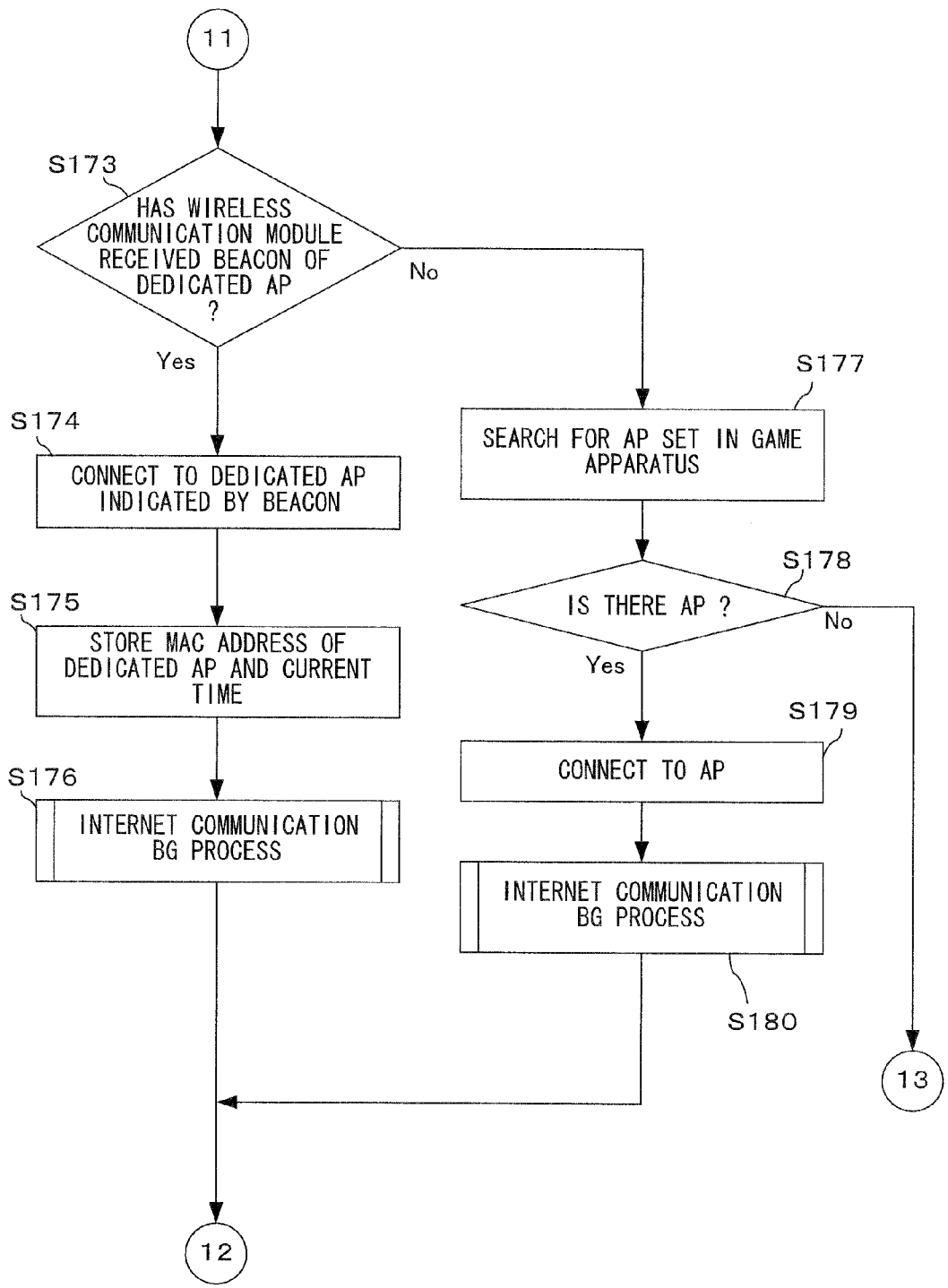
FIG. 32 is another flowchart showing in detail the local communication BG process.

FIGS. 31 and 32 are flowcharts showing in detail the local communication BG process. First, at step S161, it is determined whether or not the wireless communication module 34 has received a passing connection response. For example, the determination is performed by a process of the CPU 31 inquiring of the wireless communication module 34 about whether or not the wireless communication module 34 has received a passing connection response. As a result of the determination, when it is determined that the wireless communication module 34 has not received the passing connection response (NO at step S161), the processing proceeds to later-described step S167. On the other hand, when it is determined that the wireless communication module 34 has received the passing connection response (YES at step S161), it indicates that there is another game apparatus 1 which can respond to a request issued by the game apparatus 1 (i.e., to which a connection has been established for local communication) (step S28 in FIG. 22 comes in this flow). Thus, at the next step S162, the data in the transmission box 523 of the passing communication data 520 is transmitted to the other game apparatus 1 which is the communication partner. Note that, as described above, data to be transmitted is limited to data in a slot 521 whose application ID 522 agrees with that in the passing communication data 520 of the communication partner.

Next, at step S163, a transmission time and the MAC address of the other game apparatus 1, which is the communication partner, are stored in the communicated terminal/dedicated AP information 405 in the wireless communication module 34.

Next, at step S164, it is determined whether or not a process of "reception" in the passing communication has been performed. In the present embodiment, in the passing communication, as a general rule, "transmission" and "reception" are performed as a set. Thus, in this determination, it is determined whether both of "transmission" and "reception" or either of "transmission" or "reception" has been performed. As a result of the determination, when it is determined that the reception process has not been performed (NO at step S164), the processing proceeds to later-described step S170, and data transmitted from the communication partner is received.

On the other hand, when it is determined that the reception process has already been performed (YES at step S164), it is determined at step S165 whether or not the "sleep mode" has been cancelled for performing the communication (the communication includes "local communication" as well as later-described "Internet communication"). As a result of the determination, when it is determined that the "sleep mode" has been cancelled for the communication (YES at step S165), the game apparatus 1 is thought to be in the "sleep mode" before the communication, and thus for returning to the "sleep mode", at step S166, an instruction to stop power supply to the CPU 31 is sent from the CPU 31 itself, and a process for shifting to the "sleep mode" is performed. In addition, the power supply state flag 304 in the microcomputer 37 is set to be OFF, and a notification that the "sleep mode" is to be shifted to is given to the power management IC 41. On the other hand, as a result of the determination at step S165, when it is determined that the "sleep mode" has not been cancelled for the communication (NO at step S165), the game apparatus 1 is thought to have been operating in the "normal power mode", and thus the process at step S166 is skipped. Then, the local communication BG process ends.

The following will describe a process performed when, as a result of the determination at step S161, it is determined that the wireless communication module 34 has not received the passing connection response. In this case, first, at step S167, it is determined whether or not the wireless communication module 34 has received a passing connection request, namely, a request for passing communication from another game apparatus 1. As a result, when it is determined that the wireless communication module 34 has not received the request (NO at step S167), the processing proceeds to later-described step S173. On the other hand, when it is determined that the wireless communication module 34 has received the request (YES at step S167), at step S168, a passing connection response is generated and transmitted to the other game apparatus 1 which is the transmission source of the passing connection request (note that the process at step S34 in FIG. 22 proceeds in this flow). In this case, the passing connection response includes the contents of the extracted application ID 406 stored in the wireless communication module 34, and is transmitted (in other words, an application which is an object of the passing communication is notified to the communication partner).

Next, at step S169, a response time and the MAC address of the other game apparatus 1, which is the communication partner, are stored in the communicated terminal/dedicated AP information 405 in the wireless communication module 34.

Next, at step S170, it is determined whether or not data has been received from the communication partner. In the present embodiment, only an item whose application ID 522 agrees with that in the communication partner is a transmission/reception object. Thus, in this determination, the case is determined, where a request for passing communication is received from another game apparatus 1 and a connection thereto is established, but no data to be transmitted and received is present due to no agreeing application ID 522 in the both apparatuses 1. In other words, when the connection response transmitted at step S169 is received by the partner terminal but it is determined as NO at step S25 in FIG. 22 in the partner terminal, no data is transmitted. When it is determined that no data has been received from the partner terminal (within a predetermined time period) (NO at step S170), this case is thought to correspond to the case of no agreeing application ID 522, and thus the processing proceeds to step S165 and it is determined whether or not to return to the "sleep mode". On the other hand, when it is determined that data has been received from the partner terminal (YES at step S170), at step S171, the received data is stored in the reception box 524 of the slot 521 corresponding to the application ID 522. Note that, when the processing proceeds from step S164 to step S170, it indicates that there is at least one transmission/reception object having an agreeing application ID 522, and data is transmitted from the partner terminal. Thus, unless a transmission error occurs during transmission, it is determined as YES at step S170.

Next, at step S172, it is determined whether or not the transmission process in the passing communication has already been performed. As a result, when it is determined that the transmission process in the passing communication has not been performed (NO at step S172), the processing proceeds to step S162, and the transmission process in the passing communication is performed. On the other hand, when it is determined that the transmission process has already been performed (YES at step S172), the processing proceeds to step S165.

The following will describe a process performed when, as a result of the determination at step S167, it is determined that the passing connection request has not been received. In this case, a process concerning the "Internet communication" is performed. First, at step S173 in FIG. 32, it is determined whether or not the wireless communication module 34 has received a beacon from a dedicated AP 101. As a result of the determination, when it is determined that the wireless communication module 34 has received the beacon from the dedicated AP 101 (YES at step S173), a process of connecting to the dedicated AP 101, which is the transmission source of the beacon, is performed at step S174. Note that the process at step S40 in FIG. 23 proceeds in this flow.

Next, at step S175, the current time and the MAC address of the connected dedicated AP 101 are stored in the communicated terminal/dedicated AP information 405 in the wireless communication module 34.

Next, at step S176, the Internet communication BG process is performed. In this process, obtaining of policy data, a process based on the policy data, and a process of executing a task are performed. This process will be described in detail later. When this process ends, the local communication BG process ends.

On the other hand, as a result of the determination at step S173, when it is determined that the wireless communication module 34 has not received the beacon from the dedicated AP 101 (NO at step S173), at step S177, the game apparatus setting data 560 is referred to, and a process of searching for a predetermined AP which is registered and set in the game apparatus 1 is performed. For example, a process of searching for an AP which is set at user's home, an AP of a public wireless LAN service which is previously defined as a setting before shipment, or the like, is performed. The search method is typically passive scan, but the game apparatus 1 can connect directly to an AP if the ESSID of the AP and a frequency used for communication with the AP are previously stored in the game apparatus 1.

Next, at step S178, on the basis of a result of the search at step S177, it is determined whether or not the AP is present. As a result, when it is determined that the AP is not present (the AP is not detected as a result of the search) (NO at step S178), the processing proceeds to step S165. On the other hand, when it is determined that the AP is present (YES at step S178), a process of connecting to the searched AP is performed at step S179. Then, at step S180, the later-described Internet communication BG process is performed. When this process ends, the local communication BG process ends. This is the end of the description of the local communication BG process.

[Internet Communication BG Process]

The following will describe the Internet communication BG process shown at step S176 and the like. In this process, a process concerning transmission and reception of various data using the "Internet communication", and the like, are performed.

Figure 33:
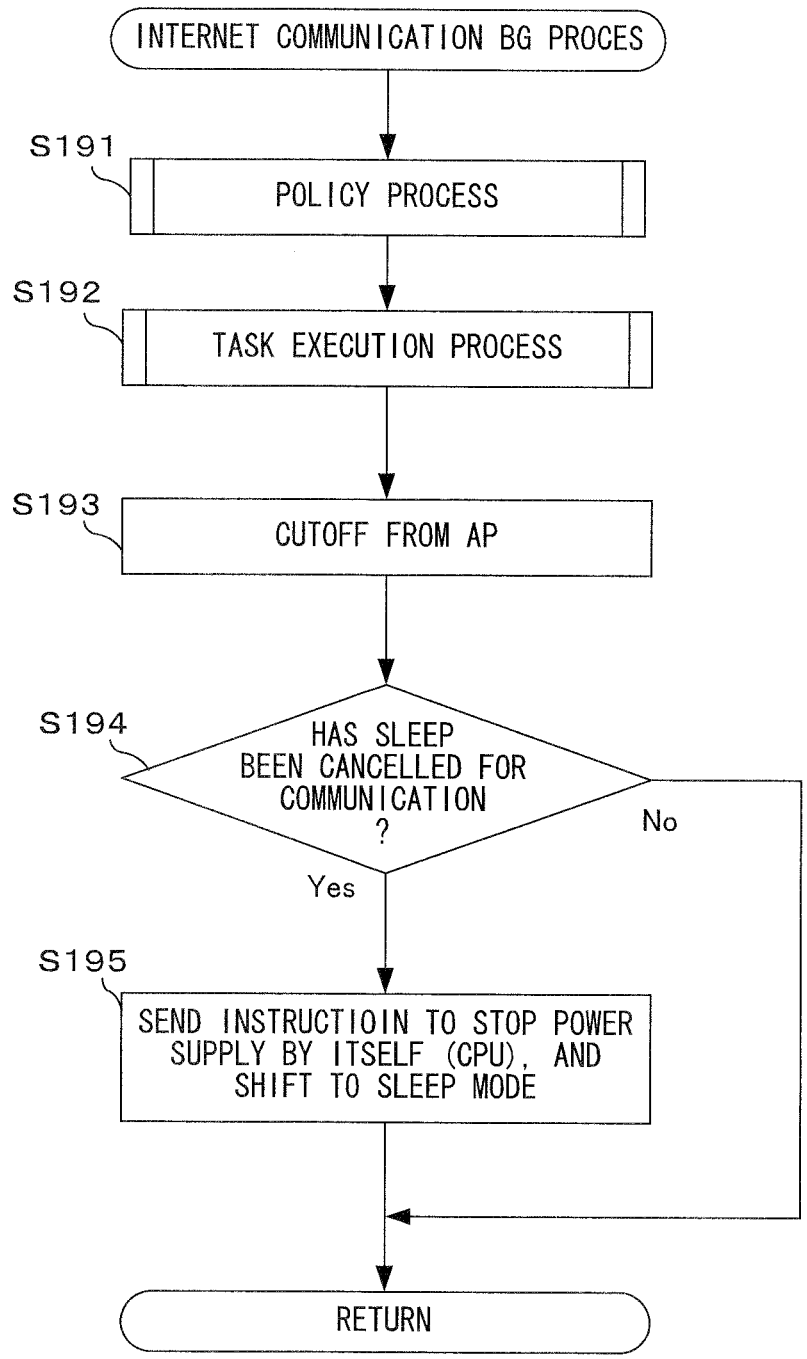
FIG. 33 is a flowchart showing in detail an Internet communication BG process.

FIG. 33 is a flowchart showing in detail the Internet communication BG process. First, at step S191, a policy process is performed. This process will be described in detail later, and here, obtaining of policy data and adjustment of the execution priorities of tasks based on the policy data are mainly performed.

Next, at step S192, a task execution process is performed. This process will also be described in detail later. In this process, execution of tasks, installation process, and the like are performed.

When the task execution process ends, cutoff of communication with the AP 101 or 102 is performed at step S193. At the subsequent step S194, it is determined whether or not the "sleep mode" has been cancelled for the communication. As a result, when it is determined that the "sleep mode" has been cancelled (YES at step S194), at step S195, for returning to the "sleep mode", an instruction to stop power supply to the CPU 31 is sent from the CPU 31 itself, and a process for shifting to the "sleep mode" is performed. In addition, the power supply state flag 304 in the microcomputer 37 is set to be OFF, and a notification that the "sleep mode" is to be shifted to is given to the power management IC 41. On the other hand, as a result of the determination at step S194, when it is determined that the "sleep mode" has not been cancelled for the communication (NO at step S194), the process at step S195 is skipped. Then, the Internet communication BG process ends.

[Policy Process]

Figure 34:
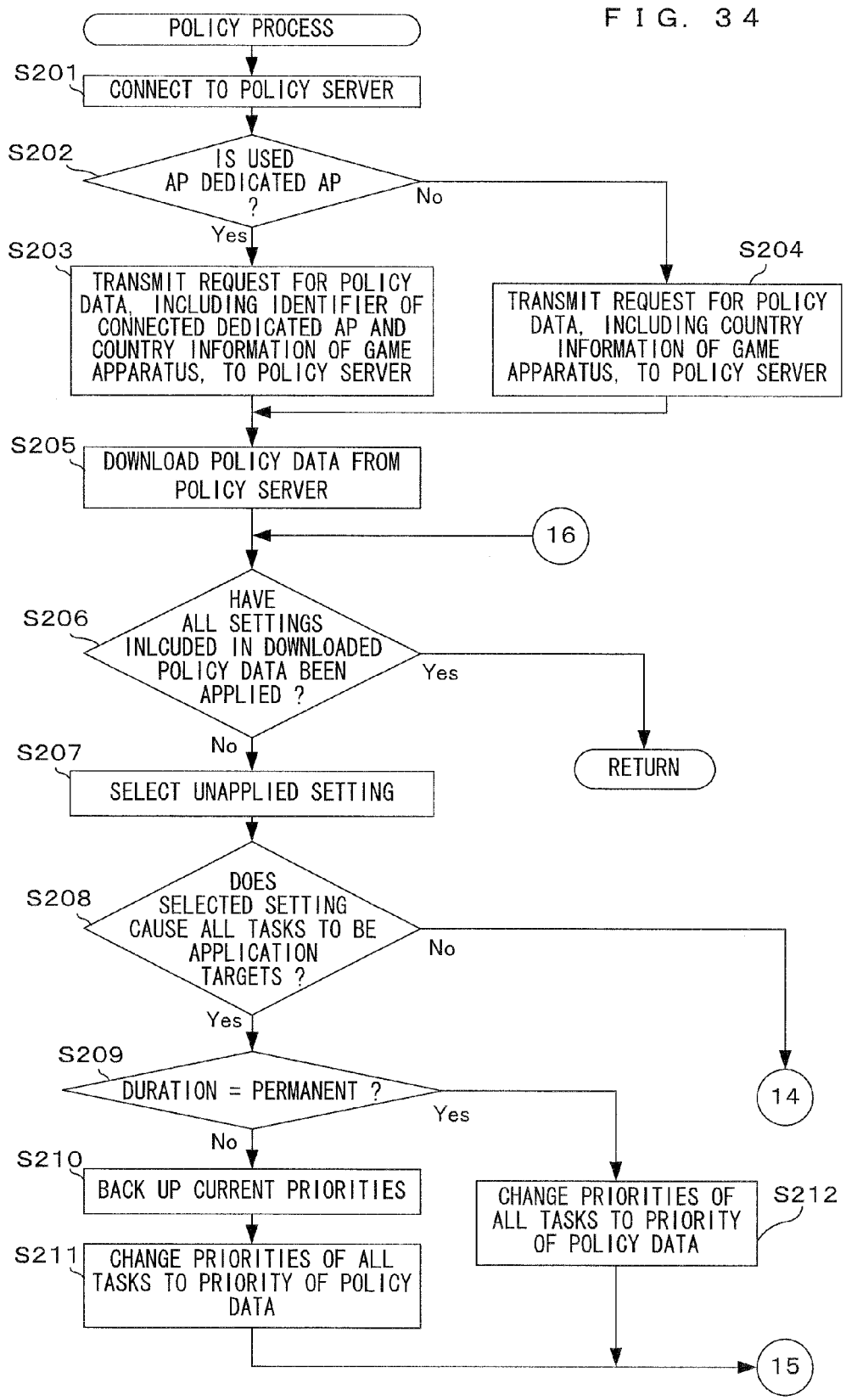
FIG. 34 is a flowchart showing in detail a policy process shown at step S191 in FIG. 33.
Figure 35:
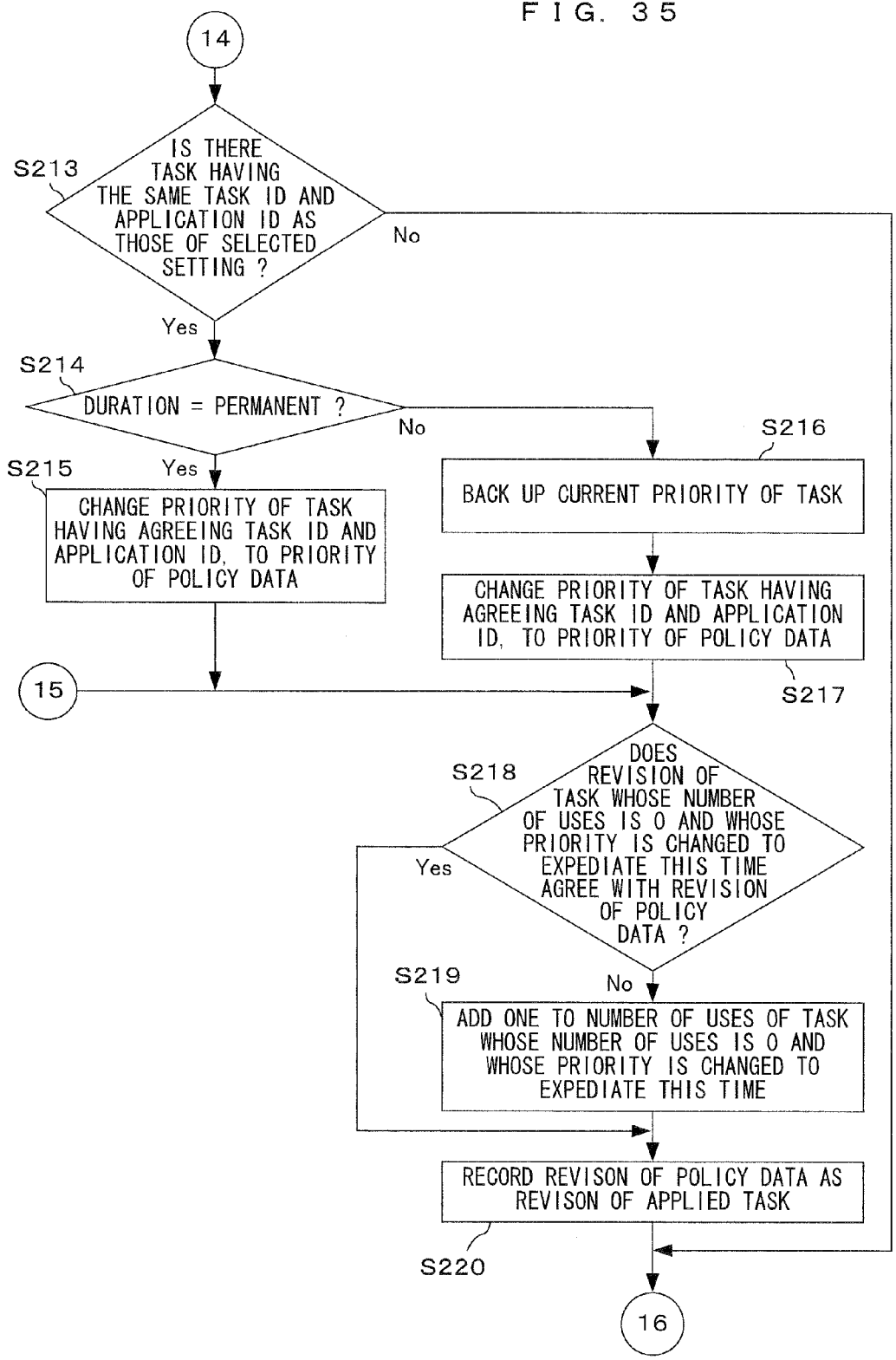
FIG. 35 is another flowchart showing in detail the policy process shown at step S191 in FIG. 33.

The following will describe the policy process shown at step S191. FIGS. 34 and 35 are flowcharts showing in detail the policy process. First, at step S201, a process of establishing a connection to the policy server 103 as described above is performed. Next, at step S202, it is determined whether or not the AP currently used for communication is a dedicated AP 101. The determination is performed on the basis of whether or not vendor specific information as described above is included in the beacon used for the connection to the AP. As a result of the determination, when it is determined that the dedicated AP 101 is used (YES at step S202), at step S203, a request for policy data, which includes an identifier of the used dedicated AP 101 and country information which is set in the game apparatus 1 (and which is included in the game apparatus setting data 560), is generated and transmitted to the policy server 103. The request is, for example, an HTTP request as described below.

"https://xxx.net/character string indicating country information/AP identifier/"

On the other hand, when it is determined that the AP currently used for communication is not the dedicated AP 101 (NO at step S202), at step S204, a request for policy data, which includes the country information, is generated and transmitted to the policy server 103. For example, this request is as follows.

"https://xxx.net/character string indicating country information/"

In response to the request as described above, the policy data is transmitted from the policy server 103. Thus, next, at step S205, the policy data is downloaded from the policy server 103 and stored as the received policy data 570 in the main memory 32 or the NAND flash memory 33.

After the end of the downloading, a process for applying the downloaded received policy data 570 is performed. Specifically, first, at step S206, it is determined whether or not the following process has been performed for all the policy settings 574 included in the received policy data 570, in other words, change of the execution priority and the number of uses has been applied thereto. As a result of the determination, when it is determined that the change has been applied to all the policy settings 574 (all the policy settings 574 have been processed) (YES at step S206), the policy process ends. On the other hand, when any unapplied (unprocessed) policy settings 574 remain (NO at step S206), one policy setting 574 is selected from the unapplied policy settings 574 at step S207. Hereinafter, the selected policy setting 574 is referred to as "process target policy setting".

Next, at step S208, it is determined whether or not the contents of the process target policy setting are contents which cause all tasks to be application targets. The determination is performed on the basis of whether or not a character string indicating that all the tasks are caused to be application targets is indicated in the task ID 576 of the process target policy setting. As a result of the determination, when it is determined that the contents of the process target policy setting are not the contents which cause all the tasks to be application targets (NO at step S208), the processing proceeds to later-described step S213.

On the other hand, as a result of the determination, when it is determined that all the tasks are caused to be application targets (YES at step S208), it is determined at step S209 whether or not the task duration 578 of the process target policy setting has been set to be ON, namely, is contents indicating "permanent". As a result of the determination, it is determined as "permanent" (YES at step S209), the execution priorities 534 of all the tasks registered in the game apparatus 1 (i.e., in the task data 530) are changed to a value indicated by the execution priority 577 of the process target policy setting, at step S212. Then, the processing proceeds to later-described step S218.

On the other hand, as a result of the determination at step S209, when it is determined as not "permanent" (NO at step S209), the current execution priorities 534 of all the tasks in the task data 530 are backed up in the main memory 32 at step S210. Then, at step S211, the execution priorities 534 of all the tasks registered in the game apparatus 1 are changed to the value indicated by the execution priority 577 of the process target policy setting. Then, the processing proceeds to later-described step S218.

The following will describe a process performed when, as a result of the determination at step S208, it is determined that the contents of the process target policy setting are the contents which cause all tasks to be application targets. In this case, at step S213, the task data 530 is referred to, and it is determined whether or not a task setting 531 having the same values as those of the task ID 576 and the application ID 575 of the process target policy setting is present in the task data 530. As a result of the determination, when it is determined that such a task setting 531 is not present (NO step S213), it is determined that the process target policy setting has been processed, and the processing returns to step S206. As a result, an unprocessed policy setting 574 is selected as the next process target policy setting from the received policy data 570, and the same process is repeated.

On the other hand, when it is determined that the task setting 531 having the agreeing task ID and application ID is present (YES at step S213), it is determined at step S214 whether or not the task duration 578 of the process target policy setting is a value indicating "permanent". As a result, when the task duration 578 indicates "permanent" (YES at step S214), at step S215, the execution priority 534 of the task setting 531 having the agreeing task ID and application ID is set to be a value indicated by the execution priority 577 of the process target policy setting. Then, the processing proceeds to later-described step S218.

On the other hand, as a result of the determination at step S214, when it is determined that the task duration 578 does not indicate "permanent" (NO at step S214), the execution priority 534 of the task setting 531 having the agreeing task ID and application ID is backed up in the main memory 32 at step S216. Then, at step S217, the execution priority 534 of the task setting 531 having the agreeing task ID and application ID is set to be the value indicated by the execution priority 577 of the process target policy setting.

Next, at step S218, it is determined whether or not the task setting 531, which becomes an application target of change as a result of the execution priority 534 being changed, satisfies the following conditions: (1) the number of uses 540 is 0; (2) the execution priority 534 after the change is "EXPEDIATE"; and (3) the value of the task revision 543 agrees with that of the policy revision 571 of the received policy data 570 obtained this time. When it is determined that all the three conditions are not satisfied (NO at step S218), one is added to the number of uses 540 of the task setting 531 at step S219. In other words, in order that a task whose number of uses becomes 0 so that the task is not executed and whose execution priority is changed to "EXPEDIATE" is executed most preferentially, the value of the number of uses 540 is changed. Then, at step S220, the value of the policy revision 571 of the received policy data 570 is recorded as the value of the task revision 543 of the applied task setting 531. Then, the processing returns to step S206.

On the other hand, as a result of the determination at step S218, when it is determined that all the three conditions are satisfied (YES at step S218), it is thought that the policy data of the same revision is previously received and the task is executed at that time. In this case, when the policy data of the same revision is received, addition to the number of uses 540 is not performed in order not to execute the task again, and the processing proceeds to step S220. This is the end of the description of the policy process.

[Process of Policy Server]

Figure 36:
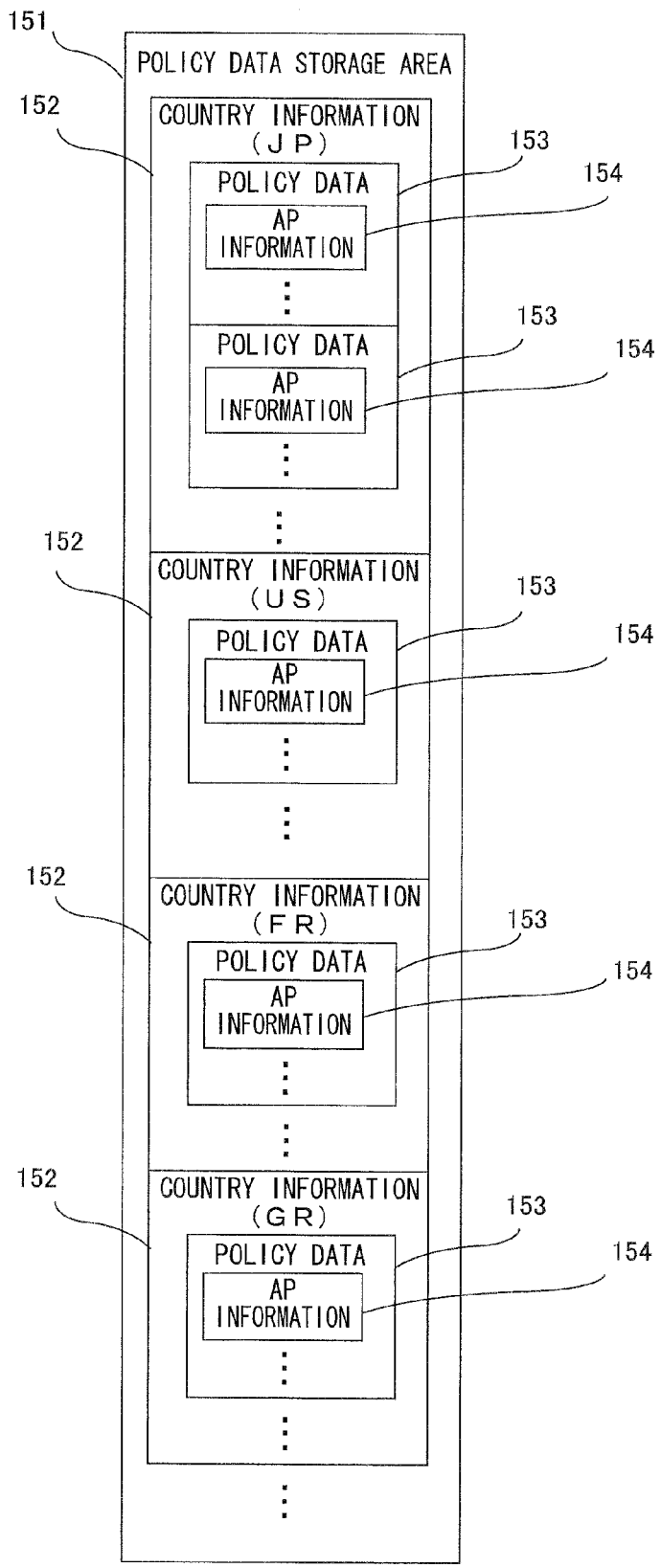
FIG. 36 is a diagram showing a memory map of a policy server 103.

Here, a process of the policy server 103, which is a communication partner in the policy process, will also be described. First, prior to a specific description of this process, a memory map of the policy server 103 in which policy data is stored will be briefly described. FIG. 36 is a diagram showing the memory map of the policy server 103. As shown in FIG. 36, a plurality of policy data 153 is stored for each country information 152 in the policy server 103. The structure of each policy data 153 is the same as that of the received policy data 570 shown in FIG. 18. In FIG. 36, for easy understanding of explanation, only AP information 154 is shown. The AP information 154 is information in which a value indicating a predetermined dedicated AP 101 is assigned, or information in which a NULL value is set. In the present embodiment, a plurality of policy data 153 in each of which a value indicating a dedicated AP 101 is assigned are present for each country information (note that the AP information 154 of the plurality of policy data 153 do not agree with each other). In addition, only one policy data 153 in which a NULL value is set in the AP information 154 is present. On the premise that such policy data 153 is stored in the policy server 103, the following process is performed.

Figure 37:
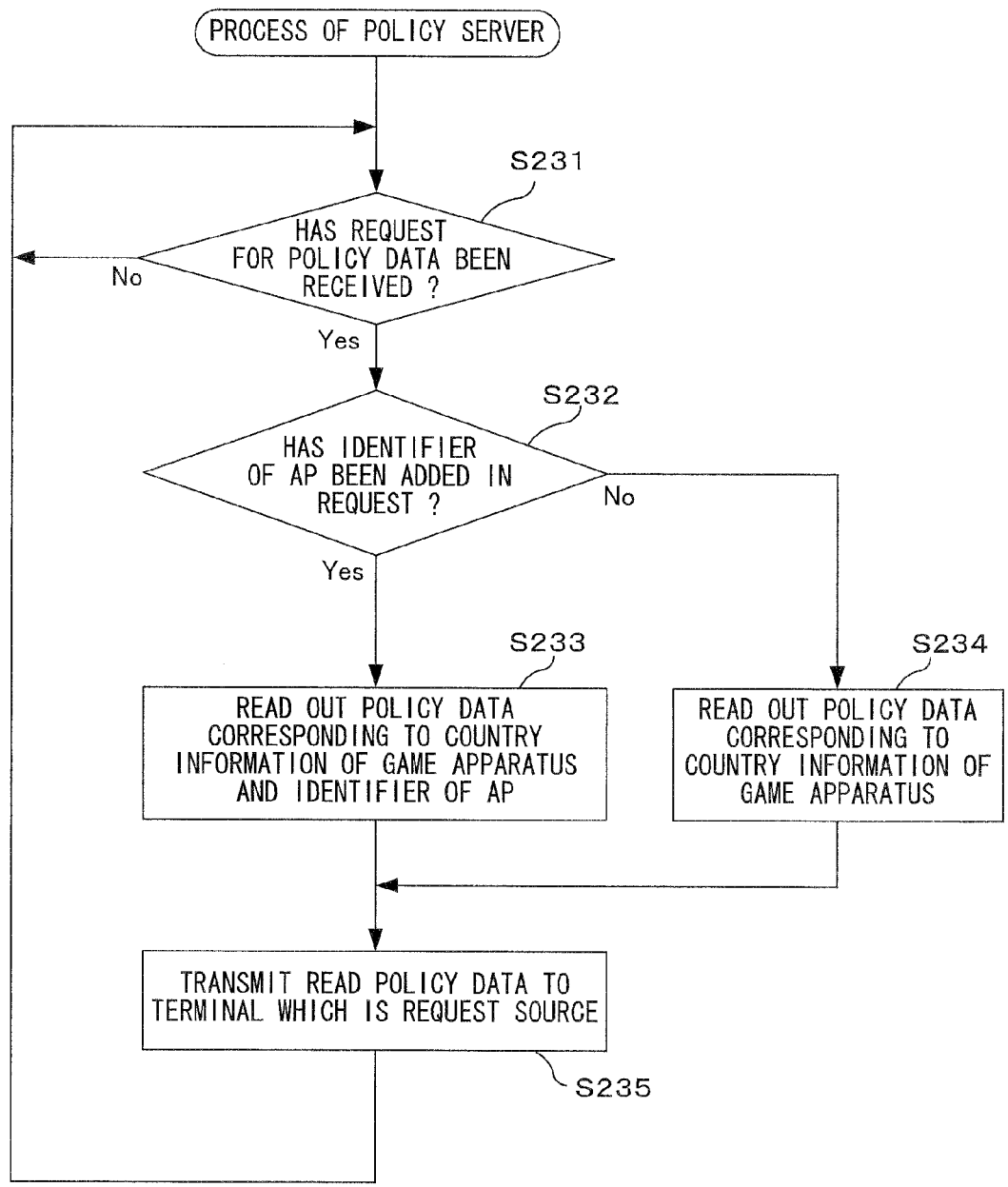
FIG. 37 is a flowchart showing a process performed by the policy server 103.

FIG. 37 is a flowchart showing the process performed by the policy server 103. In FIG. 37, first, at step S231, it is determined whether or not a request for the policy data 153 as described above has been received. As a result, when it is determined that the request has not been received (NO at step S231), the process at step S231 is repeated. In other words, the request is waited for. On the other hand, when it is determined that the request for the policy data 153 has been received (YES at step S231), it is determined at step S232 whether or not the identifier of an AP has been added in the received request. As a result, when the identifier has been added (YES at step S232), it is thought that the game apparatus 1 accesses the policy server 103 via the dedicated AP 101. In this case, at step S233, the country information of the game apparatus 1 which is included in the request, and the policy data 153 corresponding to the identifier of the AP, are read out. In other words, the country information included in the request is collated with the country information 152 stored in the policy server 103, and if there is agreeing country information, the AP identifier included in the request is collated with the AP information 154, and then, policy data 153 having the agreeing AP information 154 is searched for and read out. Then, at step S235, the read policy data 153 is transmitted to the game apparatus 1 which is the transmission source of the request.

On the other hand, as a result of the determination at step S232, when it is determined the identifier of the AP has not been added in the request (NO at step S232), it is thought that the game apparatus 1 accesses the policy server 103 not via the dedicated AP 101. Thus, in this case, at step S234, the country information included in the request is collated with the country information 152 of the policy server 103 to search for agreeing country information 152. Then, the policy data 153 in which the NULL value is set in the AP information 154 is read out. Then, at step S235, the policy data 153 is transmitted. This is the end of the description of the process of the policy server.

[Task Execution Process]

Figure 38:
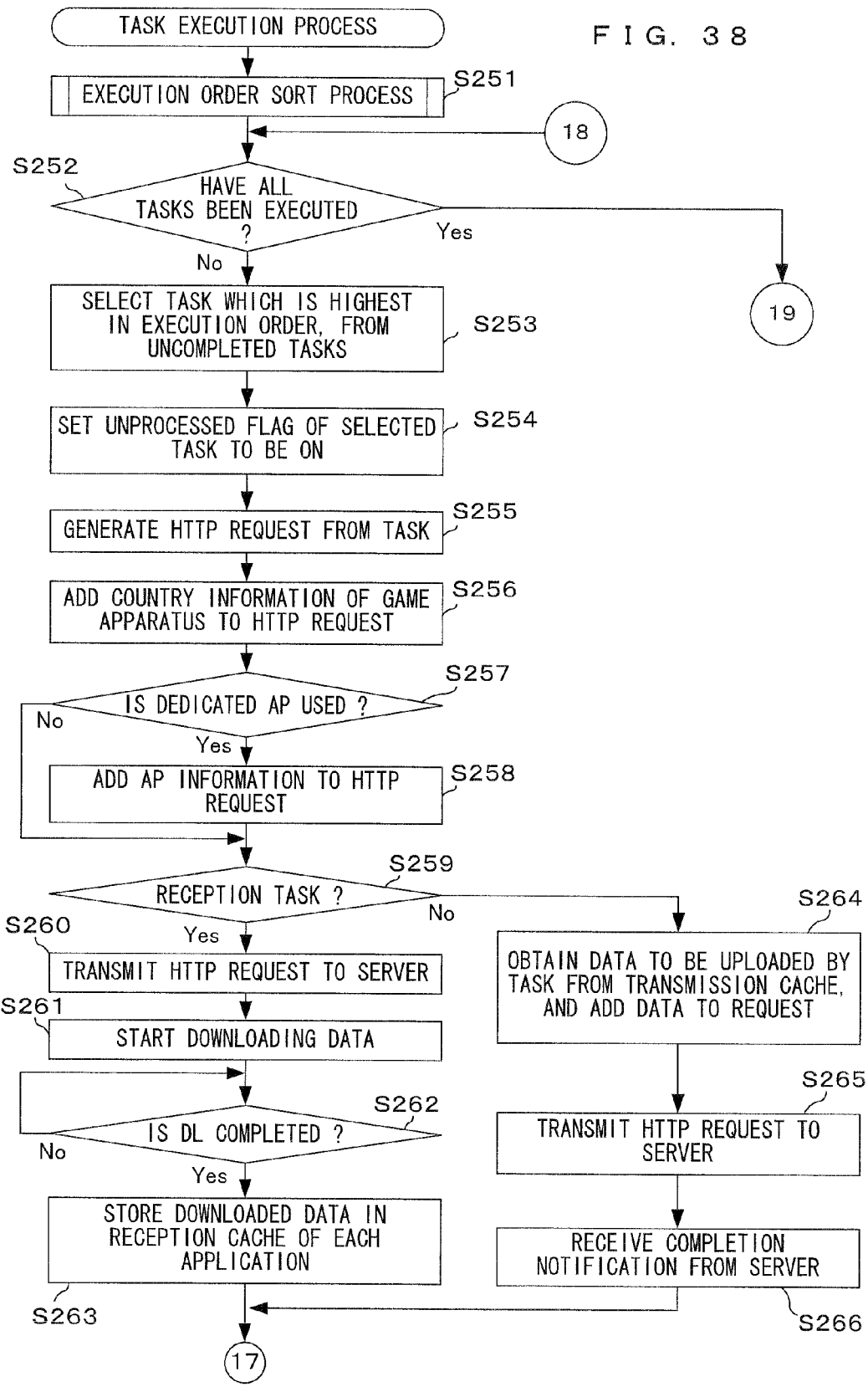
FIG. 38 is a flowchart showing in detail a task execution process shown at step S192 in FIG. 33.
Figure 39:
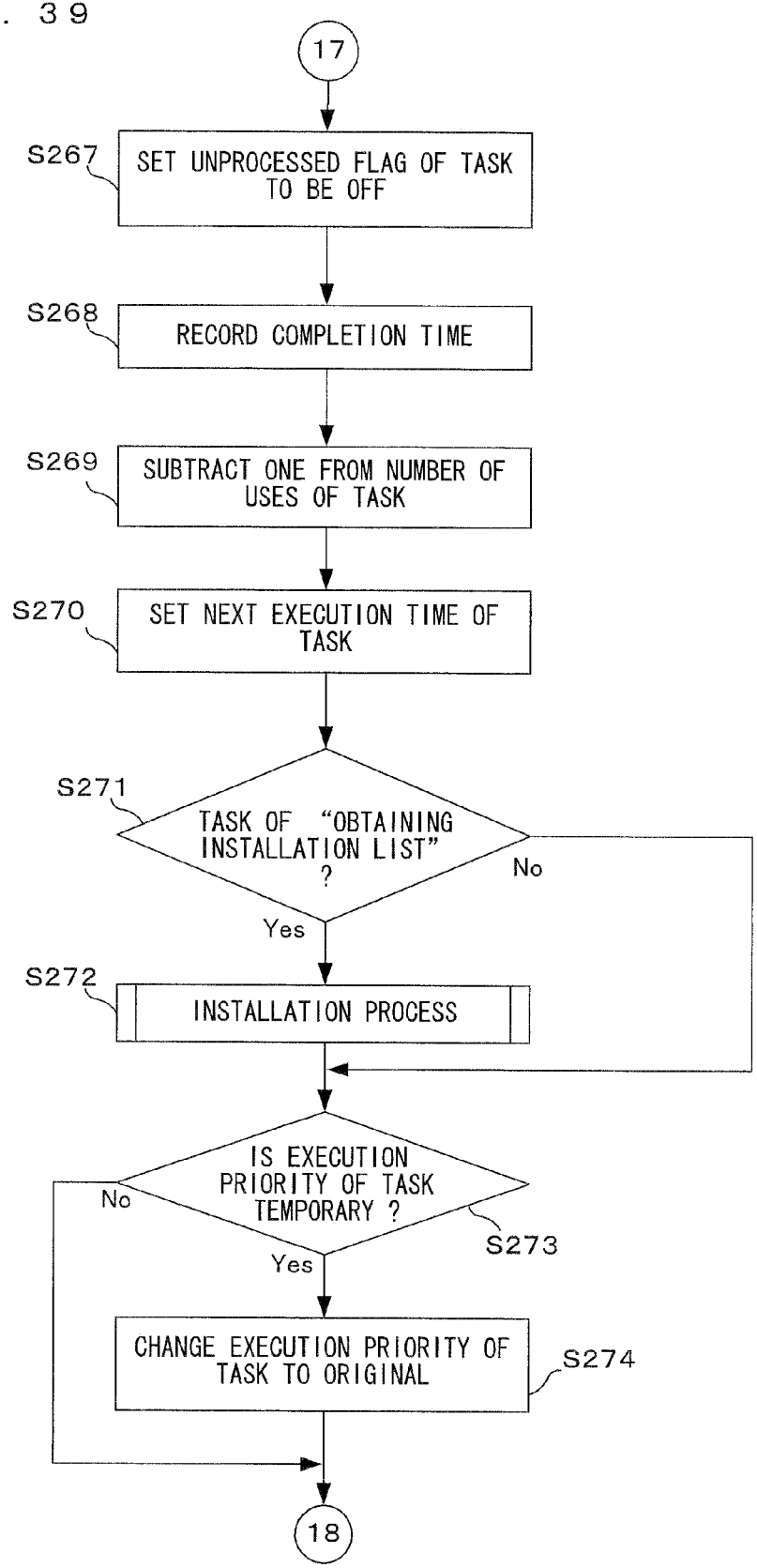
FIG. 39 is another flowchart showing in detail the task execution process shown at step S192 in FIG. 33.
Figure 40:
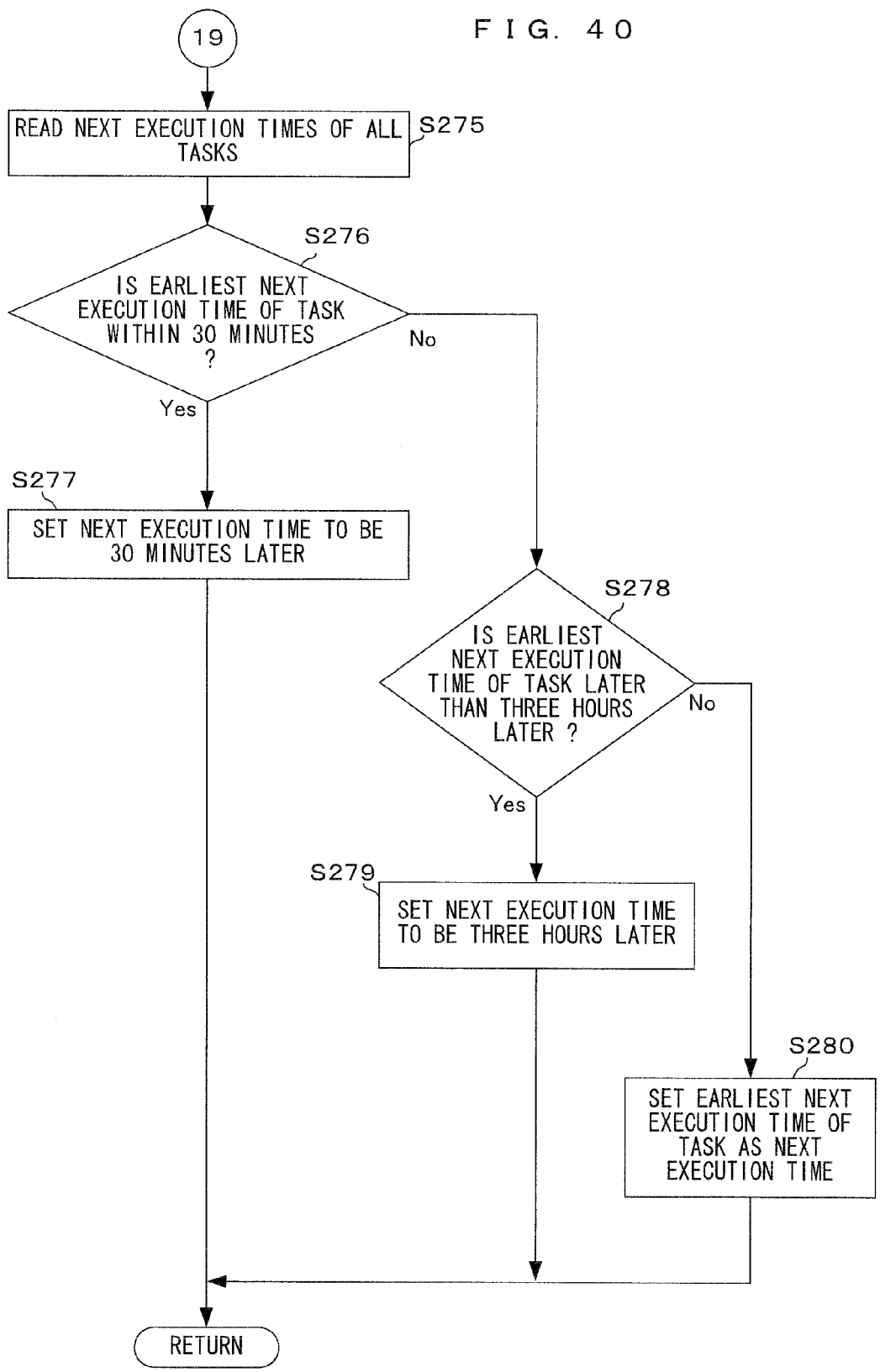
FIG. 40 is another flowchart showing in detail the task execution process shown at step S192 in FIG. 33.

The following will describe the task execution process shown at step S192 in FIG. 33. In this process, transmission and reception of predetermined data are performed on the basis of the setting contents of a task. In addition, an installation process is also performed. FIGS. 38 to 40 are flowcharts showing in detail the task execution process. First, at step S251, an execution order sort process is performed. In this process, a process of: extracting to-be-executed tasks while the execution priorities, the next execution times, the numbers of uses, and the like, of tasks are taken into consideration; and determining an execution order of the tasks, is performed. In addition, as a result of the following process being performed, temporary data which is an "execution order list" is generated in the main memory 32.

Figure 41:
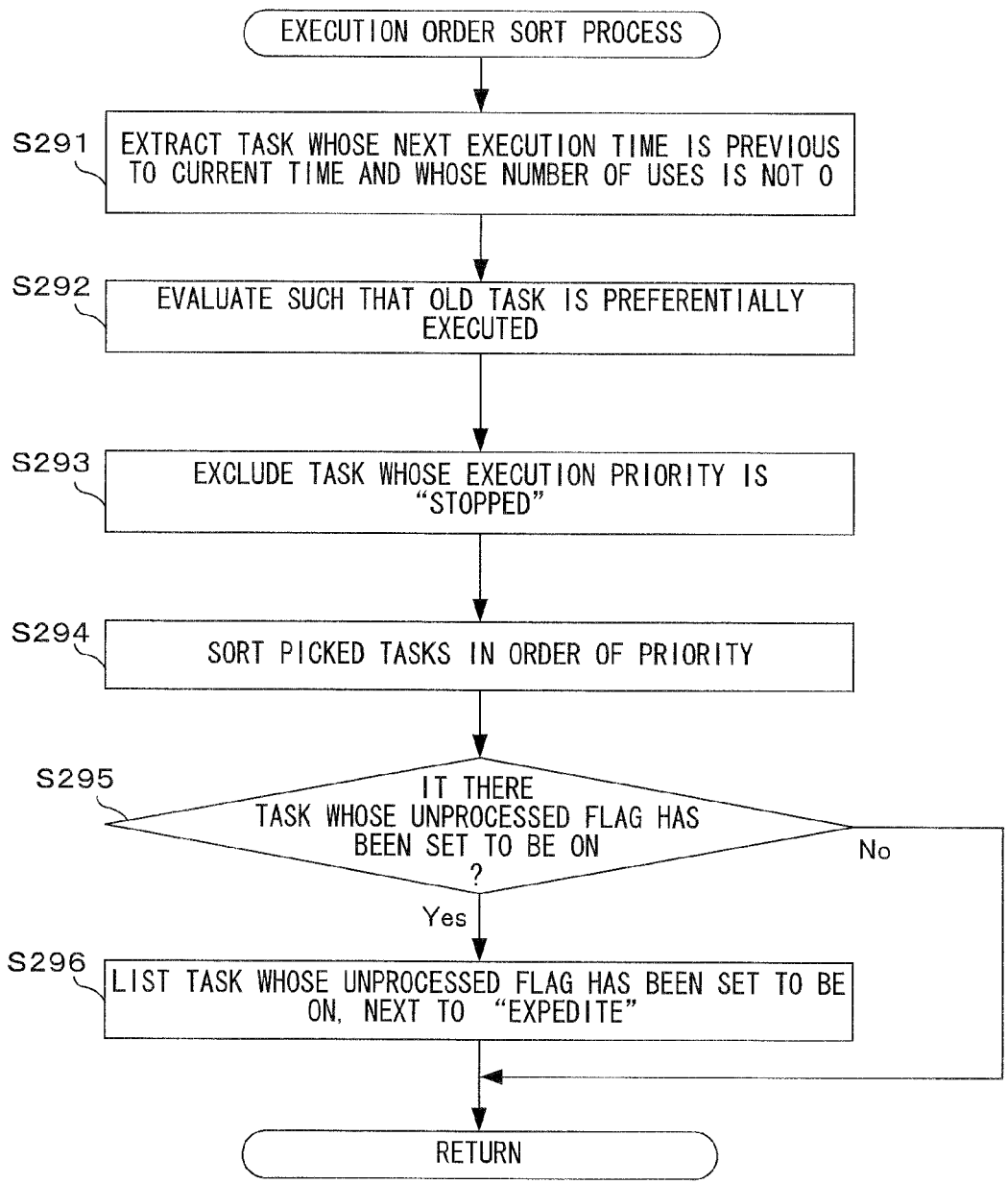
FIG. 41 is a flowchart showing in detail an execution order sort process shown at step S251 in FIG. 38.

FIG. 41 is a flowchart showing in detail the execution order sort process at step S251. In FIG. 41, first, at step S291, the task data 530 is referred to, and a task setting 531 whose next execution time 537 is previous to the current time and whose number of uses 540 is not 0 is extracted. The reason why the task setting 531 whose next execution time 537 is "previous" to the current time is extracted is that a timing of connecting to the dedicated AP 101 is a time when a beacon is received by chance, and thus the process of a task is hardly performed at the same time as a scheduled execution time of the task. Thus, even when the execution time of the task has already been passed, the task is extracted at this time.

Next, at step S292, each of the extracted task settings 531 is evaluated. This is intended to make adjustment such that a task which has not been executed for a long time period is more preferentially executed. Thus, in the present embodiment, "evaluation point" is used. A high value of the "evaluation point" indicates that the task is to be preferentially executed. In this process, the last completion time 544 of each extracted task setting 531 is compared to the current time, and a higher point is given as an "evaluation point" to an extracted task setting 531 having a longer time period from its last completion time 544 to the current time. In other words, a high "evaluation point" is set for the task setting 531 of a task which has not been executed for a long time period.

Next, at step S293, any task whose execution priority 534 is "STOPPED" is excluded from the extracted tasks. This is because "STOPPED" means to stop execution.

Next, at step S294, on the basis of the execution priority 534 and the "evaluation point", each task setting 531 which is picked up in the previous process is sorted. Specifically, each task setting 531 is sorted on the basis of the execution priority 534. Next, sorting based on the "evaluation point" is performed between task settings 531 having the same execution priority. As a result, ordering is performed such that, of task settings 531 having the same execution priority, a task which has not been executed for a longer time period is more preferentially executed. Note that, for the task setting 531 of an unexecuted task, namely, for a task setting 531 in which no value is set in the last completion time 544, sorting is performed on the basis of the task registration time 545 which is the time when the task setting 531 is registered. In other words, sorting is performed such that a task whose registered time is early is preferentially executed.

Next, at step S295, it is determined whether or not a task setting 531 in which the unprocessed flag 541 has been set to be ON is present. As a result, when it is determined that the task setting 531 in which the unprocessed flag 541 has been set to be ON is present (YES at step S295), at step S296, adjustment is performed such that the execution priority of the unprocessed task setting 531 becomes "HIGH" and the unprocessed task setting 531 comes to a higher rank in the execution order than any other task settings 531 having an execution priority of "HIGH". In other words, it is thought that a task which is unprocessed at this time is not executed due to a certain reason when the task is previously executable. Thus, adjustment is performed on such a task such that the task is executed with a priority next to "EXPEDITE", thereby achieving a "resume"-like operation. On the other hand, as a result of the determination at step S295, when no task setting 531 in which the unprocessed flag 541 has been set to be ON is present (NO at step S295), the process at step S296 is skipped, and the execution order sort process ends. As a result, the "execution order list" is generated in the main memory 32. In the "execution order list", as a result of the process as described above, the tasks picked up in the above process are sorted and shown in the order of execution from highest.

Referring back to FIG. 38, after the execution order sort process ends, at step S252, it is determined whether or not all the tasks listed in the "execution order list" have been executed. As a result of the determination, when it is determined that all the tasks have been executed (YES at step S252), the processing proceeds to later-described step S275. On the other hand, when it is determined that any unexecuted tasks remain (NO at step S252), a task which is highest in execution order is selected from the unexecuted tasks at step S253. Hereinafter, the selected task is referred to as process target task.

Next, at step S254, the unprocessed flag 541 of the task setting 531 corresponding to the selected process target task is set to be ON.

Next, at step S255, the communication destination URL 535 of the task setting 531 corresponding to the process target task is referred to, and an HTTP request is generated. At the subsequent step S256, the game apparatus setting data 560 is referred to, and the country information which is set in the game apparatus 1 is added to a character string of the generated HTTP request.

Next, at step S257, it is determined whether or not the currently performed "Internet communication" is communication using the dedicated AP 101, namely, the game apparatus 1 connects to the Internet via the dedicated AP 101. As a result, when it is determined that the currently performed "Internet communication" is the communication using the dedicated AP 101 (YES at step S257), the AP identifier of the currently used AP is further added to the character string of the HTTP request at step S258. On the other hand, when it is determined that the dedicated AP is not used (NO at step S257), the process at step S258 is skipped.

Next, at step S259, by referring to the transmission/reception identification flag 539 of the task setting 531 corresponding to the process target task, it is determined whether or not the process target task is a "reception task". In other words, it is determined whether the process target task is a task for receiving data or a task for transmitting data. As a result, when it is determined that the process target task is the "reception task" (YES at step S259), at step S260, the HTTP request generated in the above process is transmitted to a server which is indicated by the communication destination URL 535 of the task setting 531 corresponding to the process target task. Accordingly, the server starts transmission of predetermined data. Thus, at step S261, downloading (hereinafter, may be referred to DL) of the data transmitted from the server is started. At step S262, it is determined whether or not the downloading has been completed, and when the downloading has not been completed (NO at step S262), the downloading is continued until completion. When the downloading is completed (YES at step S262), at the subsequent step S263, the downloaded data is stored in the storage location indicated by the file path 536 of the task setting 531 corresponding to the process target task, namely, in the task reception cache 553 of the application area 551 of the application corresponding to the application ID 532 of the task setting 531. Then, the processing proceeds to later-described step S267.

On the other hand, as a result of the determination at step S259, when it is determined that the process target task is not the "reception task", namely, is the "transmission task" (NO at step S259), at step S264, data to be transmitted (uploaded) is obtained from the storage location indicated by the file path 536 of the process target task, namely, in the present embodiment, from the task transmission data 556 of the application area 551 corresponding to the process target task. Then, the data is added to the HTTP request.

Next, at step S265, the HTTP request to which the transmission data is added is transmitted to the server. In other words, an upload process of the data to the URL indicated by the communication destination URL 535 is started. Then, when the uploading is completed, a completion notification (a notification indicating that the uploading of the data is successfully completed) transmitted from the server is received at step S266. Then, the processing proceeds to step S267.

Next, a step S267 in FIG. 39, the unprocessed flag 541 of the task setting 531 corresponding to the process target task is set to be OFF. At the subsequent step S268, the current time is stored as a completion time in the last completion time 544. Further, at step S269, one is subtracted from the value of the number of uses 540.

Next, at step S270, the execution interval 538 of the task setting 531 is referred to, and a next execution time is calculated and stored as the next execution time 537.

Next, at step S271, it is determined whether or not the process target task is a task of "obtaining an installation list". As described above, the task of "obtaining an installation list" is a task which is previously set as a setting before shipment of the game apparatus 1. In the task setting 531, the fixed task ID 533 which is previously determined is assigned, and settings are made such that the task is periodically executed. Thus, by referring to the task ID 533, it is determined whether or not the process target task is the task of "obtaining an installation list". As a result of the determination, when it is determined that the process target task is the task of "obtaining an installation list" (YES at step S271), the installation process is performed at step S272. This process will be described in detail later. On the other hand, when it is determined that the process target task is not the task of "obtaining an installation list" (NO at step S271), the process at step S272 is skipped.

Next, at step S273, by referring to the temporary change flag 542 of the task setting 531 corresponding to the process target task, it is determined whether or not the execution priority 534 of the process target task has been temporarily changed. As a result, when it is determined that the execution priority 534 of the process target task has been temporarily changed (YES at step S273), at step S274, the execution priority 534 of the process target task is changed to the original value by using backup execution priority data. On the other hand, when it is determined that the execution priority 534 of the process target task has not been temporarily changed (NO at step S273), the process at step S274 is skipped. Then, the processing returns to step S252 in FIG. 38, and an unexecuted task is selected as appropriate and the same process is repeated.

The following will describe a process performed when it is determined at step S252 in FIG. 38 that all the tasks have been executed (YES at step S252). In this case, a process for setting the next wake-up time 305 is performed. Specifically, first, at step S275 in FIG. 40, the next execution times 537 of all the task settings 531 in the task data 530 are read in. At the subsequent step S276, of all the tasks, a task having the earliest next execution time 537 is detected. Then, it is determined whether or not the earliest next execution time 537 is within 30 minutes from the current time. As a result of the determination, when it is determined that the earliest next execution time 537 is within 30 minutes (YES at step S276), the time 30 minutes after the current time is set as the next wake-up time 305 at step S277. In other words, a setting is performed such that, when a task is executed, no task is executed at least in 30 minutes thereafter. Thus, connection is prevented from being too frequently performed, resulting in further power saving of the game apparatus 1 and reduction in load of network traffic. Then, the task execution process ends.

On the other hand, as a result of the determination at step S276, it is determined that the earliest next execution time 537 is not within 30 minutes from the current time (NO at step S276), it is determined at step S278 whether or not the earliest next execution time 537 is later than the time three hours after the current time. As a result, when it is determined that the earliest next execution time 537 is later than the time three hours after the current time (YES at step S278), the time three hours after the current time is set as the next wake-up time 305 at step S279. Thus, it means that the game apparatus 1 attempts a connection at least three hours later, and the game apparatus 1 can be caused to periodically attempt a connection. Note that 30 minutes and three hours as described above are merely one example, and setting times are not limited thereto.

On the other hand, when it is determined that the earliest next execution time 537 is not later than the time three hours after the current time (NO at step S278), it indicates that the earliest next execution time 537 is between 30 minutes and three hours from the current time, and the earliest next execution time 537 is set as the next wake-up time 305. Then, the task execution process ends. This is the end of the description of the task execution process.

[Installation Process]

Figure 42:
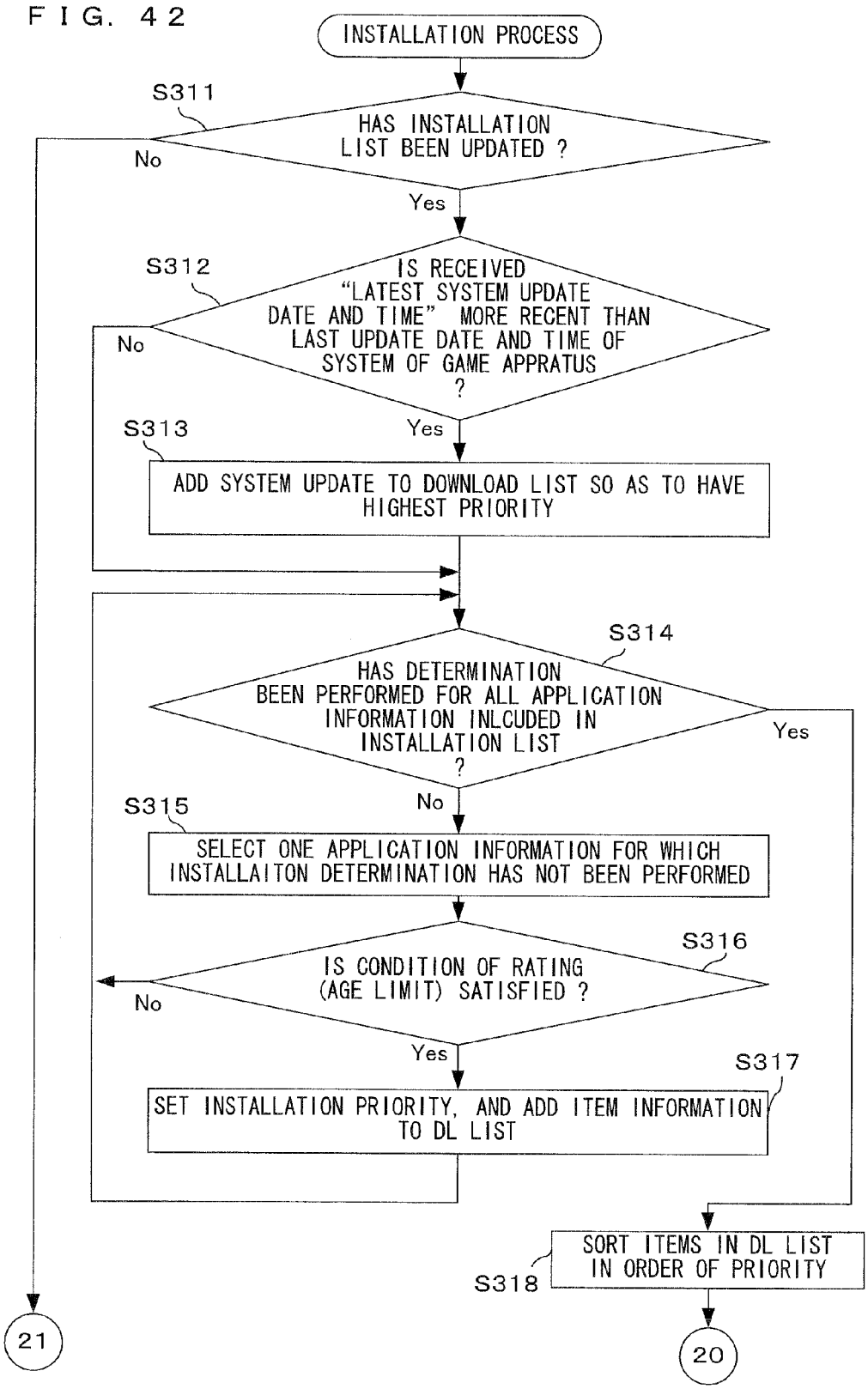
FIG. 42 is a flowchart showing in detail an installation process shown at step S272 in FIG. 39.
Figure 43:
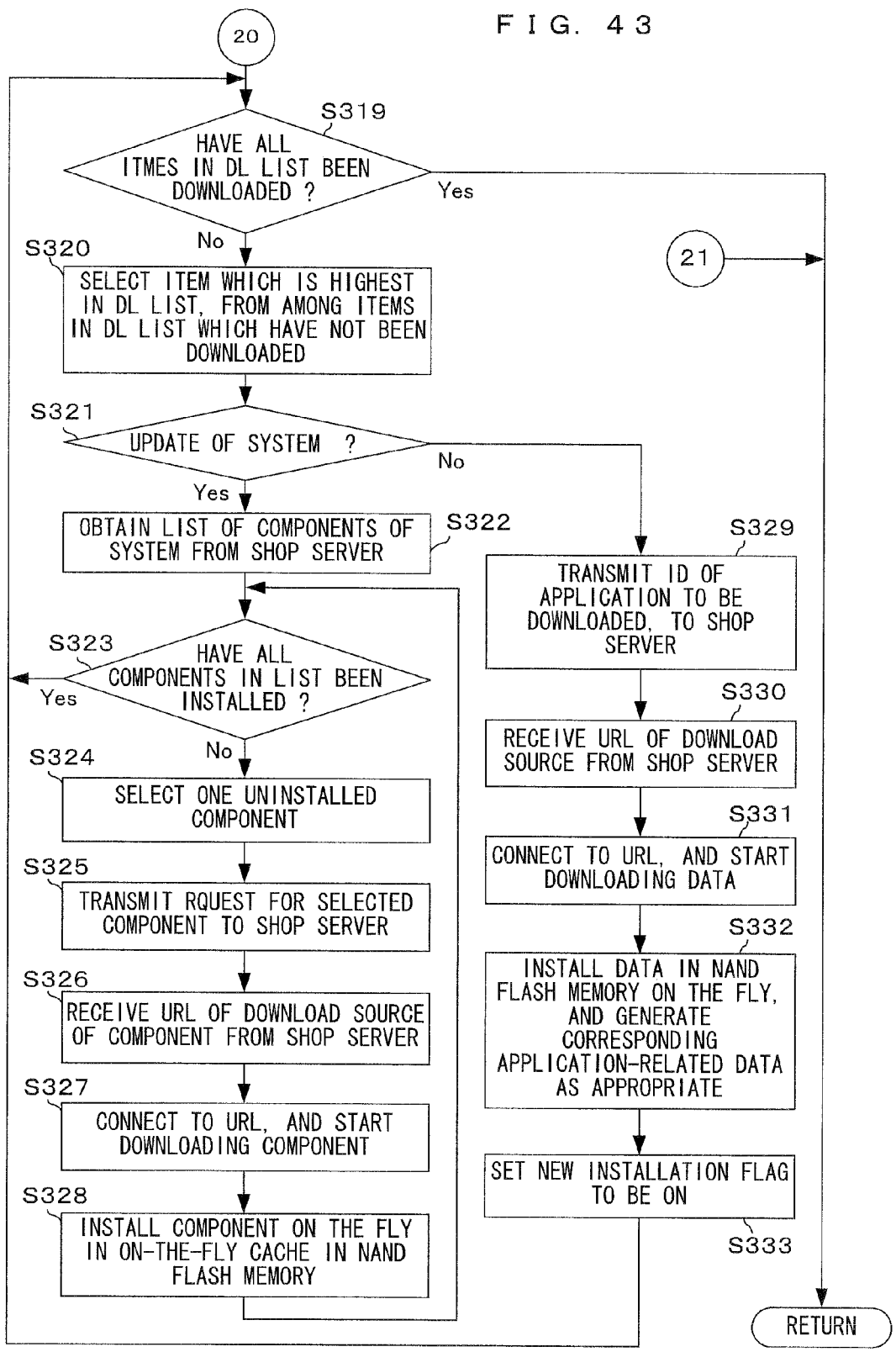
FIG. 43 is another flowchart showing in detail the installation process shown at step S272 in FIG. 39.

The following will describe in detail the installation process shown at step S272. In this process, a process concerning update of the system, a new installation process of a free application, a trial version game, and the like, an update process of an existing application, and the like are mainly performed. FIGS. 42 and 43 are flowcharts showing in detail the installation process. First, at step S311, it is determined whether or not the installation list 580 has been updated. The determination is performed by comparing the list revision 582 of the installation list 580 before obtained in the task execution process, to the list revision 582 of the installation list 580 after obtained in the task execution process.

As a result of the determination, it is determined whether or not the installation list 580 has not been updated (the list revision 582 has the same value) (NO at step S311), the installation process ends. On the other hand, when it is determined that the installation list 580 has been updated (YES at step S311), it is determined at step S312 whether or not the latest system update date and time 581 of the latest installation list 580 obtained in the task execution process is more recent than the latest update date and time of the game apparatus 1 which is stored in the game apparatus setting data 560. As a result, when it is determined that the latest system update date and time 581 is more recent than the latest update date and time of the game apparatus 1 (YES at step S312), item information 591 indicating "system update" is added to the download list 590 at step S313. In this case, the installation priority 594 is set to a value indicating a highest priority. On the other hand, as a result of the determination at step S312, when it is determined that the latest system update date and time 581 is not more recent than the latest update date and time of the game apparatus 1 (NO at step S312), the process at step S313 is skipped.

Next, at step S314, it is determined whether or not it has been determined whether or not to perform installation for all the application information 584 included in the installation list 580. As a result, when it is determined that it is determined for all the application information 584 (YES at step S314), the processing proceeds to later-described step S318. On the other hand, when undetermined application information 584 remains (NO at step S314), at step S315, one application information 584 is selected from the application information 584 for which the determination concerning installation has not been performed.

Next, at step S316, on the basis of the rating information 588 of the selected application information 584 and age information of the user which is stored in the game apparatus setting data 560, it is determined whether or not a condition of rating is satisfied. As a result, when it is determined that the condition of rating is satisfied (YES at step S316), the item information 591 in which the installation priority 594 is set as appropriate is added to the download list 590 at step S317. Note that, for the installation priority 594 which is set here, a value lower than a priority concerning the system update is set. Then, the processing returns to step S314, and the same process is repeated until the determination is performed for all the application information 584. On the other hand, when it is determined at step S316 that the condition of rating is not satisfied (NO at step S316), the process at step S317 is skipped, and the processing returns to step S314. In other words, an application which does not satisfy the condition of rating is not added to the download list 590, and thus is not installed.

The following will describe a process performed when, as a result of the determination at step S314, it is determined that the determination has been performed for all the application information 584 in the installation list 580 (in other words, the download list 590 is completed). In this case, data of each application indicated in the download list 590, or the like, is downloaded and installed as appropriate. Now, a download source of the data will be described. In the present embodiment, an access to a dedicated server called a shop server is performed. Then, after an application ID is notified to the shop server, a URL indicating a download source of the application is sent from the shop server. Then, data (a program file or the like) of a free application or the like is downloaded from the predetermined server on the basis of the URL.

Next, at step S318, the item information 591 listed in the download list 590 is sorted in the order of the installation priority 594.

Next, at step S319 in FIG. 43, it is determined whether or not all the item information 591 listed in the download list 590 has been downloaded. As a result, when it is determined that all the item information 591 has been downloaded (YES at step S319), the installation process ends.

On the other hand, as a result of the determination at step S319, when it is determined that not all the item information 591 has been downloaded (NO step S319), at step S320, the item information 591 having the highest installation priority 594 is selected from the item information 591 which has not been downloaded. Hereinafter, the selected item information 591 is referred to as process target item information.

Next, at step S321, it is determined whether or not the process target item information is related to update of the system. As a result, when it is determined that the process target item information is related to the update of the system (YES at step S321), at step S322, an access to the shop server is performed, and data indicating a list of components of the system is obtained. The system of the game apparatus 1 according to the present embodiment is constituted of a plurality of programs. Thus, each of the programs constituting the system is referred to as a component. For example, the above menu process, the above local communication BG process, and the like also correspond to components. In other words, the list of components of the system is a list of files which need to be updated, out of file (program, data) groups constituting the system of the game apparatus 1.

Next, at step S323, it is determined whether or not installation of all the components indicated in the list of components has been finished. When it is determined that the installation of all the components has been finished (YES at step S323), the processing returns to step S319 and the same process is repeated, thereby shifting to a process for other item information other than the system update. On the other hand, when it is determined that not all the components has been installed (NO at step S323), one component is selected from the uninstalled components at step S324. Next, at step S325, a request for obtaining data of the selected component is transmitted to the shop server. At the subsequent step S326, URL information which is transmitted from the shop server and indicates a download source of the selected component is received.

Next, at step S327, a connection to the server indicated by the URL is performed, and downloading of the component is started. After the downloading is started, at step S328, data of the component being downloaded is expanded onto the on-the-fly cache 600 in parallel with the downloading. In other words, the data is installed on the fly. Then, when the downloading and the installation on the fly are finished (due to on-the-fly, they are finished at substantially the same time), the processing returns to step S323 and the same process is repeated.

The following will describe a process performed when, as a result of the determination at step S321, it is determined that the process target item information is not related to the update of the system (NO at step S321). In such a case, it is thought that the contents indicated by the process target item information are a free application, a trial version of an application, or the like. In this case, first, at step S329, the application ID 592 indicated by the process target item information is transmitted to the shop server. Unique information (serial number and the like) of the game apparatus 1 is transmitted together. Next, at step S330, URL information which is transmitted from the shop server and indicates URL of a download source is received. Note that the shop server analyzes the unique information of the game apparatus 1 which is transmitted together with the application ID, and determines whether or not the request is from the game apparatus 1, not from another apparatus such as PC. When the request is from the game apparatus 1, the shop server transmits the information indicating the URL of the download source, to the game apparatus 1.

At the subsequent step S331, a connection to the server indicated by the URL is performed, and downloading of data of the free application or the like is started. In this case, a key for authenticating the application is also downloaded prior to activation of the application. After the downloading is started, at step S332, the data is installed on the fly as the application program 509 in the program area 500 of the NAND flash memory 33 (in the case of an existing application, the application program 509 is overwritten with the data, and in the case of a new application, the data is expanded as a new application program 509). In addition, at that time, if the installed application is a new application, application-related data 550 corresponding to the newly installed application is also generated. As a result, the new application becomes a scan target at step S97, and is displayed in the menu.

Next, at step S333, when the installation on the fly is finished, the new installation flag 554 of the application area 551 corresponding to the installed application is set to be ON. Then, the processing returns to step S319, and the same process is repeated. This is the end of the description of the installation process.

This is the end of the description of various processes according to the first embodiment.

As described above, in the above embodiment, even when power is not supplied to the CPU 31, if the task execution condition is satisfied, power is automatically supplied to the CPU 31 and a connection to an AP is attempted. As a result, it is possible to connect to a network without the user realizing it. In addition, unless the task execution condition is satisfied, power is not supplied to the CPU 31, and hence power consumption can be saved. Therefore, even an information terminal, such as a hand-held game apparatus, which does not assume constant connection, can behave as if being constantly in connection, and can also save power consumption.

Further, a network connection is performed without the user realizing it, and downloading and installation of a free application or the like are also performed as described above. Thus, when the user operates the game apparatus 1 next time, it is possible to provide a surprise to the user, by a new application having been added. In addition, since such an application has already been installed or updated, a waiting time can be prevented for being given to the user.

Further, as a result of the "reception task" being executed, a notification announcing an end of a network service concerning a predetermined application can be received, and the end of the network service is notified to the user. In addition, in this case, a task concerning the network service is deleted. Thus, the user can know the end of the predetermined network service without independently collecting information. In addition, since the unnecessary task is deleted, the memory capacity can be saved.

Further, in the above embodiment, it is possible to distribute policy data different for each dedicated AP 101. Thus, the execution priorities of tasks can be changed for each AP used for a connection to the policy server. Therefore, tasks to be executed and the execution order thereof can be changed to some extent in accordance with various locations, and enjoyment of carrying the game apparatus 1 can be provided to the user. In other words, enjoyment of going out to various places with the game apparatus 1 can be provided to the user.

Further, in the above embodiment, when the game apparatus 1 connects to the policy server, an identifier different for each dedicated AP 101 as well as country information which is set in the game apparatus 1 are used for determining policy data to be distributed. Thus, for example, even when a plurality of game apparatuses 1 connect to the same dedicated AP 101, policy data which is different depending on the country information which is set in each game apparatus 1 can be distributed.

Further, even when the game apparatus 1 accesses the policy server, for example, via the AP 102 at user's home, which is not the dedicated AP 101, it is possible to distribute policy data which is different depending on the country information.

Further, in the above embodiment, since the application ID and the task ID are used when the policy data is applied, the execution priorities of tasks can be changed for each application. Thus, with the combination of the country information and the application, it is possible to more flexibly change the execution priorities.

Further, concerning the installation process, in the case of system update, installation is performed on the fly, but it is confirmed with the user whether to reflect the installation. When confirmation is obtained, the update of the system is reflected by renaming the file name and restart. Thus, a waiting time given to the user at the update of the system can be shortened. In addition, installation of an application having a small effect, such as a free application, other than the update of the system, is performed without user's confirmation. Thus, convenience to the user can be enhanced further. Since installation is performed without the user realizing it and the software configuration of the game apparatus 1 is changed, a new surprise can be provided to the user, and a motivation to play a newly installed application can be provided to the user.

Further, when the next execution time of a task (the next wake-up time) is too close to the current time, adjustment is performed such that the task is not executed in a predetermined time period. Thus, tasks are prevented from being frequently executed at time intervals which are too short, and a wasteful process and wasteful network traffic can be omitted. In addition, when the next execution time is too far from the current time, time adjustment is performed, and thus it is possible to cause a connection to be attempted periodically to some extent.

Further, as the execution priority, "HIGH", "MEDIUM", and "LOW", which simply indicate a priority, as well as "STOPPED" indicating that the task is not executed and "EXPEDITE" indicating a highest priority are used. Then, the policy data is caused to be received, and it is possible to change these execution priorities. Thus, since "STOPPED" and "EXPEDITE" are used, tasks executed by the game apparatus 1 can also be controlled to some extent by the server (the provider of the network service).

Note that, in the above embodiment, as an operation for shifting to the "sleep mode" or an operation for cancelling the "sleep mode", an operation of closing or opening the game apparatus 1 having the foldable housing is exemplified. However, such operations are not limited thereto, and shift or cancellation may be performed with an operation of a button.

Further, in the above embodiment, concerning the determination as to whether or not it is in the "sleep mode" in the wireless module process, when it is impossible to access the power supply state flag 304, it is determined that it is in the "sleep mode", and an instruction to cancel the "sleep mode" is issued to the CPU 31. Concerning cancellation of the "sleep mode", in addition to this example, the following process may be performed without directly determining whether or not it is in the "sleep mode". For example, regardless of whether or not the game apparatus 1 is currently in the "sleep mode", the wireless communication module 34 issues an instruction to cancel the "sleep mode", to the CPU 31. Then, if it is in the "sleep mode" when the CPU 31 receives the instruction, the CPU 31 cancels the "sleep mode", and if it is not in the "sleep mode" when the CPU 31 receives the instruction, the CPU 31 neglects the instruction. In addition, such a process can be performed not only between the wireless communication module 34 and the CPU 31 but also between the microcomputer 37 and the CPU 31. In other words, a process method as described above can be used for a general process for determining whether or not it is in the "sleep mode" and cancelling the "sleep mode" when it is in the "sleep mode".

Further, in the above embodiment, as one "task", a task of only "transmitting" or "receiving" predetermined data is exemplified. However, the present invention is applicable to even the case where a process of performing both "transmission and reception" is one task.

Further, in the above embodiment, the next wake-up time 305 is set on the basis of the next execution time 537 of the task. Alternatively, regardless of the next execution time of the task, scan of an AP may be performed periodically at predetermined time intervals.

Further, in the above embodiment, the dedicated AP 101 is identified on the basis of whether or not vendor specific information is included in a beacon as described above. Alternatively, a general AP 102 (e.g., an AP at user's home) which does not have such vendor specific information may be caused to operate similarly to the dedicated AP. In this case, an ESSID of such a general AP 102 is stored as the dedicated AP identification information 404. Then, the same process as in the case of the dedicated AP 101 may be performed by determining whether or not an ESSID included in a received beacon agrees with the stored ESSID.

Further, concerning identification of the dedicated AP 101, the MAC address or an IP address of the dedicated AP 101 may be used instead of the vendor specific information.

Further, in the above embodiment, when the policy data is obtained, the country information in the game apparatus setting data 56 is used. Alternatively, information, such as a manufacturing number and a serial number of the game apparatus 1, an IP address, a resident area of the user, a user name, the gender and the birthday of the user, and user' favorite color, may be used. These information may be stored in the game apparatus setting data 560, and their contents may be changeable as appropriate by the user.

Further, in the above embodiment, concerning reception of the policy data, in the case where the policy data is received via the dedicated AP 101, the policy data is selected on the basis of the country information and the AP identifier indicating the dedicated AP 101, and in the case where the policy data is received not via the dedicated AP 101, the policy data is selected on the basis of only the country information. Alternatively, the information of the game apparatus setting data 560 may not be referred to, for example, in the case of via the dedicated AP 101, the policy data may be selected on the basis of only the AP identifier, and in the case of not via the dedicated AP 101, common policy data which is previously prepared may be selected, or reception of policy data may not be performed.

Further, in the above embodiment, the policy data is stored in the policy server. Alternatively, the policy data may be stored in the dedicated AP, and after a connection to the dedicated AP 101 is established, the policy data may be downloaded to the game apparatus 1. Still alternatively, the policy data may be included in a beacon transmitted from an AP. In this case, without establishing a connection to the AP, the policy data can be received and used while the AP is searched for. In addition, in such a case as well, policy data which is different for each dedicated AP 101 may be stored. Note that, in view of management of policy data, policy data is preferably stored in one policy server 103 such that integrated management is possible.

Concerning generation of a task, data for generating the task may be included in the policy data. In this case, after the policy data is received, in the game apparatus 1, a new task is generated on the basis of data (a parameter) for task generation, which is included in the policy data, and the new task is executed.

Further, concerning the update process of the system, in the above embodiment, the latest update date and time of the system are used for determining whether or not to perform system update. However, the present invention is not limited thereto, and version information may be used. In this case, the version information may be included in data for update of the system.

Further, in the above embodiment, when it is confirmed whether or not to reflect system update, if it is selected that the system update is not to be reflected, data for update is discarded immediately. However, the present invention is not limited thereto. For example, confirmation is performed a plurality of times, and when an instruction not to reflect the system update is made consecutively predetermined times, the data for update may be discarded. Thus, it is possible to prevent the data for update from being discarded by an erroneous operation of the user.

Further, in the above embodiment, the "number of uses" is set for a task. Even for a task whose number of uses is 0, the number of uses may be increased as a result of policy data being applied (i.e., the task becomes executable again). In addition, the system of the game apparatus 1 may perform a process of: randomly selecting a task from tasks whose number of uses is 0; and increasing its number of uses.

Alternatively, control may be performed such that execution frequency of a task is gradually decreased by using the number of uses. For example, the following control is considered.

(1) First, it is assumed that there is a task whose number of uses is set to be 30 as an initial value and is executed daily. In this case, as a method of determining whether or not the task is executed daily, it may be confirmed daily whether or not the number of uses is decreased, or it may be confirmed at an elapse of 30 days whether or not the number of uses is 0. Alternatively, it may be allowed that there are some days when the task is not executed.

(2) After the task is executed daily and the number of uses becomes 0, the task is caused to be executed once in 10 days in 30 days. For example, the task may be executed with a one-in-ten probability each time, or execution dates may be determined as appropriate, for example, the task is executed at 10th day, 20th day, and 30th day.

(3) Further, in 90 days thereafter, the task is caused to be executed once in 30 days. For example, the task may be executed with a one-in-thirty probability, or execution dates may be previously determined.

(4) Further, in 120 days thereafter, the task is caused to be executed once in 60 days. For example, the task may be executed with a one-in-sixty probability, or execution dates may be previously determined.

(5) Then, after an elapse of 120 days, the task is caused not to be executed. For example, the task may be deleted, or the task may not be deleted and a possibility may be left that the task will be executed through another trigger such as control by policy data. As described above, through a certain trigger, the number of uses of a task concerning an application which has not been used for a while is increased, and the task is executed, thereby providing a surprise to the user.

Further, in the above embodiment, as a result of the menu process being performed in the start-up process which is performed when the game apparatus 1 is started, the applications installed in the game apparatus 1 are scanned, and their list is displayed as menu. Thus, for example, when the user presses the power button 14F (i.e., starts the game apparatus 1) in the state where the game apparatus 1 is in the "sleep mode", the "sleep mode" is cancelled, and a menu screen is immediately displayed in which application icons are aligned as shown in FIG. 4 and the like. In addition, the same applies to the case where the user presses the power button 14F to turn on the game apparatus 1 in the state where power supply is not performed in the game apparatus 1 (the power is off). As described above, the menu screen, which is a list of applications, is displayed when the game apparatus 1 is started. Concerning "start-up" of the game apparatus 1, the present invention is not limited to the immediate display as described above. For example, the case is also included, where, when the game apparatus 1 is started, first, a logo of the manufacture and a notice such as "precaution to user" are displayed, and then the menu screen is displayed as described above. In addition, the case where the menu has a hierarchical structure is included. For example, the case is also included, where, when the game apparatus 1 is started, a genre menu indicating genres of various applications installed in the game apparatus 1, such as "game", "music", and "picture", is displayed, and when any one of the genres is selected, a list of applications belonging to the selected genre is displayed. Further, the menu may have a plurality of hierarchical levels.

Further, in the above embodiment, when a task is generated (step S129 and step S130), its execution priority is set to an optional value. However, it is not necessarily necessary to set any value on the execution priority when a task is generated, and the task may be generated in a state where the execution priority has not been set yet. Then, the execution priority may be set for the first time by application of the policy data. Further, in addition to the execution priority, a task may be generated in a state where the number of uses and the like have not been set yet, and then the number of uses and the like may be set for the first time by application of the policy data.

Further, in the above embodiment, the hand-held game apparatus is used as an example of the information terminal. However, the present invention is useful for other portable information terminals, such as PDAs and notebook computers which have a wireless LAN function.

Second Embodiment

The following will describe a second embodiment of the present invention. In the second embodiment, an application process which is a "bottle mail application" will be described as one example of applications using the processes as described in the above first embodiment. Note that a game apparatus according to the second embodiment is the same as that of the above first embodiment. Thus, the same components are designated by the same reference numerals, and the detailed description thereof is omitted.

Figure 44:
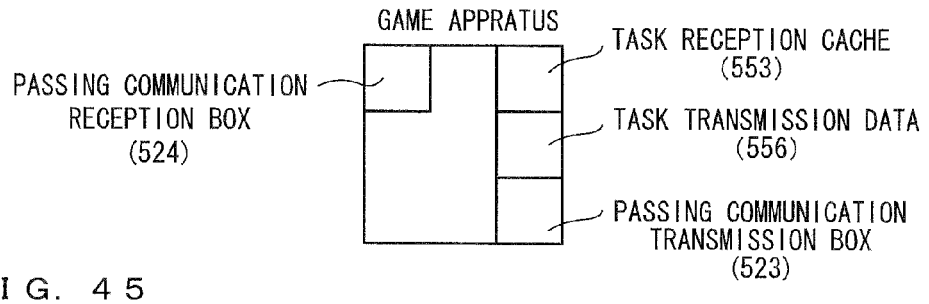
FIG. 44 is a diagram showing a process outline of a bottle mail application according to a second embodiment.
Figure 45:
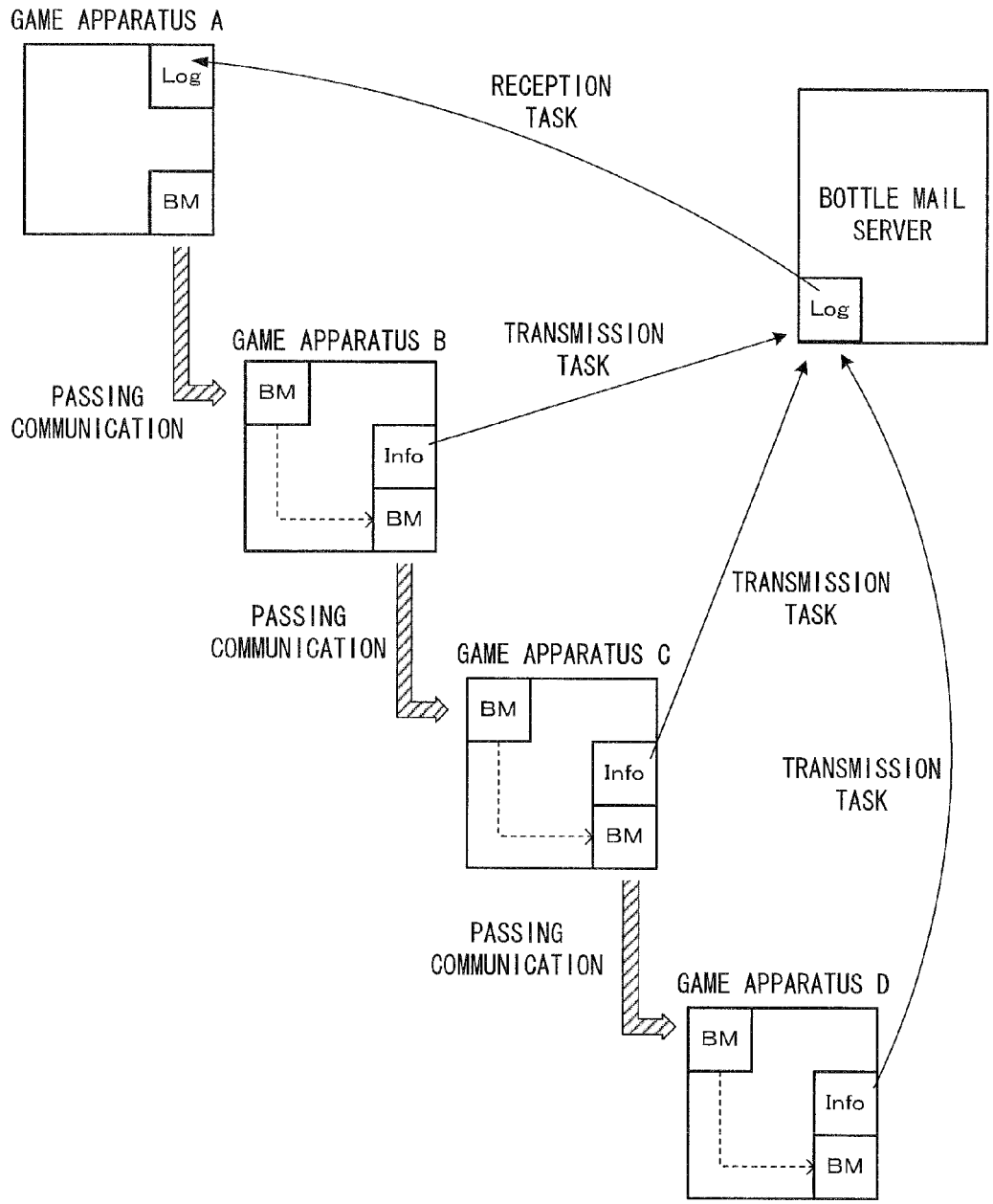
FIG. 45 is another diagram showing the process outline of the bottle mail application according to the second embodiment.

FIGS. 44 and 45 are diagram showing a process outline of the bottle mail application according to the second embodiment of the present invention. FIG. 44 schematically shows the game apparatus 1, the transmission box 523 and the reception box 524 for passing communication (hereinafter, referred to as "passing communication transmission box" and "passing communication reception box"), which is described in the above first embodiment with reference to FIG. 15, and the task reception cache 553 and the task transmission data 556 which are used for communication in a task. In FIG. 44, the passing communication reception box 524 is shown in an upper left portion of a square indicating the game apparatus 1, and the task reception cache 553, the task transmission data 556, and the passing communication transmission box 523 are aligned vertically on the right side of the square in order from the upper side.

On the premise of such a schematic diagram, the process outline according to the second embodiment will be described with referent to FIG. 45. In FIG. 45, game apparatuses A to D are shown. In each game apparatus, the bottle mail application is installed. In addition, a bottle mail server is also shown in FIG. 45. In the bottle mail application according to the present embodiment, a mail (shown as "BM" in FIG. 45) called "bottle mail", which is created in the game apparatus A, is transferred from game apparatus to game apparatus. In other words, this application allows a mail to be released so as to drift.

In FIG. 45, the bottle mail is created in the game apparatus A and stored in the passing communication transmission box. In this case, "generation information" is set for the bottle mail. The bottle mail can be transferred a number of times which is indicated by the "generation information". When the "generation information" is not set, the bottle mail can be transferred without limiting the number of times. Then, the bottle mail is transferred from the game apparatus A to the game apparatus B by performing passing communication. In other words, the bottle mail is transferred from the passing communication transmission box of the game apparatus A to the passing communication reception box of the game apparatus B.

Then, when the bottle mail application is executed in the game apparatus B, the bottle mail is transferred from the passing communication reception box of the game apparatus B to the passing communication transmission box thereof. At that time, in the game apparatus B, a predetermined value is added to the generation information of the bottle mail. Further, in the game apparatus B, additional information (shown as "Info" in FIG. 45) to be transmitted to the bottle mail server is generated. The "Info" includes the bottle mail, the name of the owner of the game apparatus B, the generation information after the addition, and the like. Then, a "transmission task" for transmitting the "Info" to the bottle mail server at an appropriate time is also generated and registered. As a result, the "transmission task" is executed at an appropriate timing, and the "Info" is transmitted from the game apparatus B to the bottle mail server. The bottle mail server accumulates the information as history information (shown as "Log" in FIG. 45).

Then, passing communication occurs between the game apparatus B and the game apparatus C, and the bottle mail is transferred from the game apparatus B to the game apparatus C. Then, when the bottle mail application is executed in the game apparatus C, similarly to the case of the game apparatus B, the bottle mail is transferred from the passing communication reception box to the passing communication transmission box, addition is performed on the generation information, and the "Info" and the "transmission task" concerning the "Info" are also generated. Then, the "Info" is also transmitted from the game apparatus C to the bottle mail server at an appropriate timing, and accumulated in "Log".

Then, passing communication occurs between the game apparatus C and the game apparatus D, and the bottle mail is transferred from the game apparatus C to the game apparatus D. In the game apparatus D as well, as a result of the bottle mail application being executed, the bottle mail is transferred from the passing communication reception box to the passing communication transmission box, addition is performed on the generation information, and the "Info" is transmitted by the "transmission task".

As described above, the bottle mail created in the game apparatus A is transferred from game apparatus to game apparatus by passing communication. Meanwhile, each of the game apparatuses B, C, and D which have received the bottle mail transmits the "Info" to the bottle mail server at an appropriate timing. Thus, the user of the game apparatus A can know a later state of the released bottle mail, such as how many people the released bottle mail is distributed to, who is the last recipient, and the like, by obtaining the "Log" accumulated in the bottle mail server. Then, in the present embodiment, a "reception task" is generated for obtaining such "Log", and the "Log" is received at an appropriate time.

In other words, in the second embodiment, by performing "local communication (passing communication)" and "Internet communication" in a cooperative manner, it is possible to provide an application by which a new way of enjoyment is possible.

The following will describe in detail a process according to the second embodiment. The process as described above is implemented by performing, in a cooperative manner, a "bottle mail application process" performed in the game apparatus 1 and a "bottle mail server process" performed in the bottle mail server. First, data used in the process will be described. In the process performed in the game apparatus 1, basically, the same data as in the above first embodiment is used. However, as data of the "bottle mail application", data indicating the "bottle mail" and the additional information ("Info" in FIG. 45) is generated as appropriate.

Figures 46, 47:
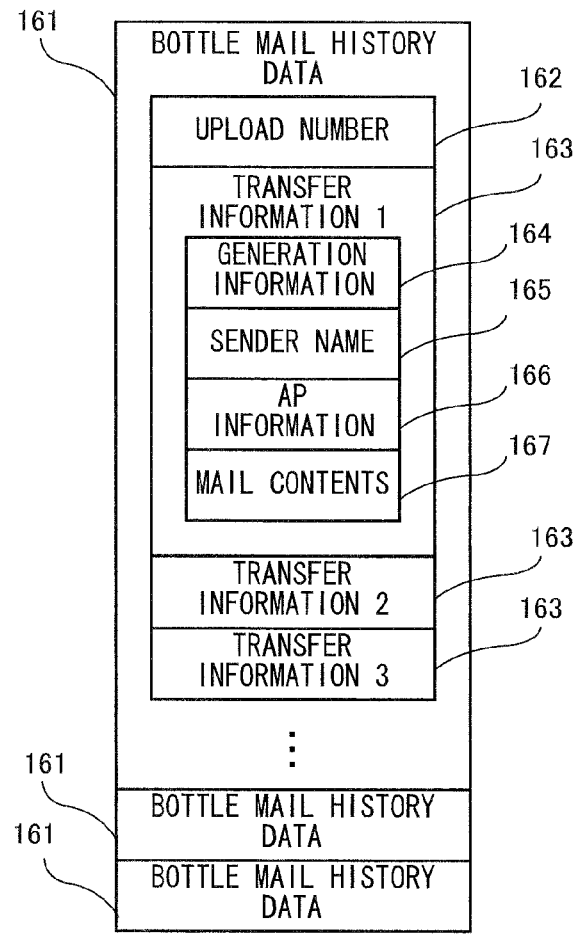
FIG. 46 is a diagram showing an example of a data structure of history information data stored in a bottle mail server.
FIG. 47 shows an example of an AP area table stored in the bottle mail server.

On the other hand, in the bottle mail server, programs for performing the process as described above as well as the above history information data ("Log" in FIG. 45) are stored. FIG. 46 is a diagram showing an example of a data structure of the history information data. As shown in FIG. 46, the history information data is constituted of a set of bottle mail history data 161, and each bottle mail history data 161 is constituted of an upload number 162 and a plurality of transfer information 163. The upload number 162 indicates the number of times for which the additional information or the like is uploaded from the game apparatus 1. In other words, the value indicates the number of times for which the bottle mail is transferred. The transfer information 163 is information concerning the game apparatuses 1 (the game apparatuses B to D in FIG. 45) which are transfer destinations of the bottle mail, and is constituted of a set of generation information 164, a sender name 165, AP information 166, and mail contents 167. The generation information 164 and the sender name 165 are data transmitted as the additional information from the game apparatus 1. The AP information 166 is information for indicating an AP used when the additional information is transmitted. On the basis of this information and a later-described AP area table, an area in which the game apparatus 1 is located when the additional information is transmitted can be identified. The mail contents 167 are contents (text) of a bottle mail transmitted together with the additional information. Specifically, the mail contents 167 are contents of a bottle mail which is transmitted from each transfer destination, such that, on the assumption that the contents of the bottle mail are changed at each transfer destination, it is possible to refer to the change history. In addition, although not shown, information for uniquely identifying each bottle mail, or the like are also included.

Further, in the bottle mail server, data for identifying an area in which an AP is set is also stored. FIG. 47 shows an example of an AP area table which defines the corresponding relations between APs and areas in which APs are set. On the basis of data corresponding to the table as shown in FIG. 47, the bottle mail server can identify an area based on the AP information 166.

Figure 48:
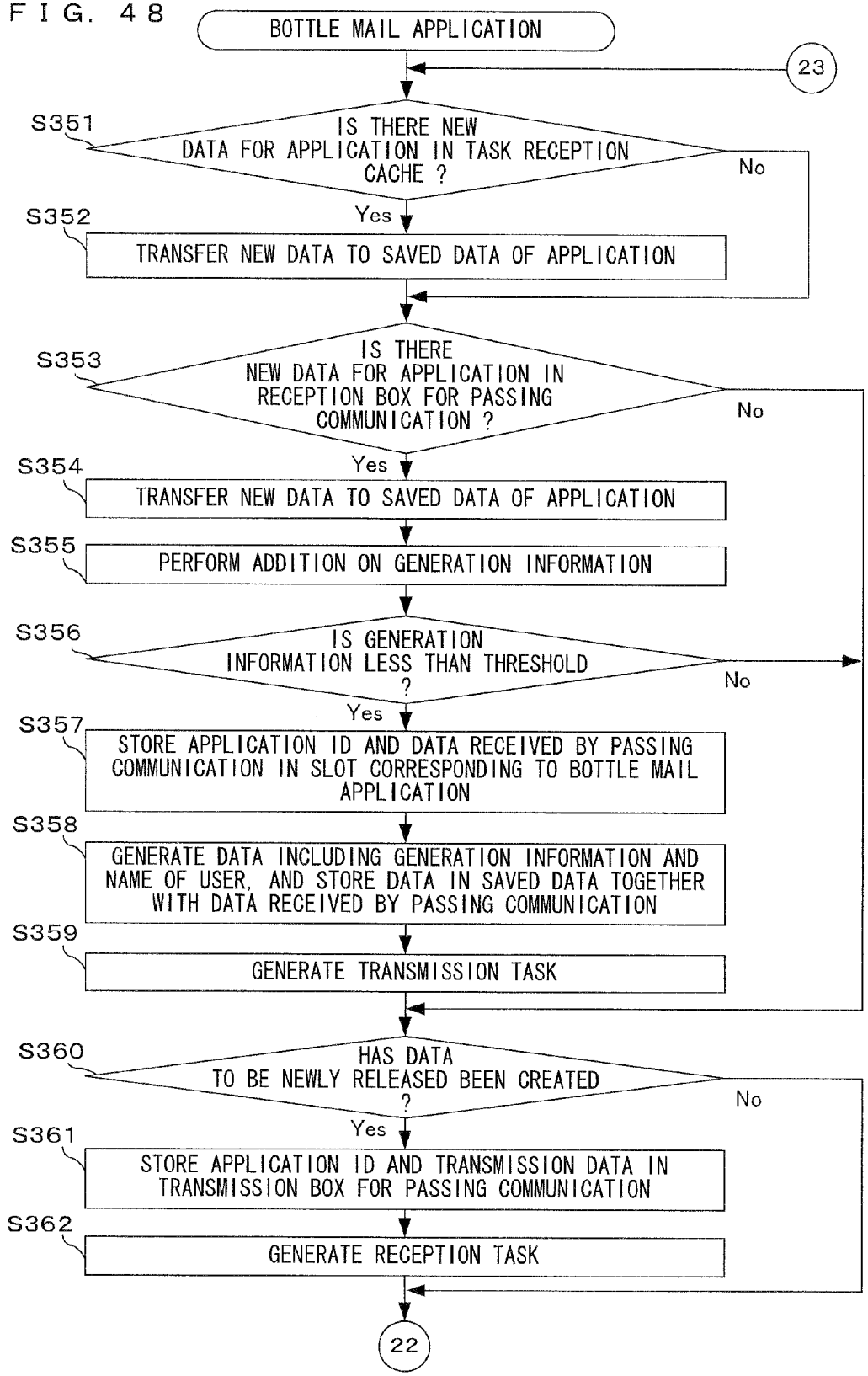
FIG. 48 is a flowchart showing in detail a bottle mail application process performed in the game apparatus 1.
Figure 49:
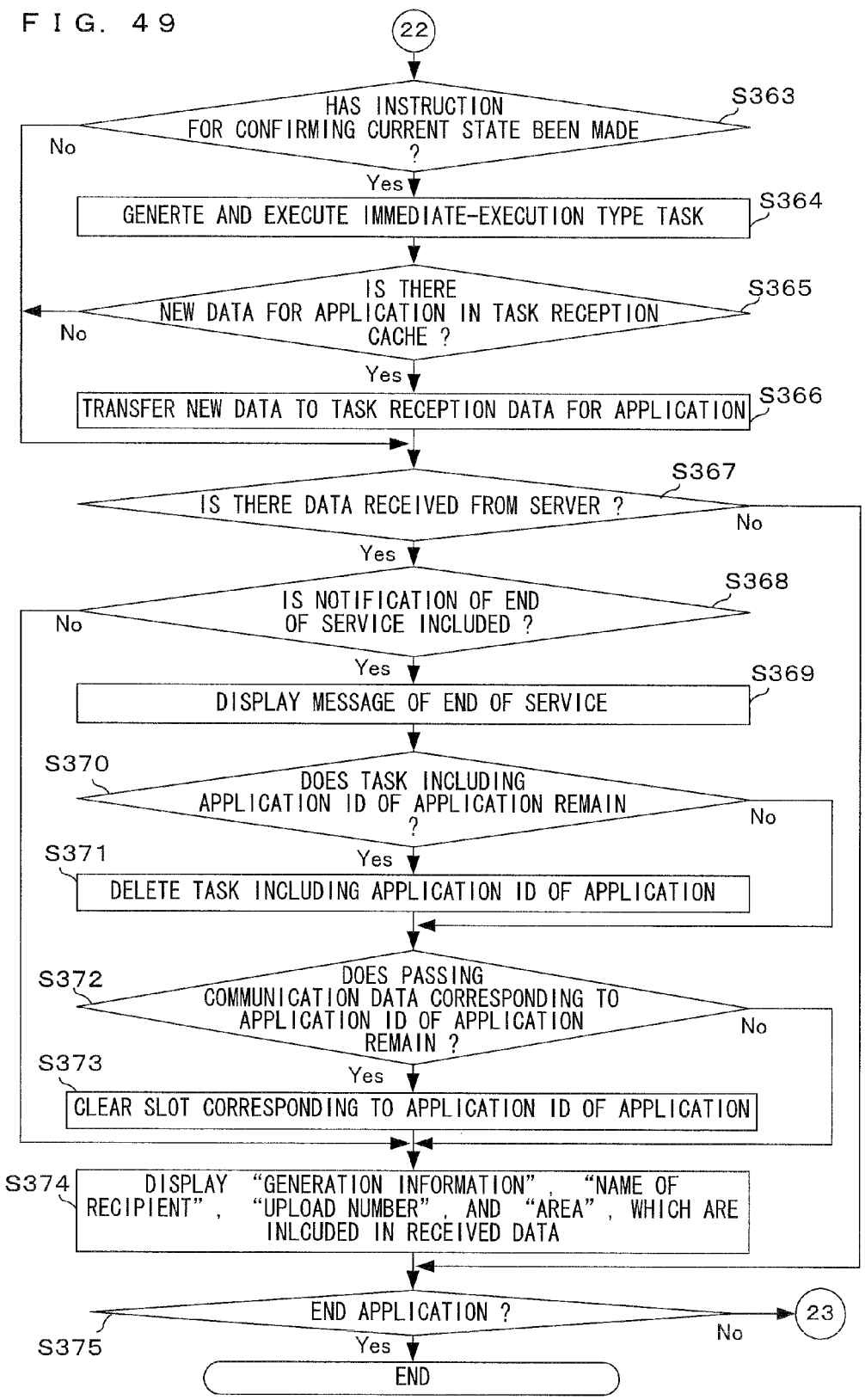
FIG. 49 is another flowchart showing in detail the bottle mail application process performed in the game apparatus 1.

FIGS. 48 and 49 are flowcharts showing in detail the bottle mail application process performed in the game apparatus 1. Note that, processes at steps S351 to S354 in FIG. 48 and processes at steps S367 to S373 in FIG. 49 are the same as the processes at steps S121 to S124 in FIG. 28 and steps S134 to S140 in FIG. 29 (data used in these processes is data concerning a bottle mail as described above). Thus, the detailed description of these processes is omitted.

In FIG. 48, at step S355 subsequent to step S354, a predetermined value is added to generation information which is set (appended) to a bottle mail. Next, at step S356, it is determined whether or not the generation information is less than a threshold. For example, the threshold is previously set as a defined value in the bottle mail application. As a result of the determination, when it is determined that the generation information is not less than the threshold (NO at step S356), it is determined that the bottle mail cannot be transferred anymore, and the processing proceeds to later-described step S360.

On the other hand, when it is determined that the generation information is less than the threshold (YES at step S356), it indicates that it is possible to transfer the bottle mail, and thus a process for transferring the bottle mail to another game apparatus by using passing communication is performed at step S357. In other words, a value indicating the bottle mail application is stored in the application ID 522 of a slot 521 associated with the bottle mail application. In addition, the bottle mail obtained at step S354 (which is stored in the passing reception data 558 in the saved data 555) is transferred to the transmission box 523 of the slot 521.

Next, at step S358, additional information data ("Info" in FIG. 45) to be transmitted to the bottle mail server is generated and stored in the saved data 555. In other words, data including the generation information and the user name obtained from the game apparatus setting data 560 is created and stored in the task transmission data 556 together with the bottle mail. Next, at step S359, a "transmission task" for transmitting the data prepared at step S358 to the bottle mail server at an appropriate time is generated.

Next, at step S360, it is determined whether or not a newly released bottle mail has been created (by the user). As a result, when the new bottle mail has not been created (NO at step S360), the processing proceeds to later-described step S363. On the other hand, when the new bottle mail has been created (YES at step S360), preparations are made at step S361 for transferring the newly created bottle mail to another game apparatus 1 by passing communication. In other words, a value indicating the bottle mail application is stored in the application ID 522. Further, the newly created bottle mail is stored in the transmission box 523. Note that, when a bottle mail is stored at step S357, the bottle mail received from the other game apparatus 1 and the bottle mail created by the user are stored together accordingly.

Next, at step S362, a "reception task" for obtaining, from the bottle mail server, history information data ("Log" in FIG. 45) indicating a state of the released bottle mail created by the user, is generated.

Next, at step S363 in FIG. 49, it is determined whether or not an instruction for confirming the state of the released bottle mail has been made by the user. As a result, when it is determined that the instruction has not been made (NO at step S363), the processing proceeds to later-described step S367.

On the other hand, when it is determined that the instruction has been made by the user (YES at step S363), an immediate-execution type task for receiving, from the bottle mail server, the history information data indicating the state of the released bottle mail, is generated and immediately executed at step S364. Next, at step S365, as a result of immediate execution of the task, it is determined whether or not new data (here, the received history information data) for the bottle mail application is present in the task reception cache 553. As a result, when it is determined that such data is not present (NO at step S365), the processing proceeds to later-described step S367. On the other hand, when it is determined that the new data for the bottle mail application is present (YES at step S365), the new data is transferred to the task reception data 557 in the saved data 555 of the bottle mail application at step S366. Since the new data is transferred to the saved data 555 as described above, it is possible to access the history information data through the bottle mail application.

Then, at step S367, it is determined whether or not new data for the bottle mail application is present as a result of the "reception task" generated at step S362 in FIG. 48 or at step S364 in FIG. 49. As a result, when the new data is not present (NO at step S367), the processing returns to the step S351 and the same process is repeated. On the other hand, when the new data is present (YES at step S367), at steps S368 to S373, a process of determining whether or not a network service concerning the bottle mail application is ended, and a process of clearing tasks and data for passing communication when the network service is ended, are performed. The processes are the same as the processes at steps S135 to S140 in FIG. 29, and thus the detailed description thereof is omitted.

After the end of the process at step S373, at step S374, the received history information data is referred to, and information such as "generation information", "name of recipient", "upload number", and "area" is displayed. Here, the "area" is information which is determined and added by the bottle mail server in the later-described process of the bottle mail server.

Next, at step S375, it is determined whether or not to end the bottle mail application. When it is determined that the bottle mail application is not to be ended (NO at step S375), the processing returns to the step S351 and the same process is repeated. When it is determined that the bottle mail application is to be ended (YES at step S375), the bottle mail application process is ended. This is the end of the description of the bottle mail application.

Figure 50:
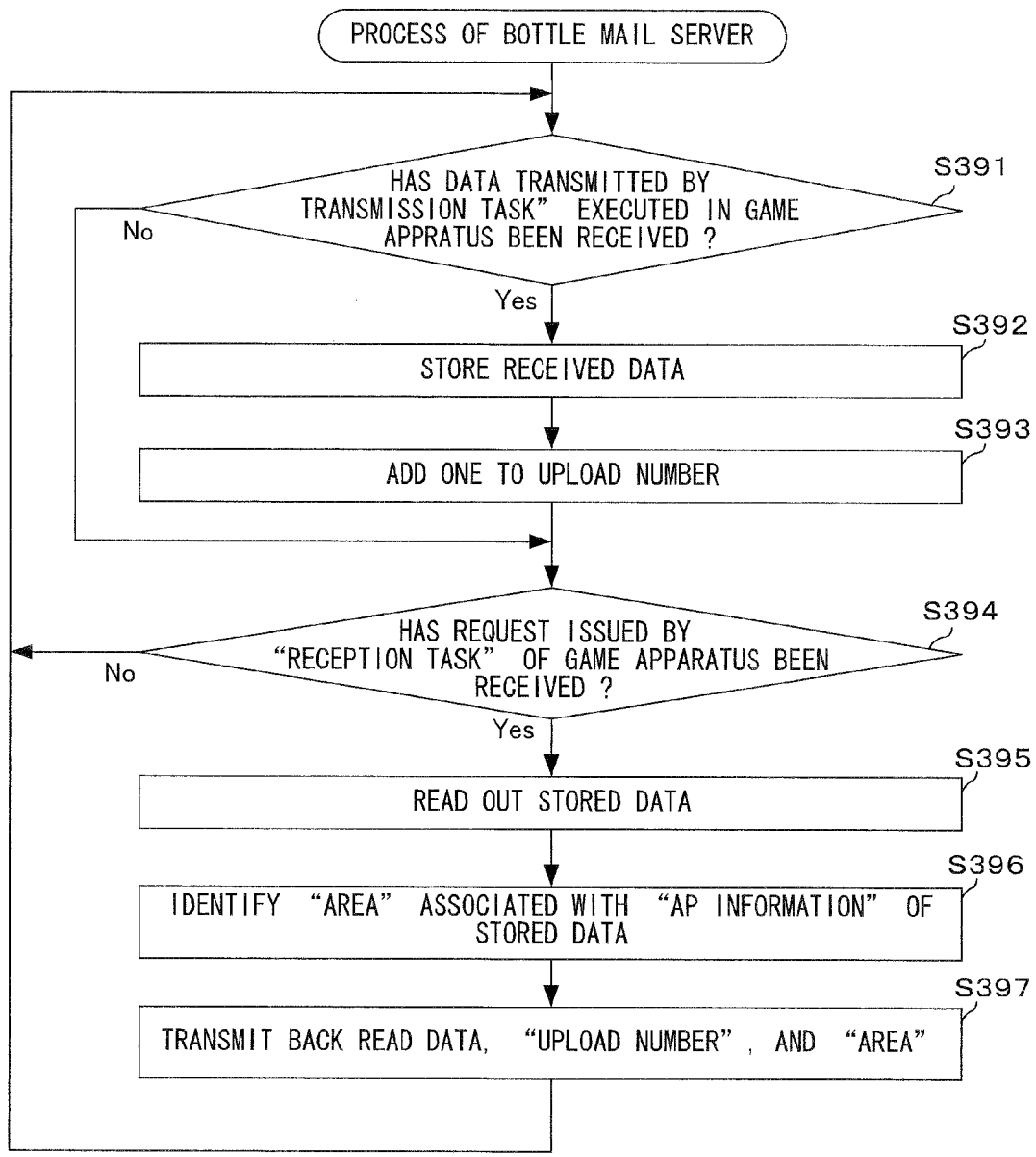
FIG. 50 is a flowchart showing in detail a process of the bottle mail server.

The following will describe the process performed in the bottle mail server in response to the bottle mail application. FIG. 50 is a flowchart showing in detail the process of the bottle mail server. In FIG. 50, first, at step S391, it is determined whether or not data ("Info" in FIG. 45) transmitted from the game apparatus 1 by the execution of the "transmission task" (the task generated at step S359 in FIG. 48) as described above has been received. As a result, when it is determined that the data has not been received (NO at step S391), the processing proceeds to later-described step S394. On the other hand, when it is determined that the data has been received (YES at step S391), the received data is stored as the bottle mail history data 161 (stored as "Log" in FIG. 45) at step S392.

Next, at step S393, one is added to the upload number 162 corresponding to the received bottle mail.

Next, at step S394, it is determined whether or not a request for the history information data has been received from the game apparatus 1. The request is issued by the "reception task" (the task generated at step S362 in FIG. 48 or at step S364 in FIG. 49). As a result of the determination, when it is determined that the request has not been received (NO at step S394), the processing returns to step S391 and the same process is repeated. On the other hand, when it is determined that the request has been received (YES at step S394), at step S395, the history information data is referred to, and the bottle mail history data 161 corresponding to the contents of the request is read out. Note that, as a method of identifying the bottle mail history data 161, for example, a predetermined ID number is generated on the basis of the creator and the created date and time of the bottle mail and a number unique to the game apparatus 1 used for creating the bottle mail, and is buried in data of the bottle mail. Then, when the request is issued, the ID number is caused to be included in the request, and thus is used for identifying the bottle mail history data 161.

Next, the AP information 166 of the read bottle mail history data 161 is obtained and the AP area table (see FIG. 47) is referred to, thereby obtaining an area 172 associated with the AP information 166.

Next, history information data is created on the basis of the contents of the read bottle mail history data 161 and the area 172, and transmitted to the game apparatus 1 which is the request source. Then, the processing returns to step S391 and the same process is repeated. This is the end of the description of the process of the bottle mail server.

As described above, in the second embodiment, a bottle mail created in a game apparatus 1 is transferred to another game apparatus 1 by using the passing communication. Then, in the game apparatus 1 which has received the bottle mail by the passing communication, additional information such as user name and AP information is added to the received data, and the received data is transmitted to the bottle mail server. Thus, the creator of the bottle mail can confirm a current state of the released bottle mail created by themselves, by inquiring of the bottle mail server. Further, in addition to a final state, it is possible to know information concerning users involved in transfer of the bottle mail. By performing the "local communication" (passing communication) and the "Internet communication" (communication with the bottle mail server) in a cooperative manner, it is possible to provide a new way of enjoyment to the user.

Note that, in the above embodiment, when the creator of the bottle mail confirms the current state of the bottle mail created by themselves, the "reception task" is generated. However, it is not necessarily necessary to use a "task", and an access to the bottle mail server may be performed as appropriate in accordance with an operation of the user (without using a task) for obtaining the history information data. Here, in addition to the game apparatus 1 which releases the bottle mail, the current state of the bottle mail may be able to be confirmed from other game apparatuses 1 involved in transfer of the bottle mail.

Further, concerning identification of "area", in the above embodiment, the "area" is identified in the bottle mail server on the basis of the AP information 166. Alternatively, the AP information 166 may be transmitted from the bottle mail server to the game apparatus 1, and the "area" may be identified in a process in the game apparatus 1 on the basis of the AP information 166.

Third Embodiment

The following will describe a third embodiment of the present invention. In the third embodiment, an example of a process in which transmission and reception by a task (Internet communication) and the "passing communication" (local communication) are performed in a cooperative manner as described in the above first embodiment, will be described. Specifically, an example in which data received by a task is transmitted to another game apparatus by using the "passing communication", and an example in which data received from another game apparatus by the "passing communication" is uploaded to a predetermined server by using a task, will be described.

First, a process of transmitting data received from a server or the like via an AP by execution of the task, to another game apparatus by using the "passing communication" will be described. For example, the case is assumed, where a trial version, a free game, or the like, which is obtained by the execution of the task, is transmitted to another game apparatus 1 by using the "passing communication". In this case, for example, it is assumed that, as a result of the execution of the task in the game apparatus A, the trial version, the free game, or the like is installed. At that time, in the game apparatus A, data of the trial version, the free game, or the like is configured to be set in the passing communication data 520. Thus, it is possible to transmit the data to another game apparatus by the "passing communication". Further, in the game apparatus which receives the data, the trial version, the free game, or the like, which is obtained by the "passing communication", may be automatically installed. The data which is received by the execution of the task and transmitted to the other game apparatus 1 by the "passing communication" is not limited to the trial version, the free game, and the like, and may be data used for a game application.

The following will describe, as another example, a process of uploading data obtained from another game apparatus by the "passing communication" to a predetermined server by using a "transmission task". For example, a game apparatus B is assumed, which is set so as to be allowed to perform only the "local communication" since the user has not registered any AP in the game apparatus B. In such a case, in the game apparatus B, upload data to be uploaded to the predetermined server is created, and task generation data for generating a "transmission task" for transmitting the upload data is created. For example, this data is considered to have the same structure as that of the policy data. Then, both data are configured to be stored in the passing communication data 520. As a result, these data are transmitted to the game apparatus A by the "passing communication". In the game apparatus A, a "transmission task" is generated on the basis of the task generation data received by the "passing communication" (the same processes as those at steps S129 and S130 are only necessarily performed). As a result, by executing this task, for the game apparatus B, the game apparatus A can transmit the upload data generated in the game apparatus B to the predetermined server.

By performing the "Internet communication" and the "local communication" in a cooperative manner as described above, it is possible to exchange various data between a plurality of game apparatuses 1. Further, even for a game apparatus 1 which is set such that the "Internet communication" is disabled, it is possible to perform indirectly the "Internet communication" by transmitting and receiving data via another game apparatus using the "local communication" (passing communication).

Note that, in each of the above embodiments, a series of processes performed in the game apparatus 1 may be performed in an information processing system which is constituted of a plurality of information processing apparatuses. For example, in an information processing system which includes a terminal side apparatus and a server side apparatus communicable with the terminal side apparatus via a network, a part of the series of processes performed in the game apparatus 1 (e.g., a part of a application process) may be performed by the server side apparatus. Alternatively, in an information processing system which includes a terminal side apparatus and a server side apparatus communicable with the terminal side apparatus via a network, a main process of the series of the processes may be performed by the server side apparatus, and a part of the series of the processes may be performed by the terminal side apparatus. Still alternatively, in the information processing system, a server side system may be constituted of a plurality of information processing apparatuses, and a process to be performed in the server side system may be divided and performed by the plurality of information processing apparatuses.

While the invention has been described in detail, the foregoing description is in all aspects illustrative and not restrictive. It will be understood that numerous other modifications and variations can be devised without departing from the scope of the invention.

We claim:

1. A portable information terminal having a used and an unused state, the unused state corresponding to a power saving mode which stops display, the portable information terminal comprising:
   a wireless communication module configured to search for an access point at least when the portable information terminal is in the unused state; and
   a processor configured to, when the access point is detected at least when the portable information terminal is in the unused state, connect to the access point and perform a data communication process based at least in part on a comparison between an application program identifier stored in the portable information terminal and an application program identifier received via the connected-to access point, wherein
   the processor is further configured to execute application programs,
   a receiver is configured to receive, from each application program, an instruction for a process of transmission or reception of data which is performed with another information terminal via a network,
   the wireless communication module automatically searches for the access point at least when the portable information terminal is in the unused state, and the processor automatically performs transmission or reception of the data via the access point at least when the portable information terminal is in the unused state.

2. A portable information terminal having a used and an unused state, the unused state corresponding to a power saving mode which stops display, the portable information terminal comprising:

a wireless communication module configured to search for an access point at least when the portable information terminal is in the unused state;

a processor configured to, when the access point is detected at least when the portable information terminal is in the unused state, connect to the access point and perform a data communication process based at least in part on a comparison between an application program identifier stored in the portable information terminal and an application program identifier received via the connected-to access point;

storage for storing user-configurable information relating to at least one first access point and non-user-configurable information relating to at least one second access point; and an access point information input configured for receiving user input concerning the at least one first access point, wherein the wireless communication module is configured to, when a time defined by search time information is reached, to search for the at least one first access point on the basis of the information relating to the at least one first access point and to automatically and repeatedly search for the at least one second access point on the basis of the information relating to the at least one second access point.

3. A portable information terminal having a used and an unused state, the unused state corresponding to a power saving mode which stops display, the portable information terminal comprising:

a wireless communication module configured to search for an access point at least when the portable information terminal is in the unused state; and a processor configured to, when the access point is detected at least when the portable information terminal is in the unused state, connect to the access point and perform a data communication process based at least in part on a comparison between an application program identifier stored in the portable information terminal and an application program identifier received via the connected-to access point, wherein the wireless communication module searches for the access point when a predetermined condition is satisfied at least when the portable information terminal is in the unused state, the processor is configured to perform transmission or reception of data in accordance with the data communication process via the access point, the predetermined condition is satisfied when a defined execution time is reached, and when the predetermined condition is satisfied and the access point is detected, the communication processor performs the transmission or reception of the data.

4. A portable information terminal having a used and an unused state, the unused state corresponding to a power saving mode which stops display, the portable information terminal comprising:

a wireless communication module configured to search for an access point at least when the portable information terminal is in the unused state; and a processor configured to, when the access point is detected at least when the portable information terminal is in the unused state, connect to the access point and perform a data communication process based at least in part on a comparison between an application program identifier stored in the portable information terminal and an application program identifier received via the connected-to access point, wherein at least when the portable information terminal is in the unused state, the wireless communication module is configured to search for the access point by automatically and repeatedly attempting to receive a beacon transmitted from the access point and to detect the access point by receiving the beacon, and the processor is configured to, when the beacon is received, attempt to establish a connection to the access point which transmits the beacon, and to, when the connection to the access point is established, perform transmission or reception of data via the access point.

5. The portable information terminal according to claim 4, wherein the processor is further configured to, when the connection to the access point is established, determine whether or not a defined execution time has been reached and, when the execution time is reached, to perform a specified transmission or reception of data.

6. A portable information terminal having a used and an unused state, comprising:

a wireless communication module configured to search for an access point at least when the portable information terminal is in the unused state;

a processor configured to, when the access point is detected at least when the portable information terminal is in the unused state, connect to the access point and perform a data communication process based at least in part on a comparison between an application program identifier stored in the portable information terminal and an application program identifier received via the connected-to access point; and a display, wherein display is provided in the used state and display is stopped in the unused state, the state of the portable information terminal changes between the used state and the unused state in accordance with a predetermined user operation, and the portable information terminal further comprises a display controller configured to, when the state of the portable information terminal changes from the unused state to the used state in accordance with the predetermined user operation, display contents of data received by the processor, on the display.

7. A portable information terminal having a used and an unused state, comprising:

a wireless communication module configured to search for an access point at least when the portable information terminal is in the unused state; and a processor configured to, when the access point is detected, connect to the access point and perform a data communication process, wherein a connection to the access point is cut off after the processor ends the data communication process, the portable information terminal has a power saving mode and a non-power saving mode, the wireless communication module searches for the access point at least when the portable information terminal is in the unused state or in the power saving mode, and the portable information terminal is configured to change to the non-power saving mode when the access point is detected by the wireless communication module and to the power saving mode when the connection to the access point is cut off.

8. A portable information terminal having a used and an unused state, comprising:
- a wireless communication module configured to search for an access point at least when the portable information terminal is in the unused state; and
- a processor configured to, when the access point is detected, connect to the access point and perform a data communication process, wherein
- the portable information terminal has a power saving mode and a non-power saving mode,
- the wireless communication module is configured to search for the access point at least when the portable information terminal operates in the unused state or in the power saving mode, and
- the portable information terminal is configured to change to the non-power saving mode when the access point is detected by the wireless communication module and to the power saving mode when the data communication process ends.

9. A portable information terminal having a used and an unused state, the unused state corresponding to a power saving mode which stops display, the portable information terminal comprising:
- a wireless communication module configured to search for an access point at least when the portable information terminal is in the unused state; and
- a processor configured to, when the access point is detected at least when the portable information terminal is in the unused state, connect to the access point and perform a data communication process based at least in part on a comparison between an application program identifier stored in the portable information terminal and an application program identifier received via the connected-to access point, wherein
- the processor is configured to automatically perform reception of one or more application programs via the access point at least when the portable information terminal is in the unused state, and
- the portable information terminal is further configured to, when the reception of the one or more application programs is performed, automatically perform installation of the one or more application programs on the portable information terminal at least when the portable information terminal is in the unused state.

10. A portable information terminal having a used and an unused state, comprising:
- a wireless communication module configured to search for an access point at least when the portable information terminal is in the unused state; and
- a processor configured to, when the access point is detected, connect to the access point and perform a data communication process, wherein
- the processor is configured to automatically perform reception of one or more application programs via the access point, and
- the portable information terminal is further configured to, when the portable information terminal is started, create and output a list of application programs, receive an application program selection from the list in accordance with a predetermined operation performed on the portable information terminal, execute the selected application program, and automatically add the one or more application programs received automatically by the processor as displayed objects to the created list.

11. A portable information terminal having a used and an unused state, comprising:
- a wireless communication module configured to search for an access point at least when the portable information terminal is in the unused state; and
- a processor configured to, when the access point is detected, connect to the access point and perform a data communication process, wherein
- the processor is configured to automatically perform reception of one or more application programs via the access point, and
- the portable information terminal is further configured to create and output a list of application programs in accordance with a predetermined operation performed on the portable information terminal, receive an application program selection from the list in accordance with a predetermined operation performed on the portable information terminal, execute the selected application program, and automatically add the one or more application programs received automatically by the processor as displayed objects to the created list.

12. A portable information terminal having a used and an unused state, comprising:
- a wireless communication module configured to search for an access point at least when the portable information terminal is in the unused state; and
- a processor configured to, when the access point is detected, connect to the access point and perform a data communication process, wherein
- the wireless communication module is configured to repeatedly search for another portable information terminal which becomes a communication partner present in a communicable range of the portable information terminal, by using near field wireless communication; automatically wirelessly connect to the other terminal; and automatically transmit data to and/or receive data from the wirelessly connected other terminal, and
- the processor transmits received data to another information processing apparatus via the access point.

13. A portable information terminal having a used and an unused state, comprising:
- a wireless communication module configured to search for an access point at least when the portable information terminal is in the unused state; and
- a processor configured to, when the access point is detected, connect to the access point and perform a data communication process, wherein
- the wireless communication module is configured to repeatedly search for another portable information terminal which becomes a communication partner present in a communicable range of the portable information terminal, by using near field wireless communication; automatically wirelessly connect to the other terminal; and automatically transmit data to and/or receive data from the wirelessly connected other terminal, and
- the wireless communication module transmits data received by the processor to the other terminal.

14. A portable information terminal having a used and an unused state, comprising:
- a wireless communication module configured to search for an access point at least when the portable information terminal is in the unused state;
- a processor configured to, when the access point is detected, connect to the access point and perform a data communication process;

a clock;
an arithmetic processing portion, wherein the portable information terminal is configured for changing between a non-power saving mode, in which power is supplied to the clock, the arithmetic processing portion, and the wireless communication module, and a power saving mode, in which the power is supplied to the clock and the wireless communication module, but not to the arithmetic processing portion; and
a timer for use in determining, by using the clock, whether or not a predetermined time has been reached at least when the portable information terminal is in the unused state or in the power saving mode, wherein
the power control mode changes to the non-power saving mode when it is determined by the timer that the predetermined time has been reached, and
the wireless communication module searches for the access point at least when the portable information terminal operates in the unused state or in the non-power saving mode.

15. A portable information terminal having a used and an unused state, comprising:
a wireless communication module configured to search for an access point at least when the portable information terminal is in the unused state;
a processor configured to, when the access point is detected, connect to the access point and perform a data communication process; and
an arithmetic processing portion, wherein
the wireless communication module is configured for near-field communication,
the portable information terminal is configured to change a power control mode between a non-power saving mode, in which power is supplied to the arithmetic processing portion and the wireless communication module, and a power saving mode, in which the power is supplied to the wireless communication module, but not to the arithmetic processing portion,
the wireless communication module is configured to search for the access point at least when the portable information terminal operates in the unused state or in the power saving mode,
the power control mode changes to the non-power saving mode when the access point is detected by the wireless communication module, and
when the power control mode changes to the non-power saving mode, the processor connects to the access point and performs the data communication process.

16. The portable information terminal according to claim 1, wherein the wireless communication module automatically and repeatedly searches for the access point, and
the processor automatically connects to the access point and automatically performs the data communication process.

17. The portable information terminal according to claim 1, wherein a connection to the access point is cut off after the processor ends the data communication process.

18. The portable information terminal according to claim 1, wherein the wireless communication module searches for the access point using near-field wireless communication.

19. The portable information terminal according to claim 1, wherein the wireless communication module searches for the access point when a predetermined condition is satisfied at least when the portable information terminal is in the unused state.

20. The portable information terminal according to claim 4, wherein the wireless communication module automatically and repeatedly searches for the access point, and
the processor automatically connects to the access point and automatically performs the data communication process.

21. The portable information terminal according to claim 4, wherein a connection to the access point is cut off after the processor ends the data communication process.

22. The portable information terminal according to claim 4, wherein the wireless communication module searches for the access point using near-field wireless communication.

23. The portable information terminal according to claim 4, wherein the wireless communication module searches for the access point when a predetermined condition is satisfied at least when the portable information terminal is in the unused state.

24. The portable information terminal according to claim 8, wherein the wireless communication module automatically and repeatedly searches for the access point, and
the processor automatically connects to the access point and automatically performs the data communication process.

25. The portable information terminal according to claim 8, wherein a connection to the access point is cut off after the processor ends the data communication process.

26. The portable information terminal according to claim 8, wherein the wireless communication module searches for the access point using near-field wireless communication.

27. The portable information terminal according to claim 8, wherein the wireless communication module searches for the access point when a predetermined condition is satisfied at least when the portable information terminal is in the unused state.

28. A portable information system having a used and an unused state, the unused state corresponding to a power saving mode which stops display, the portable information system comprising:
wireless communication circuitry for searching for an access point at least when the portable information system operates in the unused state; and
processing circuitry for, when the access point is detected at least when the portable information terminal is in the unused state, connecting to the access point and performing a data communication process based at least in part on a comparison between an application program identifier stored in the portable information system and an application program identifier received via the connected-to access point,
wherein the processing circuitry is further configured to execute application programs,
a receiver is configured to receive, from each application program, an instruction for a process of transmission or reception of data which is performed with another information system via a network,
the wireless communication circuitry automatically searches for the access point at least when the portable information terminal is in the unused state, and
the processing circuitry automatically performs transmission or reception of the data via the access point at least when the portable information terminal is in the unused state.

29. The portable information system according to claim 28, wherein the wireless communication circuitry automatically and repeatedly searches for the access point, and the processing circuitry automatically connects to the access point and automatically performs the data communication process.

30. The portable information system according to claim 28, wherein a connection to the access point is cut off after the processing circuitry ends the data communication process.

31. The portable information system according to claim 28, wherein the wireless communication circuitry searches for the access point using near-field wireless communication.

32. The portable information system according to claim 28, wherein the wireless communication circuitry searches for the access point when a predetermined condition is satisfied at least when the portable information system operates in the unused state.

33. A portable information system having a used and an unused state, the unused state corresponding to a power saving mode which stops display, the portable information system comprising:
   wireless communication circuitry for searching for an access point at least when the portable information system operates in the unused state; and
   processing circuitry for, when the access point is detected at least when the portable information terminal is in the unused state, connecting to the access point and performing perform a data communication process based at least in part on a comparison between an application program identifier stored in the portable information terminal and an application program identifier received via the connected-to access point;
   storage for storing user-configurable information relating to at least one first access point and non-user-configurable information relating to at least one second access point; and
   an access point information input configured for receiving user input concerning the at least one first access point, wherein the wireless communication circuitry is configured to, when a time defined by search time information is reached, to search for the at least one first access point on the basis of the information relating to the at least one first access point and to automatically and repeatedly search for the at least one second access point on the basis of the information relating to the at least one second access point.

34. A portable information system having a used and an unused state, the unused state corresponding to a power saving mode which stops display, the portable information system comprising:
   wireless communication circuitry for searching for an access point at least when the portable information system operates in the unused state; and
   processing circuitry for, when the access point is detected at least when the portable information terminal is in the unused state, connecting to the access point and performing a data communication process based at least in part on a comparison between an application program identifier stored in the portable information terminal and an application program identifier received via the connected-to access point, wherein
   the wireless communication circuitry searches for the access point when a predetermined condition is satisfied at least when the portable information system operates in the unused state,
   the processing circuitry performs transmission or reception of data in accordance with the data communication process via the access point,
   the predetermined condition is satisfied when a defined execution time is reached, and when the predetermined condition is satisfied and the access point is detected, the communication circuitry performs the transmission or reception of the data.

35. A portable information system having a used and an unused state, the unused state corresponding to a power saving mode which stops display, the portable information system comprising:
   wireless communication circuitry for searching for an access point at least when the portable information system operates in the unused state; and
   processing circuitry for, when the access point is detected at least when the portable information terminal is in the unused state, connecting to the access point and performing a data communication process based at least in part on a comparison between an application program identifier stored in the portable information terminal and an application program identifier received via the connected-to access point, wherein
   at least when the portable information system operates in the unused state, the wireless communication circuitry searches for the access point by automatically and repeatedly attempting to receive a beacon transmitted from the access point and to detect the access point by receiving the beacon, and
   the processing circuitry, when the beacon is received, attempts to establish a connection to the access point which transmits the beacon, and to, when the connection to the access point is established, performs transmission or reception of data via the access point.

36. The portable information system according to claim 35, wherein the wireless communication circuitry automatically and repeatedly searches for the access point, and
   the processing circuitry automatically connects to the access point and automatically performs the data communication process.

37. The portable information system according to claim 35, wherein a connection to the access point is cut off after the processing circuitry ends the data communication process.

38. The portable information system according to claim 35, wherein the wireless communication circuitry searches for the access point using near-field wireless communication.

39. The portable information system according to claim 35, wherein the wireless communication circuitry searches for the access point when a predetermined condition is satisfied at least when the portable information system operates in the unused state.

40. The portable information system according to claim 35, wherein the processing circuitry, when the connection to the access point is established, determines whether or not a defined execution time has been reached and, when the execution time is reached, performs a specified transmission or reception of data.

41. A portable information system having a used and an unused state, comprising:
   wireless communication circuitry for searching for an access point at least when the portable information system operates in the unused state;
   processing circuitry for, when the access point is detected at least when the portable information terminal is in the unused state, connecting to the access point and performing a data communication process based at least in part on a comparison between an application program identifier stored in the portable information terminal and an application program identifier received via the connected-to access point; and a display, wherein
display is provided in the used state and display is stopped in the unused state,
the state of the portable information system changes between the used state and the unused state in accordance with a predetermined user operation, and
the portable information system further comprises a display controller configured to, when the state of the portable information system changes from the unused state to the used state in accordance with the predetermined user operation, display contents of data received by the processing circuitry, on the display.

42. A portable information system having a used and an unused state, comprising:
wireless communication circuitry for searching for an access point at least when the portable information system operates in the unused state; and
processing circuitry for, when the access point is detected, connecting to the access point and performing a data communication process via the access point, wherein
a connection to the access point is cut off after the processing circuitry ends the data communication process,
the portable information system has a power saving mode and a non-power saving mode,
the wireless communication circuitry searches for the access point at least when the portable information system is in the unused state or in the power saving mode, and
the portable information system is configured to change to the non-power saving mode when the access point is detected by the wireless communication circuitry and to the power saving mode when the connection to the access point is cut off.

43. A portable information system having a used and an unused state, comprising:
wireless communication circuitry for searching for an access point at least when the portable information system operates in the unused state; and
processing circuitry for, when the access point is detected, connecting to the access point and performing a data communication process via the access point, wherein
the portable information system has a power saving mode and a non-power saving mode,
the wireless communication circuitry searches for the access point at least when the portable information system operates in the unused state or in the power saving mode, and
the portable information system is configured to change to the non-power saving mode when the access point is detected by the wireless communication circuitry and to the power saving mode when the data communication process ends.

44. The portable information system according to claim 43, wherein the wireless communication circuitry automatically and repeatedly searches for the access point, and
the processing circuitry automatically connects to the access point and automatically performs the data communication process.

45. The portable information system according to claim 43, wherein a connection to the access point is cut off after the processing circuitry ends the data communication process.

46. The portable information system according to claim 43, wherein the wireless communication circuitry searches for the access point using near-field wireless communication.

47. The portable information system according to claim 43, wherein the wireless communication circuitry searches for the access point when a predetermined condition is satisfied at least when the portable information system operates in the unused state.

48. A portable information system having a used and an unused state, the unused state corresponding to a power saving mode which stops display, the portable information system comprising:
wireless communication circuitry for searching for an access point at least when the portable information system operates in the unused state; and
processing circuitry for, when the access point is detected at least when the portable information terminal is in the unused state, connecting to the access point and performing a data communication process based at least in part on a comparison between an application program identifier stored in the portable information terminal and an application program identifier received via the connected-to access point, wherein
the processing circuitry automatically performs reception of one or more application programs via the access point at least when the portable information terminal is in the unused state, and
the portable information system is further configured to, when the reception of the one or more application programs is performed, automatically perform installation of the one or more application programs on the portable information system at least when the portable information terminal is in the unused state.

49. A portable information system having a used and an unused state, comprising:
wireless communication circuitry for searching for an access point at least when the portable information system operates in the unused state; and
processing circuitry for, when the access point is detected, connecting to the access point and performing a data communication process via the access point, wherein
the processing circuitry automatically performs reception of one or more application programs via the access point, and
the portable information system is further configured to, when the portable information system is started, create and output a list of application programs, select an application program from the list in accordance with a predetermined operation performed on the portable information system, execute the selected application program, and automatically add the one or more application programs received automatically by the processing circuitry as displayed objects to the created list.

50. A portable information system having a used and an unused state, comprising:
wireless communication circuitry for searching for an access point at least when the portable information system operates in the unused state; and
processing circuitry for, when the access point is detected, connecting to the access point and performing a data communication process via the access point, wherein
the processing circuitry automatically performs reception of one or more application programs via the access point, and
the portable information system is further configured to create and output a list of application programs in accordance with a predetermined operation performed on the portable information system, select an application program from the list in accordance with a predetermined operation performed on the portable information system, execute the selected application program, and automatically add the one or more application programs received automatically by the processing circuitry as displayed objects to the created list.

51. A portable information system having a used and an unused state, comprising:
wireless communication circuitry for searching for an access point at least when the portable information system operates in the unused state; and
processing circuitry for, when the access point is detected, connecting to the access point and performing a data communication process via the access point, wherein
the wireless communication circuitry repeatedly searches for another portable information system which becomes a communication partner present in a communicable range of the portable information system, by using near field wireless communication; automatically wirelessly connects to the other system; and automatically transmits data to and/or receive data from the wirelessly connected other system, and
the processing circuitry transmits received data to another information system via the access point.

52. A portable information system having a used and an unused state, comprising:
wireless communication circuitry for searching for an access point at least when the portable information system operates in the unused state; and
processing circuitry for, when the access point is detected, connecting to the access point and performing a data communication process via the access point, wherein
the wireless communication circuitry repeatedly searches for another portable information system which becomes a communication partner present in a communicable range of the portable information system, by using near field wireless communication; automatically wirelessly connects to the other system; and automatically transmits data to and/or receive data from the wirelessly connected other system, and
the wireless communication circuitry transmits data received by the processing circuitry to the other system.

53. A portable information system having a used and an unused state, comprising:
wireless communication circuitry for searching for an access point at least when the portable information system operates in the unused state;
processing circuitry for, when the access point is detected, connecting to the access point and performing a data communication process via the access point;
a clock;
an arithmetic processing portion, wherein the portable information system is configured for changing between a non-power saving mode, in which power is supplied to the clock, the arithmetic processing portion, and the wireless communication circuitry, and a power saving mode, in which the power is supplied to the clock and the wireless communication circuitry, but not to the arithmetic processing portion; and
a timer for use in determining, by using the clock, whether or not a predetermined time has been reached at least when the portable information system operates in the unused state or in the power saving mode, wherein
the power control mode changes to the non-power saving mode when it is determined by the timer that the predetermined time has been reached, and
the wireless communication circuitry searches for the access point at least when the portable information system operates in the unused state or in the non-power saving mode.

54. A portable information system having a used and an unused state, comprising:
wireless communication circuitry for searching for an access point at least when the portable information system operates in the unused state;
processing circuitry for, when the access point is detected, connecting to the access point and performing a data communication process via the access point; and
an arithmetic processing portion, wherein
the wireless communication circuitry is configured for near-field communication,
the portable information system is configured to change a power control mode between a non-power saving mode, in which power is supplied to the arithmetic processing portion and the wireless communication circuitry, and a power saving mode, in which the power is supplied to the wireless communication circuitry, but not to the arithmetic processing portion,
the wireless communication circuitry is configured to search for the access point at least when the portable information system operates in the unused state or in the power saving mode,
the power control mode changes to the non-power saving mode when the access point is detected by the wireless communication circuitry, and
when the power control mode changes to the non-power saving mode, the processing circuitry connects to the access point and performs the data communication process.

55. A non-transitory computer-readable storage medium having stored thereon program instructions which, when executed by a computer of a portable information terminal having a used and an unused state, cause the portable information terminal to perform steps comprising:
searching for an access point at least when the portable information terminal is in the unused state, the unused state corresponding to a power saving mode which stops display; and
when the access point is detected at least when the portable information terminal is in the unused state, connecting to the access point and performing a data communication process based at least in part on a comparison between an application program identifier stored in the portable information terminal and an application program identifier received via the connected-to access point,
wherein the program instructions, when executed, cause the portable information terminal to perform further steps comprising:
receiving, from each of multiple application programs executed by the portable information terminal, an instruction for a process of transmission or reception of data which is performed with another information terminal via a network,
automatically searching for the access point at least when the portable information terminal is in the unused state, and
automatically performing transmission or reception of the data via the access point at least when the portable information terminal is in the unused state.

56. The storage medium according to claim 55, wherein the program instructions, when executed, cause the portable information terminal to perform further steps comprising automatically and repeatedly searching for the access point, and automatically connecting to the access point and automatically performing the data communication process.

57. The storage medium according to claim 55, wherein the program instructions, when executed, cause the portable information terminal to perform further steps comprising cutting off a connection to the access point after the data communication process ends.

58. The storage medium according to claim 55, wherein the program instructions, when executed, cause the portable information terminal to perform further steps comprising searching for the access point using near-field wireless communication.

59. The storage medium according to claim 55, wherein the program instructions, when executed, cause the portable information terminal to perform further steps comprising searching for the access point when a predetermined condition is satisfied at least when the portable information terminal is in the unused state.

60. A non-transitory computer-readable storage medium having stored thereon program instructions which, when executed by a computer of a portable information terminal having a used and an unused state, cause the portable information terminal to perform steps including:
  searching for an access point at least when the portable information terminal is in the unused state, the unused state corresponding to a power saving mode which stops display;
  when the access point is detected at least when the portable information terminal is in the unused state, connecting to the access point and performing a data communication process based at least in part on a comparison between an application program identifier stored in the portable information terminal and an application program identifier received via the connected-to access point,
  wherein the portable information terminal stores in memory user-configurable information relating to at least one first access point and non-user-configurable information relating to at least one second access point, and wherein the program instructions, when executed, cause the portable information terminal to perform further steps comprising
  receiving user input concerning the at least one first access point,
  when a time defined by search time information is reached, searching for the at least one first access point on the basis of the information relating to the at least one first access point and automatically and repeatedly searching for the at least one second access point on the basis of the information relating to the at least one second access point.

61. A non-transitory computer-readable storage medium having stored thereon program instructions which, when executed by a computer of a portable information terminal having a used and an unused state, cause the portable information terminal to perform steps including:
  searching for an access point at least when the portable information terminal is in the unused state, the unused state corresponding to a power saving mode which stops display; and
  when the access point is detected at least when the portable information terminal is in the unused state, connecting to the access point and performing a data communication process based at least in part on a comparison between an application program identifier stored in the portable information terminal and an application program identifier received via the connected-to access point, wherein
  the program instructions, when executed, cause the portable information terminal to perform further steps comprising
  searching for the access point when a predetermined condition is satisfied at least when the portable information terminal is in the unused state, and performing transmission or reception of data in accordance with the data communication process via the access point, wherein the predetermined condition is satisfied when a defined execution time is reached, and
  when the predetermined condition is satisfied and the access point is detected, performing the transmission or reception of the data.

62. A non-transitory computer-readable storage medium having stored thereon program instructions which, when executed by a computer of a portable information terminal having a used and an unused state, cause the portable information terminal to perform steps including:
  searching for an access point at least when the portable information terminal is in the unused state, the unused state corresponding to a power saving mode which stops display; and
  when the access point is detected at least when the portable information terminal is in the unused state, connecting to the access point and performing a data communication process based at least in part on a comparison between an application program identifier stored in the portable information terminal and an application program identifier received via the connected-to access point, wherein
  the program instructions, when executed, cause the portable information terminal to perform further steps comprising
  at least when the portable information terminal is in the unused state, searching for the access point by automatically and repeatedly attempting to receive a beacon transmitted from the access point and detecting the access point by receiving the beacon, and
  when the beacon is received, attempting to establish a connection to the access point which transmits the beacon, and, when the connection to the access point is established, performing transmission or reception of data via the access point.

63. The storage medium according to claim 62, wherein the program instructions, when executed, cause the portable information terminal to perform further steps comprising automatically and repeatedly searching for the access point, and automatically connecting to the access point and automatically performing the data communication process.

64. The storage medium according to claim 62, wherein the program instructions, when executed, cause the portable information terminal to perform further steps comprising cutting off a connection to the access point after the data communication process ends.

65. The storage medium according to claim 62, wherein the program instructions, when executed, cause the portable information terminal to perform further steps comprising searching for the access point using near-field wireless communication.

66. The storage medium according to claim 62, wherein the program instructions, when executed, cause the portable information terminal to perform further steps comprising searching for the access point when a predetermined condition is satisfied at least when the portable information terminal is in the unused state.

67. The storage medium according to claim 62, wherein the program instructions, when executed, cause the portable information terminal to perform further steps comprising, when the connection to the access point is established, determining whether or not a defined execution time has been reached and, when the execution time is reached, performing a specified transmission or reception of data.

68. A non-transitory computer-readable storage medium having stored thereon program instructions which, when executed by a computer of a portable information terminal having a used and an unused state, cause the portable information terminal to perform steps including:
  searching for an access point at least when the portable information terminal is in the unused state;
  when the access point is detected at least when the portable information terminal is in the unused state, connecting to the access point and performing a data communication process based at least in part on a comparison between an application program identifier stored in the portable information terminal and an application program identifier received via the connected-to access point,
  wherein the program instructions, when executed, cause the portable information terminal to perform further steps comprising
  providing display for the portable information terminal in the used state and stopping display in the unused state,
  changing the state of the portable information terminal between the used state and the unused state in accordance with a predetermined user operation, and
  when the state of the portable information terminal changes from the unused state to the used state in accordance with the predetermined user operation, displaying contents of received data, on the display.

69. A non-transitory computer-readable storage medium having stored thereon program instructions which, when executed by a computer of a portable information terminal having a used and an unused state, cause the portable information terminal to perform steps including:
  searching for an access point at least when the portable information terminal is in the unused state; and
  when the access point is detected, connecting to the access point and performing a data communication process, wherein
  the program instructions, when executed, cause the portable information terminal to perform further steps comprising
  cutting off a connection to the access point after the data communication process ends,
  wherein the portable information terminal has a power saving mode and a non-power saving mode and the program instructions, when executed, cause the portable information terminal to perform further steps comprising
  searching for the access point at least when the portable information terminal is in the unused state or in the power saving mode, and
  changing to the non-power saving mode when the access point is detected by the wireless communication module and to the power saving mode when the connection to the access point is cut off.

70. A non-transitory computer-readable storage medium having stored thereon program instructions which, when executed by a computer of a portable information terminal having a used and an unused state, cause the portable information terminal to perform steps including:
  searching for an access point at least when the portable information terminal is in the unused state; and
  when the access point is detected, connecting to the access point and performing a data communication process, wherein
  the portable information terminal has a power saving mode and a non-power saving mode and the program instructions, when executed, cause the portable information terminal to perform further steps comprising
  searching for the access point at least when the portable information terminal operates in the unused state or in the power saving mode, and
  changing to the non-power saving mode when the access point is detected by the wireless communication module and to the power saving mode when the data communication process ends.

71. The storage medium according to claim 70, wherein the program instructions, when executed, cause the portable information terminal to perform further steps comprising automatically and repeatedly searching for the access point, and automatically connecting to the access point and automatically performing the data communication process.

72. The storage medium according to claim 70, wherein the program instructions, when executed, cause the portable information terminal to perform further steps comprising cutting off a connection to the access point after the data communication process ends.

73. The storage medium according to claim 70, wherein the program instructions, when executed, cause the portable information terminal to perform further steps comprising searching for the access point using near-field wireless communication.

74. The storage medium according to claim 70, wherein the program instructions, when executed, cause the portable information terminal to perform further steps comprising searching for the access point when a predetermined condition is satisfied at least when the portable information terminal is in the unused state.

75. A non-transitory computer-readable storage medium having stored thereon program instructions which, when executed by a computer of a portable information terminal having a used and an unused state, cause the portable information terminal to perform steps including:
  searching for an access point at least when the portable information terminal is in the unused state, the unused state corresponding to a power saving mode which stops display; and
  when the access point is detected at least when the portable information terminal is in the unused state, connecting to the access point and performing a data communication process based at least in part on a comparison between an application program identifier stored in the portable information terminal and an application program identifier received via the connected-to access point, wherein the program instructions, when executed, cause the portable information terminal to perform further steps comprising
  automatically performing reception of one or more application programs via the access point at least when the portable information terminal is in the unused state, and
  when the reception of the one or more application programs is performed, automatically performing installation of the one or more application programs on the portable information terminal at least when the portable information terminal is in the unused state.

76. A non-transitory computer-readable storage medium having stored thereon program instructions which, when executed by a computer of a portable information terminal having a used and an unused state, cause the portable information terminal to perform steps including:
  searching for an access point at least when the portable information terminal is in the unused state; and
  when the access point is detected, connecting to the access point and performing a data communication process, wherein the program instructions, when executed, cause the portable information terminal to perform further steps comprising automatically performing reception of one or more application programs via the access point, and when the portable information terminal is started, creating and outputting a list of application programs, receiving an application program selection from the list in accordance with a predetermined operation performed on the portable information terminal, executing the selected application program, and automatically adding the one or more application programs received automatically by the processor as displayed objects to the created list.

77. A non-transitory computer-readable storage medium having stored thereon program instructions which, when executed by a computer of a portable information terminal having a used and an unused state, cause the portable information terminal to perform steps including:

searching for an access point at least when the portable information terminal is in the unused state; and when the access point is detected, connecting to the access point and performing a data communication process, wherein the program instructions, when executed, cause the portable information terminal to perform further steps comprising automatically performing reception of one or more application programs via the access point, and creating and outputting a list of application programs in accordance with a predetermined operation performed on the portable information terminal, receiving an application program selection from the list in accordance with a predetermined operation performed on the portable information terminal, executing the selected application program, and automatically adding the one or more application programs received automatically by the processor as displayed objects to the created list.

78. A non-transitory computer-readable storage medium having stored thereon program instructions which, when executed by a computer of a portable information terminal having a used and an unused state, cause the portable information terminal to perform steps including:

searching for an access point at least when the portable information terminal is in the unused state; and when the access point is detected, connecting to the access point and performing a data communication process, wherein the program instructions, when executed, cause the portable information terminal to perform further steps comprising repeatedly searching for another portable information terminal which becomes a communication partner present in a communicable range of the portable information terminal, by using near field wireless communication; automatically wirelessly connecting to the other terminal; and automatically transmitting data to and/or receive data from the wirelessly connected other terminal, and transmitting received data to another information processing apparatus via the access point.

79. A non-transitory computer-readable storage medium having stored thereon program instructions which, when executed by a computer of a portable information terminal having a used and an unused state, cause the portable information terminal to perform steps including:

searching for an access point at least when the portable information terminal is in the unused state; and when the access point is detected, connecting to the access point and performing a data communication process, wherein the program instructions, when executed, cause the portable information terminal to perform further steps comprising repeatedly searching for another portable information terminal which becomes a communication partner present in a communicable range of the portable information terminal, by using near field wireless communication; automatically wirelessly connecting to the other terminal; and automatically transmitting data to and/or receive data from the wirelessly connected other terminal, and transmitting received data to the other terminal.

80. A non-transitory computer-readable storage medium having stored thereon program instructions which, when executed by a computer of a portable information terminal having a used and an unused state, cause the portable information terminal to perform steps including:

searching for an access point at least when the portable information terminal is in the unused state; and when the access point is detected, connecting to the access point and performing a data communication process, wherein the portable information terminal comprises a clock, an arithmetic processing portion, and a wireless communication module and wherein the program instructions, when executed, cause the portable information terminal to perform further steps comprising changing between a non-power saving mode, in which power is supplied to the clock, the arithmetic processing portion, and the wireless communication module, and a power saving mode, in which the power is supplied to the clock and the wireless communication module, but not to the arithmetic processing portion;

determining, by using the clock, whether or not a predetermined time has been reached at least when the portable information terminal is in the unused state or in the power saving mode, changing to the non-power saving mode when it is determined that the predetermined time has been reached, and searching for the access point at least when the portable information terminal operates in the unused state or in the non-power saving mode.

81. A non-transitory computer-readable storage medium having stored thereon program instructions which, when executed by a computer of a portable information terminal having a used and an unused state, cause the portable information terminal to perform steps including:

searching for an access point at least when the portable information terminal is in the unused state; and when the access point is detected, connecting to the access point and performing a data communication process, wherein the portable terminal comprises an arithmetic processing portion and a wireless communication module configured for at least near field communication and wherein the program instructions, when executed, cause the portable information terminal to perform further steps comprising changing a power control mode between a non-power saving mode, in which power is supplied to the arithmetic processing portion and the wireless communication module, and a power saving mode, in which the power is supplied to the wireless communication module, but not to the arithmetic processing portion, searching for the access point at least when the portable information terminal operates in the unused state or in the power saving mode, changing to the non-power saving mode when the access point is detected by the wireless communication module, and when the power control mode changes to the non-power saving mode, connecting to the access point and performing the data communication process.

82. A method of controlling a portable information terminal comprising a wireless communication module and a processor, and having a used and an unused state, the method comprising:

searching, using the wireless communication module, for an access point at least when the portable information terminal is in the unused state, the unused state corresponding to a power saving mode which stops display; and when the access point is detected at least when the portable information terminal is in the unused state, connecting to the access point and performing a data communication process under control of the processor based at least in part on a comparison between an application program identifier stored in the portable information terminal and an application program identifier received via the connected-to access point, wherein the method further comprises receiving, from each of multiple application programs executed by the portable information terminal, an instruction for a process of transmission or reception of data which is performed with another information processing apparatus via a network, automatically searching for the access point at least when the portable information terminal is in the unused state, and automatically performing transmission or reception of the data via the access point at least when the portable information terminal is in the unused state.

83. The method according to claim 82, further comprising automatically and repeatedly searching for the access point, and automatically connecting to the access point and automatically performing the data communication process.

84. The method according to claim 82, further comprising cutting off a connection to the access point after the processor ends the data communication process.

85. The method according to claim 82, further comprising searching for the access point using near-field wireless communication.

86. The method according to claim 82, further comprising searching for the access point when a predetermined condition is satisfied at least when the portable information terminal is in the unused state.

87. A method of controlling a portable information terminal comprising a wireless communication module and a processor, and having a used and an unused state, the method comprising:

searching, using the wireless communication module, for an access point at least when the portable information terminal is in the unused state, the unused state corresponding to a power saving mode which stops display; and when the access point is detected at least when the portable information terminal is in the unused state, connecting to the access point and performing a data communication process under control of the processor based at least in part on a comparison between an application program identifier stored in the portable information terminal and an application program identifier received via the connected-to access point, wherein the portable information terminal stores user-configurable information relating to at least one first access point and non-user-configurable information relating to at least one second access point and the method further comprises receiving user input concerning the at least one first access point, when a time defined by search time information is reached, searching for the at least one first access point on the basis of the information relating to the at least one first access point and automatically and repeatedly searching for the at least one second access point on the basis of the information relating to the at least one second access point.

88. A method of controlling a portable information terminal comprising a wireless communication module and a processor, and having a used and an unused state, the method comprising:

searching, using the wireless communication module, for an access point at least when the portable information terminal is in the unused state, the unused state corresponding to a power saving mode which stops display; and when the access point is detected at least when the portable information terminal is in the unused state, connecting to the access point and performing a data communication process under control of the processor based at least in part on a comparison between an application program identifier stored in the portable information terminal and an application program identifier received via the connected-to access point, wherein the method further comprises searching for the access point when a predetermined condition is satisfied at least when the portable information terminal is in the unused state and performing transmission or reception of the data in accordance with the data communication process via the access point, the predetermined condition being satisfied when a defined execution time is reached, wherein when the predetermined condition is satisfied and the access point is detected, the transmission or reception of the data is performed.

89. A method of controlling a portable information terminal comprising a wireless communication module and a processor, and having a used and an unused state, the method comprising:

searching, using the wireless communication module, for an access point at least when the portable information terminal is in the unused state, the unused state corresponding to a power saving mode which stops display; and when the access point is detected at least when the portable information terminal is in the unused state, connecting to the access point and performing a data communication process under control of the processor based at least in part on a comparison between an application program identifier stored in the portable information terminal and an application program identifier received via the connected-to access point, wherein the method further comprises when the portable information terminal is in the unused state, searching for the access point by automatically and repeatedly attempting to receive a beacon transmitted from the access point and detecting the access point by receiving the beacon, and when the beacon is received, attempting to establish a connection to the access point which transmits the beacon, and, when the connection to the access point is established, performing transmission or reception of data via the access point.

90. The method according to claim 89, further comprising automatically and repeatedly searching for the access point, and automatically connecting to the access point and automatically performing the data communication process.

91. The method according to claim 89, further comprising cutting off a connection to the access point after the processor ends the data communication process.

92. The method according to claim 89, further comprising searching for the access point using near-field wireless communication.

93. The method according to claim 89, further comprising searching for the access point when a predetermined condition is satisfied at least when the portable information terminal is in the unused state.

94. The method according to claim 89, further comprising, when the connection to the access point is established, determining whether or not a defined execution time has been reached and, when the execution time is reached, performing a specified transmission or reception of data.

95. A method of controlling a portable information terminal comprising a wireless communication module and a processor, and having a used and an unused state, the method comprising:
searching, using the wireless communication module, for an access point at least when the portable information terminal is in the unused state; and
when the access point is detected at least when the portable information terminal is in the unused state, connecting to the access point and performing a data communication process under control of the processor based at least in part on a comparison between an application program identifier stored in the portable information terminal and an application program identifier received via the connected-to access point, wherein the method further comprises
providing display for the portable information terminal in the used state and stopping display in the unused state,
changing the state of the portable information terminal between the used state and the unused state in accordance with a predetermined user operation, and
when the state of the portable information terminal changes from the unused state to the used state in accordance with the predetermined user operation, displaying contents of data received by the processor, on the display.

96. A method of controlling a portable information terminal comprising a wireless communication module and a processor, and having a used and an unused state, the method comprising:
searching, using the wireless communication module, for an access point at least when the portable information terminal is in the unused state;
when the access point is detected, connecting to the access point and performing a data communication process under control of the processor; and
cutting off a connection to the access point after the processor ends the data communication process,
wherein the portable information terminal has a power saving mode and a non-power saving mode and the method further comprises
searching for the access point at least when the portable information terminal is in the unused state or in the power saving mode, and
changing to the non-power saving mode when the access point is detected by the wireless communication module and to the power saving mode when the connection to the access point is cut off.

97. A method of controlling a portable information terminal comprising a wireless communication module and a processor, and having a used and an unused state, the method comprising:
searching, using the wireless communication module, for an access point at least when the portable information terminal is in the unused state; and
when the access point is detected, connecting to the access point and performing a data communication process under control of the processor, wherein the portable information terminal has a power saving mode and a non-power saving mode and the method further comprises
searching for the access point at least when the portable information terminal operates in the unused state or in the power saving mode, and
changing to the non-power saving mode when the access point is detected by the wireless communication module and to the power saving mode when the data communication process ends.

98. The method according to claim 97, further comprising automatically and repeatedly searching for the access point, and automatically connecting to the access point and automatically performing the data communication process.

99. The method according to claim 97, further comprising cutting off a connection to the access point after the data communication process ends.

100. The method according to claim 97, further comprising searching for the access point using near-field wireless communication.

101. The method according to claim 97, further comprising searching for the access point when a predetermined condition is satisfied at least when the portable information terminal is in the unused state.

102. A method of controlling a portable information terminal comprising a wireless communication module and a processor, and having a used and an unused state, the method comprising:
searching, using the wireless communication module, for an access point at least when the portable information terminal is in the unused state, the unused state corresponding to a power saving mode which stops display; and
when the access point is detected at least when the portable information terminal is in the unused state, connecting to the access point and performing a data communication process under control of the processor based at least in part on a comparison between an application program identifier stored in the portable information terminal and an application program identifier received via the connected-to access point, wherein the method further comprises
automatically performing reception of one or more application programs via the access point at least when the portable information terminal is in the unused state, and
when the reception of the one or more application programs is performed, automatically performing installation of the one or more application programs on the portable information terminal at least when the portable information terminal is in the unused state.

103. A method of controlling a portable information terminal comprising a wireless communication module and a processor, and having a used and an unused state, the method comprising:
- searching, using the wireless communication module, for an access point at least when the portable information terminal is in the unused state; and
- when the access point is detected, connecting to the access point and performing a data communication process under control of the processor, wherein the method further comprises
- automatically performing reception of one or more application programs via the access point, and
- when the portable information terminal is started, creating and outputting a list of applications, receiving an application program selection from the list in accordance with a predetermined operation performed on the portable information terminal, execute the selected application program, and automatically add the one or more application programs received automatically by the processor as displayed objects to the created list.

104. A method of controlling a portable information terminal comprising a wireless communication module and a processor, and having a used and an unused state, the method comprising:
- searching, using the wireless communication module, for an access point at least when the portable information terminal is in the unused state; and
- when the access point is detected, connecting to the access point and performing a data communication process under control of the processor, wherein the method further comprises
- automatically performing reception of one or more application programs via the access point, and
- creating and outputting a list of application programs in accordance with a predetermined operation performed on the portable information terminal, receiving an application program selection from the list in accordance with a predetermined operation performed on the portable information terminal, executing the selected application program, and automatically adding the one or more application programs received automatically by the processor as displayed objects to the created list.

105. A method of controlling a portable information terminal comprising a wireless communication module and a processor, and having a used and an unused state, the method comprising:
- searching, using the wireless communication module, for an access point at least when the portable information terminal is in the unused state; and
- when the access point is detected, connecting to the access point and performing a data communication process under control of the processor, wherein the method further comprises
- repeatedly searching for another portable information terminal which becomes a communication partner present in a communicable range of the portable information terminal, by using near field wireless communication; automatically wirelessly connecting to the other terminal; and automatically transmitting data to and/or receive data from the wirelessly connected other terminal, and
- transmitting received data to another information processing apparatus via the access point.

106. A method of controlling a portable information terminal comprising a wireless communication module and a processor, and having a used and an unused state, the method comprising:
- searching, using the wireless communication module, for an access point at least when the portable information terminal is in the unused state; and
- when the access point is detected, connecting to the access point and performing a data communication process under control of the processor, wherein the method further comprises
- repeatedly searching for another portable information terminal which becomes a communication partner present in a communicable range of the portable information terminal, by using near field wireless communication; automatically wirelessly connecting to the other terminal; and automatically transmitting data to and/or receive data from the wirelessly connected other terminal, and
- transmitting data received by the processor to the other terminal.

107. A method of controlling a portable information terminal comprising a wireless communication module and a processor, and having a used and an unused state, the method comprising:
- searching, using the wireless communication module, for an access point at least when the portable information terminal is in the unused state; and
- when the access point is detected, connecting to the access point and performing a data communication process under control of the processor, wherein the portable information terminal further comprises a clock and an arithmetic processing portion and the method further comprises
- changing between a non-power saving mode, in which power is supplied to the clock, the arithmetic processing portion, and the wireless communication module, and a power saving mode, in which the power is supplied to the clock and the wireless communication module, but not to the arithmetic processing portion; and
- determining, by using the clock, whether or not a predetermined time has been reached at least when the portable information terminal is in the unused state or in the power saving mode,
- changing to the non-power saving mode when it is determined that the predetermined time has been reached, and
- searching for the access point at least when the portable information terminal operates in the unused state or in the non-power saving mode.

108. A method of controlling a portable information terminal comprising a wireless communication module and a processor, and having a used and an unused state, the method comprising:
- searching, using the wireless communication module, for an access point at least when the portable information terminal is in the unused state; and
- when the access point is detected, connecting to the access point and performing a data communication process under control of the processor, wherein the portable information terminal further comprises an arithmetic processing portion and the method further comprises
- changing a power control mode between a non-power saving mode, in which power is supplied to the arithmetic processing portion and the wireless communication module, and a power saving mode, in which the power is supplied to the wireless communication module, but not to the arithmetic processing portion, searching for the access point at least when the portable information terminal operates in the unused state or in the power saving mode, changing to the non-power saving mode when the access point is detected, and when the power control mode changes to the non-power saving mode, connecting to the access point and performing the data communication process.

* * * * *